*(12)* United States Patent
Levitsky et al.

US011784747B2

*(10)* Patent No.: US 11,784,747 B2
*(45)* Date of Patent: Oct. 10, 2023

(54) CONFIGURATION SIGNALING OF DEMODULATION REFERENCE SIGNAL AND TRANSMISSION MODE

(71) Applicant: QUALCOMM Incorporated, San Diego, CA (US)

(72) Inventors: Michael Levitsky, Rehovot (IL); Muhammad Sayed Khairy Abdelghaffar, San Jose, CA (US); Peter Gaal, San Diego, CA (US); Daniel Paz, Geva Carmel (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/363,576

(22) Filed: Jun. 30, 2021

(65) Prior Publication Data

US 2023/0006762 A1  Jan. 5, 2023

(51) Int. Cl.
*H04W 72/04* (2023.01)
*H04L 1/00* (2006.01)
(Continued)

(52) U.S. Cl.
CPC .......... *H04L 1/0025* (2013.01); *H04L 5/0051* (2013.01); *H04W 72/0446* (2013.01); *H04W 72/23* (2023.01); *H04W 80/02* (2013.01)

(58) Field of Classification Search
CPC .......... H04W 72/1263; H04W 72/042; H04W 72/0446; H04W 80/02; H04W 72/126;
(Continued)

(56) References Cited

U.S. PATENT DOCUMENTS 9,729,295 B2   8/2017  Zhang et al.
2011/0244800 A1  10/2011  Bogestam et al.
(Continued)

FOREIGN PATENT DOCUMENTS

EP        3955502 A1    2/2022
WO   WO-2020089865 A1    5/2020
(Continued)

OTHER PUBLICATIONS

International Search Report and Written Opinion—PCT/US2022/033581—ISA/EPO—Nov. 2, 2022.

*Primary Examiner* — Wei Zhao
(74) *Attorney, Agent, or Firm* — Holland & Hart LLP

(57) ABSTRACT

Methods, systems, and devices for wireless communications are described. A user equipment (UE) receives control signaling from the base station indicating a set of transmission mode indicators or transmission mode options and a set of demodulation reference signal (DMRS) configurations for every transmission mode from a set of transmission modes. The base station transmits additional control signaling to dynamically indicate a transmission mode or a combination of transmission mode indicators and DMRS configuration parameters to signal the transmission mode and one or more associated DMRS configurations. The UE identifies a DMRS configuration and a transmission mode based on the additional control signaling. The UE receives one or more DMRSs from multiple transmission reception points (TRPs) based on the joint/disjoint DMRS and transmission mode signaling. The UE receives one or more data messages from the TRPs based on the transmission mode indication and based on the received DMRSs.

30 Claims, 19 Drawing Sheets

(51) Int. Cl.
    *H04W 72/23*       (2023.01)
    *H04L 5/00*         (2006.01)
    *H04W 72/0446*   (2023.01)
    *H04W 80/02*      (2009.01)

(58) Field of Classification Search
    CPC ....... H04L 1/0025; H04L 5/10; H04L 5/0051; H04L 5/0094; H04L 1/002
    See application file for complete search history.

(56) References Cited

U.S. PATENT DOCUMENTS

| | | | |
|---|---|---|---|
| 2012/0213196 A1* | 8/2012 | Chung | H04L 5/0007 370/336 |
| 2019/0386769 A1 | 12/2019 | Liu et al. | |
| 2020/0314881 A1* | 10/2020 | Bagheri | H04L 5/0051 |
| 2020/0396047 A1* | 12/2020 | Gao | H04L 5/0051 |
| 2021/0091915 A1 | 3/2021 | Khoshnevisan et al. | |

FOREIGN PATENT DOCUMENTS

| | | |
|---|---|---|
| WO | WO-2020222606 A1 | 11/2020 |
| WO | WO-2020225692 A1 | 11/2020 |

* cited by examiner

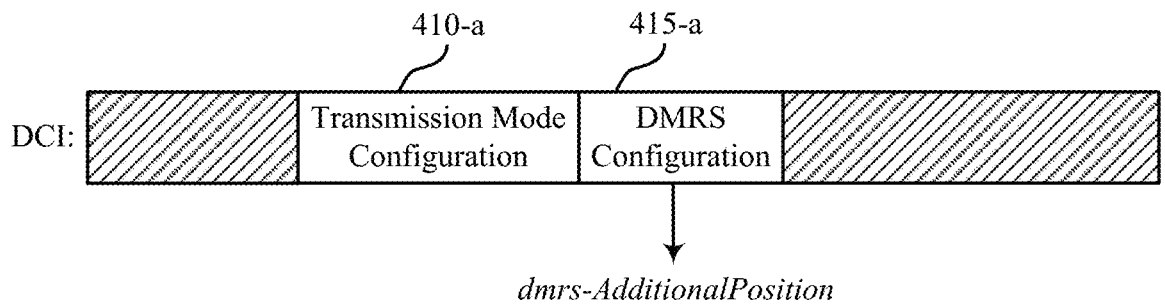
FIG. 4A
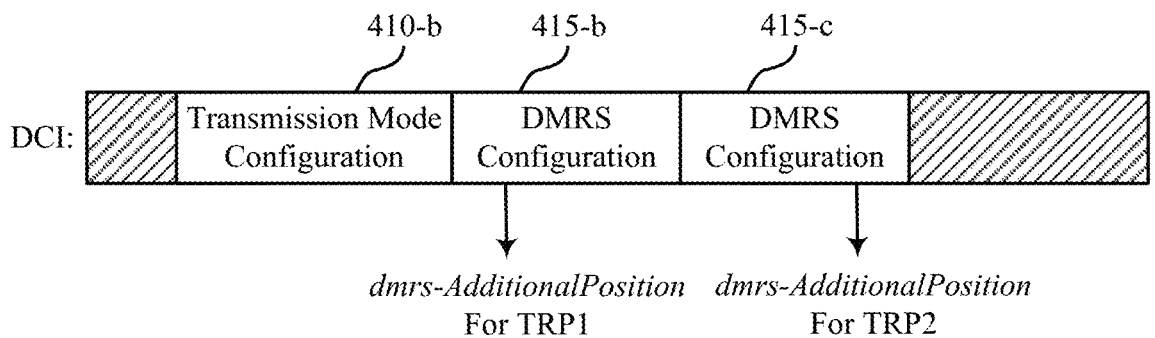
FIG. 4B
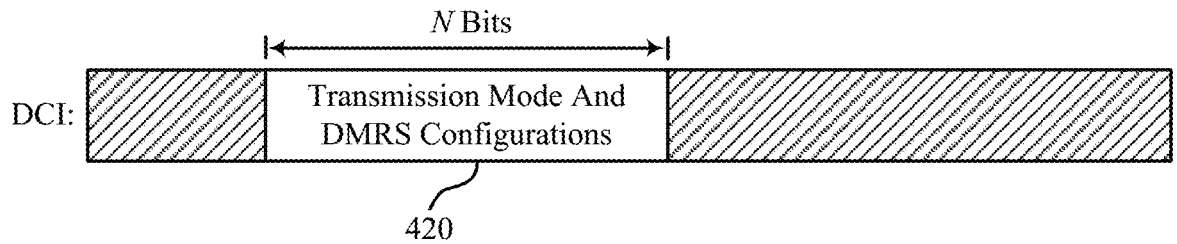
FIG. 4C
 Additional DCI Field(s) 405

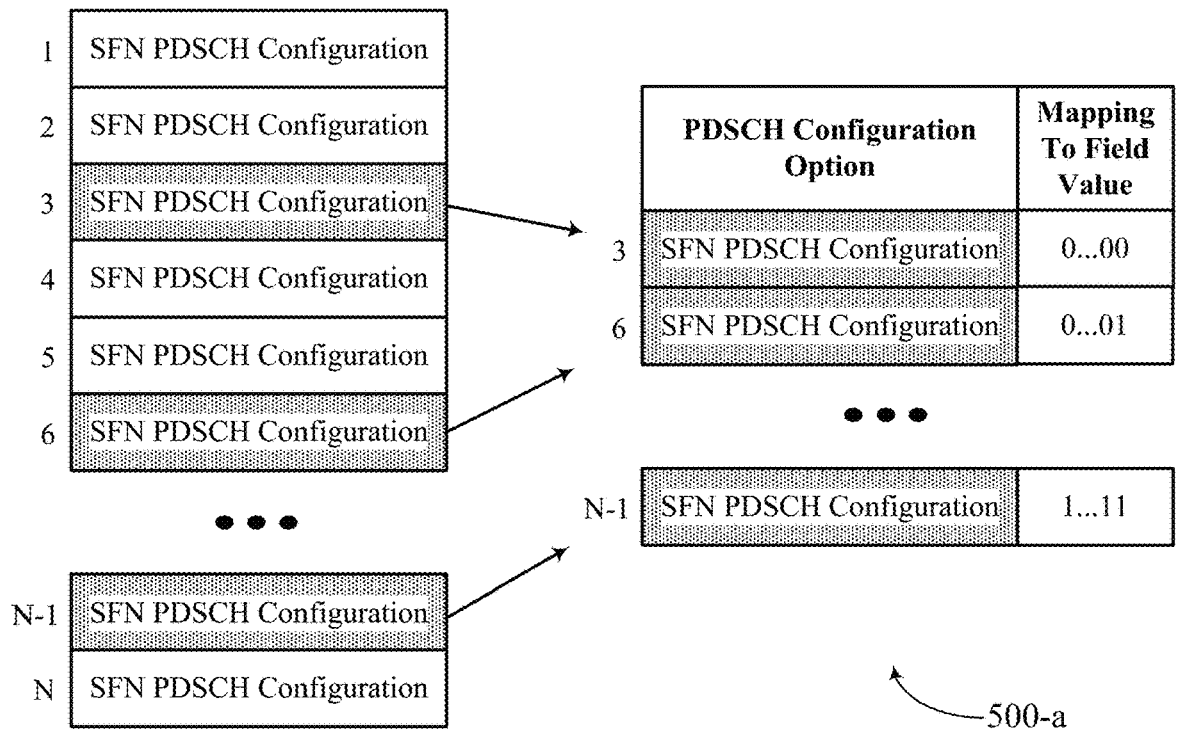
FIG. 5A
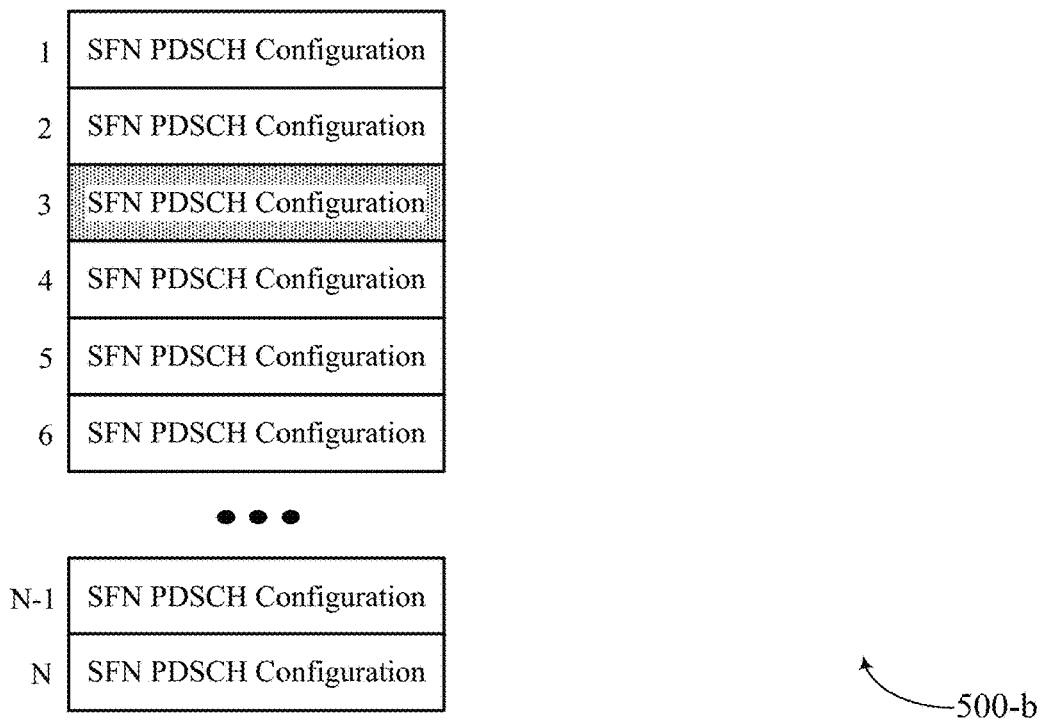
FIG. 5B
 Activated Transmission Mode Configuration 505

CONFIGURATION SIGNALING OF DEMODULATION REFERENCE SIGNAL AND TRANSMISSION MODE

FIELD OF TECHNOLOGY

The present disclosure relates to wireless communications, including configuration signaling of demodulation reference signal (DMRS) and of transmission mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support configuration signaling of demodulation reference signal and transmission mode. Generally, the described techniques provide for a user equipment (UE) and a base station to perform joint dynamic signaling of a demodulation reference signal (DMRS) configuration and a transmission mode indication. The UE may receive radio resource control (RRC) signaling from the base station indicating a set of transmission mode indicators or transmission mode options and a set of DMRS configurations corresponding to each one of the transmission modes from a set of transmission modes. In some examples, the base station may transmit additional control signaling to indicate a transmission mode or a combination of transmission mode indicators and DMRS configuration parameters to signal one or more DMRS configurations coupled to or jointly with the transmission mode. The base station may transmit the information in control signaling dynamically, such as via a medium access control-control element (MAC-CE), a downlink control information (DCI) message, or the like. The UE may identify a DMRS configuration and a transmission mode based on the additional control signaling. In some cases, the UE may receive one or more DMRSs from multiple transmission reception points (TRPs) based on the joint DMRS configuration and transmission mode configuration. The UE may use the transmission mode indicated in the joint DMRS configuration and transmission mode configuration to receive one or more data messages from the TRPs transmitted using the indicated transmission mode. The UE may demodulate and decode the data messages based on, or assisted by, the received one or more DMRSs depending on the transmission mode or scenario.

A method for wireless communication at a UE is described. The method may include receiving, from a base station, first control signaling identifying a set of transmission mode indicators or transmission mode options and a set of corresponding DMRS configurations associated with each transmission mode of a set of transmission modes, the set of transmission modes to be addressed by a UE receiver to receive one or more data messages from multiple TRPs, receiving second control signaling indicating a transmission mode of the set of transmission modes or a combination of transmission mode indicators and a combination of one or more DMRS configuration parameters to signal one or more DMRS configurations corresponding to the indicated transmission mode, identifying, based on the transmission mode indicators and the one or more DMRS configuration parameters, at least one DMRS configuration of the set of DMRS configurations and the transmission mode of the set of transmission modes, receiving one or more DMRSs from the multiple TRPs according to the identified at least one DMRS configuration, and receiving, from the multiple TRPs, the one or more data messages based on the indicated transmission mode and the received one or more DMRSs.

An apparatus for wireless communication at a UE is described. The apparatus may include a processor, memory coupled with the processor, and instructions stored in the memory. The instructions may be executable by the processor to cause the apparatus to receive, from a base station, first control signaling identifying a set of transmission mode indicators or transmission mode options and a set of corresponding DMRS configurations associated with each transmission mode of a set of transmission modes, the set of transmission modes to be addressed by a UE receiver to receive one or more data messages from multiple TRPs, receive second control signaling indicating a transmission mode of the set of transmission modes or a combination of transmission mode indicators and a combination of one or more DMRS configuration parameters to signal one or more DMRS configurations corresponding to the indicated transmission mode, identify, based on the transmission mode indicators and the one or more DMRS configuration parameters, at least one DMRS configuration of the set of DMRS configurations and the transmission mode of the set of transmission modes, receive one or more DMRSs from the multiple TRPs according to the identified at least one DMRS configuration, and receive, from the multiple TRPs, the one or more data messages based on the indicated transmission mode and the received one or more DMRSs.

Another apparatus for wireless communication at a UE is described. The apparatus may include means for receiving, from a base station, first control signaling identifying a set of transmission mode indicators or transmission mode options and a set of corresponding DMRS configurations associated with each transmission mode of a set of transmission modes, the set of transmission modes to be addressed by a UE receiver to receive one or more data messages from multiple TRPs, means for receiving second control signaling indicating a transmission mode of the set of transmission modes or a combination of transmission mode indicators and a combination of one or more DMRS configuration parameters to signal one or more DMRS configurations corresponding to the indicated transmission mode, means for identifying, based on the transmission mode indicators and the one or more DMRS configuration parameters, at least one DMRS configuration of the set of DMRS configurations and the transmission mode of the set of transmission modes, means for receiving one or more DMRSs from the multiple TRPs according to the identified at least one DMRS configuration, and means for receiving, from the multiple TRPs, the one or more data messages based on the indicated transmission mode and the received one or more DMRSs.

A non-transitory computer-readable medium storing code for wireless communication at a UE is described. The code may include instructions executable by a processor to receive, from a base station, first control signaling identifying a set of transmission mode indicators or transmission mode options and a set of corresponding DMRS configurations associated with each transmission mode of a set of transmission modes, the set of transmission modes to be addressed by a UE receiver to receive one or more data messages from multiple TRPs, receive second control signaling indicating a transmission mode of the set of transmission modes or a combination of transmission mode indicators and a combination of one or more DMRS configuration parameters to signal one or more DMRS configurations corresponding to the indicated transmission mode, identify, based on the transmission mode indicators and the one or more DMRS configuration parameters, at least one DMRS configuration of the set of DMRS configurations and the transmission mode of the set of transmission modes, receive one or more DMRSs from the multiple TRPs according to the identified at least one DMRS configuration, and receive, from the multiple TRPs, the one or more data messages based on the indicated transmission mode and the received one or more DMRSs.

In some examples of the method, apparatuses, and non-transitory computer-readable medium described herein, receiving the second control signaling may include operations, features, means, or instructions for receiving a control message that includes an indication of the at least one DMRS configuration and the transmission mode and switching to the transmission mode based on receiving the control message that includes the indication, where receiving the one or more DMRSs may be based on the received second control message.

In some examples of the method, apparatuses, and non-transitory computer-readable medium described herein, receiving the second control signaling may include operations, features, means, or instructions for receiving a control message including an index of the at least one DMRS configuration in the set of DMRS configurations and the transmission mode.

In some examples of the method, apparatuses, and non-transitory computer-readable medium described herein, identifying the at least one DMRS configuration of the set of DMRS configurations may include operations, features, means, or instructions for identifying, based on the combination of transmission mode indicators or the transmission mode and the one or more DMRS configuration parameters, a first DMRS configuration and a second DMRS configuration of the set of DMRS configurations, the first DMRS configuration associated with a first TRP of the multiple TRPs, and the second DMRS configuration associated with a second TRP of the multiple TRPs.

In some examples of the method, apparatuses, and non-transitory computer-readable medium described herein, receiving the second control signaling may include operations, features, means, or instructions for receiving a MAC-CE indicating a set of combinations of the one or more DMRS configurations or corresponding parameters in combination with transmission mode indicators or a corresponding transmission mode indication and receiving a DCI message including an indication of the at least one DMRS configuration and the transmission mode out of the set of combinations indicated by the MAC-CE.

Some examples of the method, apparatuses, and non-transitory computer-readable medium described herein may further include operations, features, means, or instructions for transmitting, to the base station, a message including capability information corresponding to a maximum number of simultaneously addressed DMRS configurations per physical downlink shared channel allocation and a list of physical downlink shared channel transmission modes supported by the UE and determining a length of one or more fields of a DCI message indicating the at least one DMRS configuration and the transmission mode based on transmitting the message, receiving the first control signaling, receiving the second control signaling, or any combination thereof.

In some examples of the method, apparatuses, and non-transitory computer-readable medium described herein, receiving the second control signaling may include operations, features, means, or instructions for receiving a DCI message including one or more fields indicating the at least one DMRS configuration and the transmission mode.

In some examples of the method, apparatuses, and non-transitory computer-readable medium described herein, the one or more fields include a first field for the at least one DMRS configuration and a second field for the transmission mode.

In some examples of the method, apparatuses, and non-transitory computer-readable medium described herein, the one or more fields include a first field for a first configuration of the at least one DMRS configuration that corresponds to a first TRP of the multiple TRPs, a second field for a second configuration of the at least one DMRS configuration that corresponds to a second TRP of the multiple TRPs, and a third field corresponding to the transmission mode.

In some examples of the method, apparatuses, and non-transitory computer-readable medium described herein, the one or more fields include a field for a joint signaling of the at least one DMRS configuration and the transmission mode.

In some examples of the method, apparatuses, and non-transitory computer-readable medium described herein, the first control signaling includes RRC signaling indicating a downlink configuration candidate table and the method, apparatuses, and non-transitory computer-readable medium may include further operations, features, means, or instructions for receiving a MAC-CE activating a set of multiple downlink configurations from the downlink configuration candidate table and receiving a DCI message indicating a downlink configuration from the set of multiple downlink configurations activated by the MAC-CE for an associated data message of the one or more data messages.

Some examples of the method, apparatuses, and non-transitory computer-readable medium described herein may further include operations, features, means, or instructions for receiving, before receiving the MAC-CE activating the set of multiple downlink configurations, the one or more data messages from the multiple TRPs according to a default or a pre-determined or configured by a regular RRC configuration transmission mode and DMRS configuration.

In some examples of the method, apparatuses, and non-transitory computer-readable medium described herein, receiving the first control signaling may include operations, features, means, or instructions for receiving RRC signaling configuring a list of one or more downlink configuration options based on a capability of the UE to support the list of the one or more downlink configuration options, where one or more downlink configuration options can be activated based on a MAC-CE, where the second control signaling includes the MAC-CE and each downlink configuration option of the one or more downlink configuration options may be a combination of a transmission mode or a set of transmission parameters identifying the transmission mode and a set of one or more DMRS configuration parameters associated with a corresponding transmission mode.

Some examples of the method, apparatuses, and non-transitory computer-readable medium described herein may further include operations, features, means, or instructions for receiving, based on the received one or more DMRSs, the one or more data messages from a first TRP and a second TRP based on the transmission mode indicated by the received control signaling.

In some examples of the method, apparatuses, and non-transitory computer-readable medium described herein, the one or more DMRS configuration parameters include a number of additional DMRS symbol locations.

A method for wireless communication at a base station is described. The method may include transmitting, to a UE, first control signaling identifying a set of transmission mode indicators or transmission mode options and a set of corresponding DMRS configurations associated with each transmission mode of a set of transmission modes, the set of transmission modes to be addressed by a UE receiver to receive one or more data messages from multiple TRPs, transmitting second control signaling indicating a transmission mode of the set of transmission modes or a combination of transmission mode indicators and a combination of one or more DMRS configuration parameters to signal one or more DMRS configurations corresponding to the transmission mode, transmitting, in a downlink shared channel, one or more DMRSs from the multiple TRPs according to at least one DMRS configuration of the set of DMRS configurations and the indicated transmission mode of the set of transmission modes based on the transmission mode indicators and the one or more DMRS configuration parameters, and transmitting, via the multiple TRPs and in the downlink shared channel in which the one or more DMRSs are transmitted, the one or more data messages based on the indicated transmission mode.

An apparatus for wireless communication at a base station is described. The apparatus may include a processor, memory coupled with the processor, and instructions stored in the memory. The instructions may be executable by the processor to cause the apparatus to transmit, to a UE, first control signaling identifying a set of transmission mode indicators or transmission mode options and a set of corresponding DMRS configurations associated with each transmission mode of a set of transmission modes, the set of transmission modes to be addressed by a UE receiver to receive one or more data messages from multiple TRPs, transmit second control signaling indicating a transmission mode of the set of transmission modes or a combination of transmission mode indicators and a combination of one or more DMRS configuration parameters to signal one or more DMRS configurations corresponding to the transmission mode, transmit, in a downlink shared channel, one or more DMRSs from the multiple TRPs according to at least one DMRS configuration of the set of DMRS configurations and the indicated transmission mode of the set of transmission modes based on the transmission mode indicators and the one or more DMRS configuration parameters, and transmit, via the multiple TRPs and in the downlink shared channel in which the one or more DMRSs are transmitted, the one or more data messages based on the indicated transmission mode.

Another apparatus for wireless communication at a base station is described. The apparatus may include means for transmitting, to a UE, first control signaling identifying a set of transmission mode indicators or transmission mode options and a set of corresponding DMRS configurations associated with each transmission mode of a set of transmission modes, the set of transmission modes to be addressed by a UE receiver to receive one or more data messages from multiple TRPs, means for transmitting second control signaling indicating a transmission mode of the set of transmission modes or a combination of transmission mode indicators and a combination of one or more DMRS configuration parameters to signal one or more DMRS configurations corresponding to the transmission mode, means for transmitting, in a downlink shared channel, one or more DMRSs from the multiple TRPs according to at least one DMRS configuration of the set of DMRS configurations and the indicated transmission mode of the set of transmission modes based on the transmission mode indicators and the one or more DMRS configuration parameters, and means for transmitting, via the multiple TRPs and in the downlink shared channel in which the one or more DMRSs are transmitted, the one or more data messages based on the indicated transmission mode.

A non-transitory computer-readable medium storing code for wireless communication at a base station is described. The code may include instructions executable by a processor to transmit, to a UE, first control signaling identifying a set of transmission mode indicators or transmission mode options and a set of corresponding DMRS configurations associated with each transmission mode of a set of transmission modes, the set of transmission modes to be addressed by a UE receiver to receive one or more data messages from multiple TRPs, transmit second control signaling indicating a transmission mode of the set of transmission modes or a combination of transmission mode indicators and a combination of one or more DMRS configuration parameters to signal one or more DMRS configurations corresponding to the transmission mode, transmit, in a downlink shared channel, one or more DMRSs from the multiple TRPs according to at least one DMRS configuration of the set of DMRS configurations and the indicated transmission mode of the set of transmission modes based on the transmission mode indicators and the one or more DMRS configuration parameters, and transmit, via the multiple TRPs and in the downlink shared channel in which the one or more DMRSs are transmitted, the one or more data messages based on the indicated transmission mode.

In some examples of the method, apparatuses, and non-transitory computer-readable medium described herein, transmitting the second control signaling may include operations, features, means, or instructions for transmitting a control message that includes an indication of the at least one DMRS configuration and the transmission mode and switching to the transmission mode based on transmitting the control message that includes the indication, where transmitting the one or more DMRSs may be based on the transmitted second control message.

In some examples of the method, apparatuses, and non-transitory computer-readable medium described herein, transmitting the second control signaling may include operations, features, means, or instructions for transmitting a control message including an index of the at least one DMRS configuration in the set of DMRS configurations and the transmission mode.

In some examples of the method, apparatuses, and non-transitory computer-readable medium described herein, a first combination of transmission mode indicators or the transmission mode and the one or more DMRS configuration parameters indicate at least a first DMRS configuration and a second DMRS configuration of the set of DMRS configurations, the first DMRS configuration associated with a first TRP of the multiple TRPs, and the second DMRS configuration associated with a second TRP of the multiple TRPs.

In some examples of the method, apparatuses, and non-transitory computer-readable medium described herein, transmitting the second control signaling may include operations, features, means, or instructions for transmitting a MAC-CE indicating a set of combinations of the one or more DMRS configurations or corresponding parameters in combination with transmission mode indicators or a corresponding transmission mode indication and transmitting a DCI message including an indication of the one or more DMRS configurations and the transmission mode out of the set of combinations indicated by the MAC-CE.

Some examples of the method, apparatuses, and non-transitory computer-readable medium described herein may further include operations, features, means, or instructions for receiving, from the UE, a message including capability information corresponding to a maximum number of simultaneously addressed DMRS configurations per physical downlink shared channel allocation and a list of physical downlink shared channel transmission modes supported by the UE and determining a length of one or more fields of a DCI message indicating the at least one DMRS configuration and the transmission mode based on receiving the message, transmitting the first control signaling, transmitting the second control signaling, or any combination thereof.

In some examples of the method, apparatuses, and non-transitory computer-readable medium described herein, transmitting the second control signaling may include operations, features, means, or instructions for transmitting a DCI message including one or more fields indicating the at least one DMRS configuration and the transmission mode.

In some examples of the method, apparatuses, and non-transitory computer-readable medium described herein, the first control signaling includes RRC signaling indicating a downlink configuration candidate table and the method, apparatuses, and non-transitory computer-readable medium may include further operations, features, means, or instructions for transmitting a MAC-CE activating a set of multiple downlink configurations from the downlink configuration candidate table and transmitting a DCI message indicating a downlink configuration from the set of multiple downlink configurations activated by the MAC-CE for an associated data message of the one or more data messages.

In some examples of the method, apparatuses, and non-transitory computer-readable medium described herein, transmitting the first control signaling may include operations, features, means, or instructions for transmitting RRC signaling configuring a list of one or more downlink configuration options based on a capability of the UE to support the list of the one or more downlink configuration options, where one or more downlink configuration options can be activated based on a MAC-CE, where the second control signaling includes the MAC-CE and each downlink configuration option of the one or more downlink configuration options may be a combination of a transmission mode or a set of transmission parameters identifying the transmission mode and a set of one or more DMRS configuration parameters associated with a corresponding transmission mode.

In some examples of the method, apparatuses, and non-transitory computer-readable medium described herein, the one or more DMRS configuration parameters include a number of additional DMRS symbol locations.

BRIEF DESCRIPTION OF THE DRAWINGS

FIGS. 4A through 4C illustrate examples of resource diagrams that support dynamic configuration signaling of DMRS and transmission mode in accordance with aspects of the present disclosure.

FIGS. 5A and 5B illustrate examples of configuration diagrams that support dynamic configuration signaling of DMRS and transmission mode in accordance with aspects of the present disclosure.

DETAILED DESCRIPTION

Figure 1:
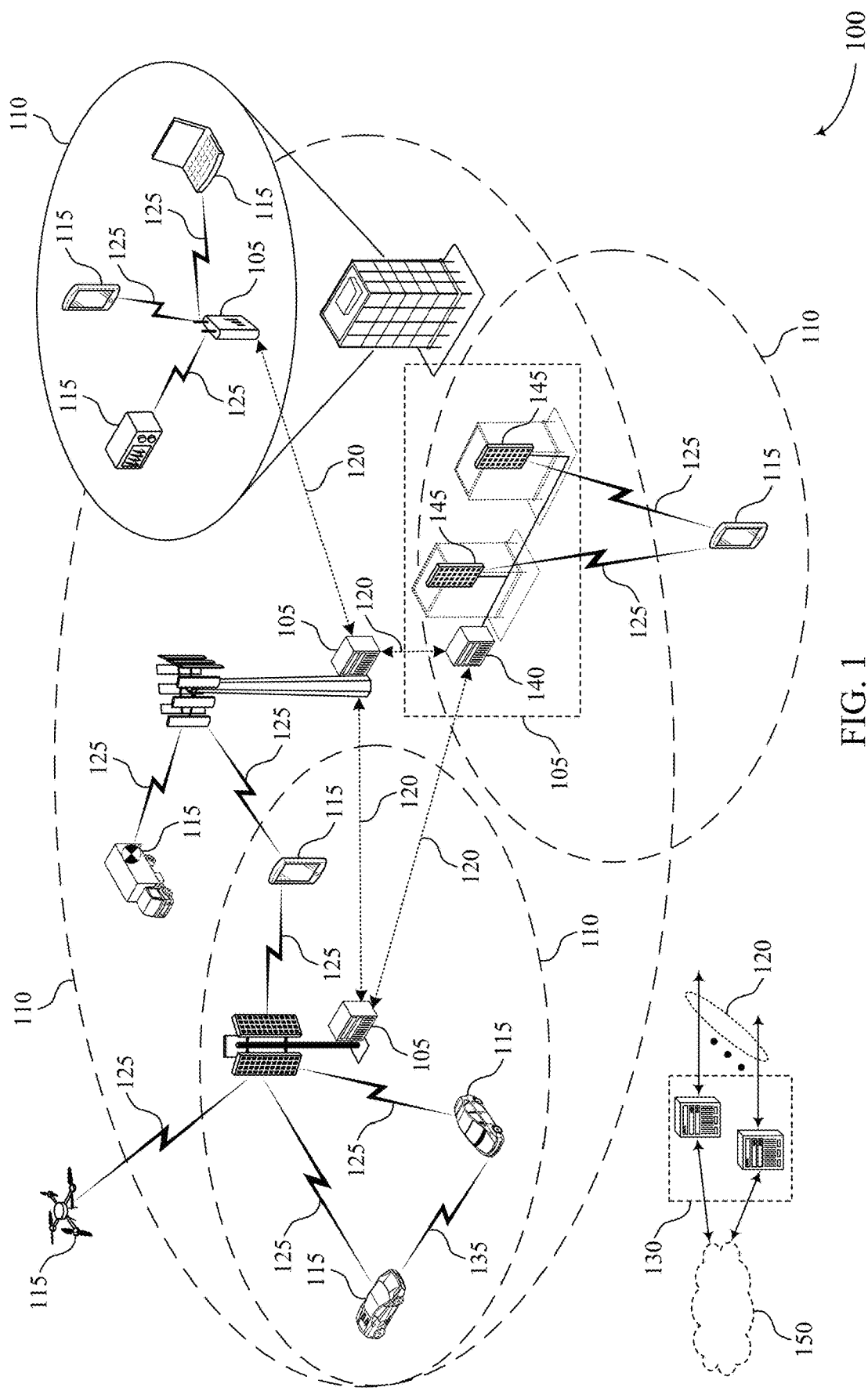
FIGS. 1 and 2 illustrates examples of wireless communications systems that support dynamic configuration signaling of demodulation reference signal (DMRS) and transmission mode in accordance with aspects of the present disclosure.

In some wireless communications systems, a user equipment (UE) may communicate with other devices, such as transmission and reception points (TRPs), using different communication schemes to increase spectral efficiency or reliability of downlink transmissions. For example, a UE may communicate with TRPs using time division multiplexing (TDM), frequency division multiplexing (FDM), or spatial division multiplexing (SDM) communication schemes or based on dynamic TRP switching. The UE may additionally or alternatively implement a single frequency network (SFN) communication scheme with or without Doppler shift pre-compensation in which a transmission signal may be simultaneously transmitted on a same resources over multiple beams or channels from different TRPs (e.g., for a high speed train (HST) scenario). The UE may transmit reference signals establish or otherwise support data communications with the TRPs. In some cases, a TRP or a base station may dynamically configure (or reconfigure) a demodulation reference signal (DMRS) to be assumed for PDSCH reception at the UE, such as by transmitting the corresponding control signaling that dynamically conveys DMRS configuration or reconfiguration. Dynamic DMRS configuration signaling may allow DMRS configuration adaptation to a single TRP or multi-TRP channel and reception conditions. DMRS adaptation may be performed per transmission mode or between dynamically switched transmission modes. An RRC configured DMRS may become outdated (e.g., or not optimally defined) as channel or reception conditions that the UE experiences change or may be not aligned with the switched transmission mode (e.g., which may change the equivalent channel characteristics), which may cause inefficient communication or a limited communication quality between the UE and one or more TRPs.

As described herein, a UE may receive an RRC configuration for a set of transmission mode options and a set of DMRS configurations with possible associations between them after establishing a connection with a base station. The UE may receive a dynamic transmission mode and DMRS configuration indication or signaling from the set of RRC configured transmission modes and DMRS configuration options based on medium access control-control element (MAC-CE) or downlink control information (DCI) message dynamically indicating, configuring, or activating a transmission mode (e.g., TDM, SDM, FDM, or SFN mode with or without Doppler shift pre-compensation) and a corresponding DMRS configuration. The UE may use the indicated transmission mode to receive data messages from multiple TRPs. In some examples, the adjustment of a DMRS configuration may include one or more parameters, for example an additional DMRS position parameter (dmrs-AdditionalPosition) for one or more DMRS configurations used on the UE side per transmission mode, per TRP, or both, which may depend on the transmission mode option, channel characteristics, reception SNR, UE speed, UE location, or the like.

If the control signaling is a MAC-CE, the base station may dynamically activate, switch, or reconfigure a combination of a transmission mode and the corresponding one or more DMRS configurations. In some cases, each DMRS configuration may be described using one or more different DMRS parameters. For example, the MAC-CE may switch, activate, or reactivate a configuration bundle defined by the RRC configuration. Since the base station provides the RRC configuration once and the MAC-CE based signaling addresses a specific combination of one or more indices (e.g., rather than configuration parameters explicitly), the DMRS configuration may be defined according to a relatively long list of parameters. In some examples, such as if a DCI message addresses explicit DMRS parameter signaling, the UE may use minimum parameters to reduce overhead related to the DCI message. In some cases, such as for DCI based signaling of a joint combination of transmission mode and DMRS configuration, a base station may signal a combination index from a defined list of transmission mode and DMRS configuration options. The base station may provide the DMRS configuration in terms of multiple DMRS parameters.

If the control signaling is based on a DCI message with a specific DCI field having a limited length, DMRS reconfiguration signaling may be performed in terms of relatively critical DMRS parameters (e.g., some minimum list of configuration options), and in this case, the base station may dynamically signal the additional DMRS position parameter for each TRP or a single parameter for both TRPs, corresponding to the transmission mode indicated for each resource allocation for the data messages. The base station may include the DMRS and the transmission mode parameters in one or more fields of the DCI message. In some cases, whether the UE uses more than one DMRS configuration simultaneously per allocation (e.g., a different DMRS configuration per TRP) and receives corresponding DCI based signaling of more than one DMRS configuration per allocation may be based on a UE capability. The UE may receive one or more DMRSs from the TRPs according to the indicated DMRS configuration or configurations.

Although reference is made to SFN schemes herein, the discussed techniques may be also be referred to as single frequency communication schemes, or be or use other communication schemes that use a single frequency signal to communicate with (transmit to or receive from) multiple transmitters.

Aspects of the disclosure are initially described in the context of wireless communications systems. Aspects of the disclosure are further described in the context of communication scheme diagrams, resource diagrams, configuration diagrams, and a process flow. Aspects of the disclosure are further illustrated by and described with reference to apparatus diagrams, system diagrams, and flowcharts that relate to dynamic configuration signaling of demodulation reference signal and transmission mode.

FIG. 1 illustrates an example of a wireless communications system 100 that supports dynamic configuration signaling of demodulation reference signal and transmission mode in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, TRPs, base stations 105, or both may communicate with one or more UEs 115 using a communication scheme, such as an SDM scheme, an FDM scheme, a TDM scheme, or a combination. In some examples, multiple TRPs may perform joint transmissions to the UE 115 using an SFN scheme, which may also be referred to as a single frequency communication scheme and is described in more detail with respect to FIG. 3. The SFN scheme based transmission in downlink may be with or without Doppler shift pre-compensation. In some examples, the UE 115 may use an SFN scheme if the UE 115 has relatively high mobility, such as in an HST scenario. A wireless communications system 100 may support the transmission of reference signals (e.g., DMRSs) to increase an efficiency and a reliability of communications between wireless devices. A reference signal may be transmitted over communication resources in accordance with a reference signal configuration. A base station 105 may determine configurations for the different reference signals. For example, a base station 105 may select a DMRS configuration for a UE 115 and may signal the selected DMRS configuration to a UE 115 using control signaling, such as RRC signaling. In some examples, the UE 115 may be RRC configured with a fixed pilot pattern for a DMRS that is based on a DMRS type, a number of DMRS positions, and other DMRS and allocation parameters. The RRC configured DMRS may become outdated (e.g., not aligned with the current channel characteristics and reception conditions) as channel or reception conditions that the UE 115 experiences change or may not be aligned with the switched transmission mode (e.g., which may change the equivalent channel characteristics). That is, the DMRS configuration may indicate a surplus of pilots (e.g., excessive DMRS density in time or frequency) or the pilot configuration may not allocate a sufficient number of pilots (e.g., too low DMRS density), which may cause an increased channel estimation error or an increased DMRS overhead and, as a result, inefficient communication between the UE 115 and one or more TRPs. Further, the DMRS configuration and transmission mode related to the transmission scheme may be configured independently or may be addressed using some joint configuration that assumes a specific combinations of transmission modes and the corresponding DMRS configuration options.

In some examples, a UE 115 and a base station 105 may support joint dynamic signaling of a DMRS configuration and a transmission mode indication (e.g., HST-SFN transmission mode indication or multi TRP transmission mode in general). In some cases, the UE 115 may receive RRC signaling from the base station 105 indicating a set of transmission mode indicators or transmission mode options and a set of DMRS configurations corresponding to each of the transmission modes from a set of transmission modes. In some cases, the UE 115 may indicate a capability to support joint dynamic signaling of a DMRS configuration and a transmission mode indication or option to the base station 105. In some examples, the base station 105 may transmit additional control signaling based on the capability signaling. The additional control signaling may dynamically indicate a transmission mode or a combination of transmission mode indicators and DMRS configuration parameters to signal one or more DMRS configurations coupled to or jointly with the transmission mode. The base station 105 may transmit the information in control signaling dynamically, such as via a MAC-CE, a DCI message, or a combination of them or the like.

In some examples, the UE 115 may identify a DMRS configuration and a transmission mode based on the additional control signaling. The UE 115 may receive one or more DMRSs from multiple TRPs based on the joint DMRS configuration or signaling and transmission mode configuration or signaling. The UE 115 may use the transmission mode indicated in the joint DMRS configuration and transmission mode configuration to receive one or more data messages from the TRPs transmitted using the indicated transmission mode. The UE 115 may demodulate and decode the data messages based on or assisted by the received one or more DMRSs depending on the transmission mode or scenario.

Figure 2:
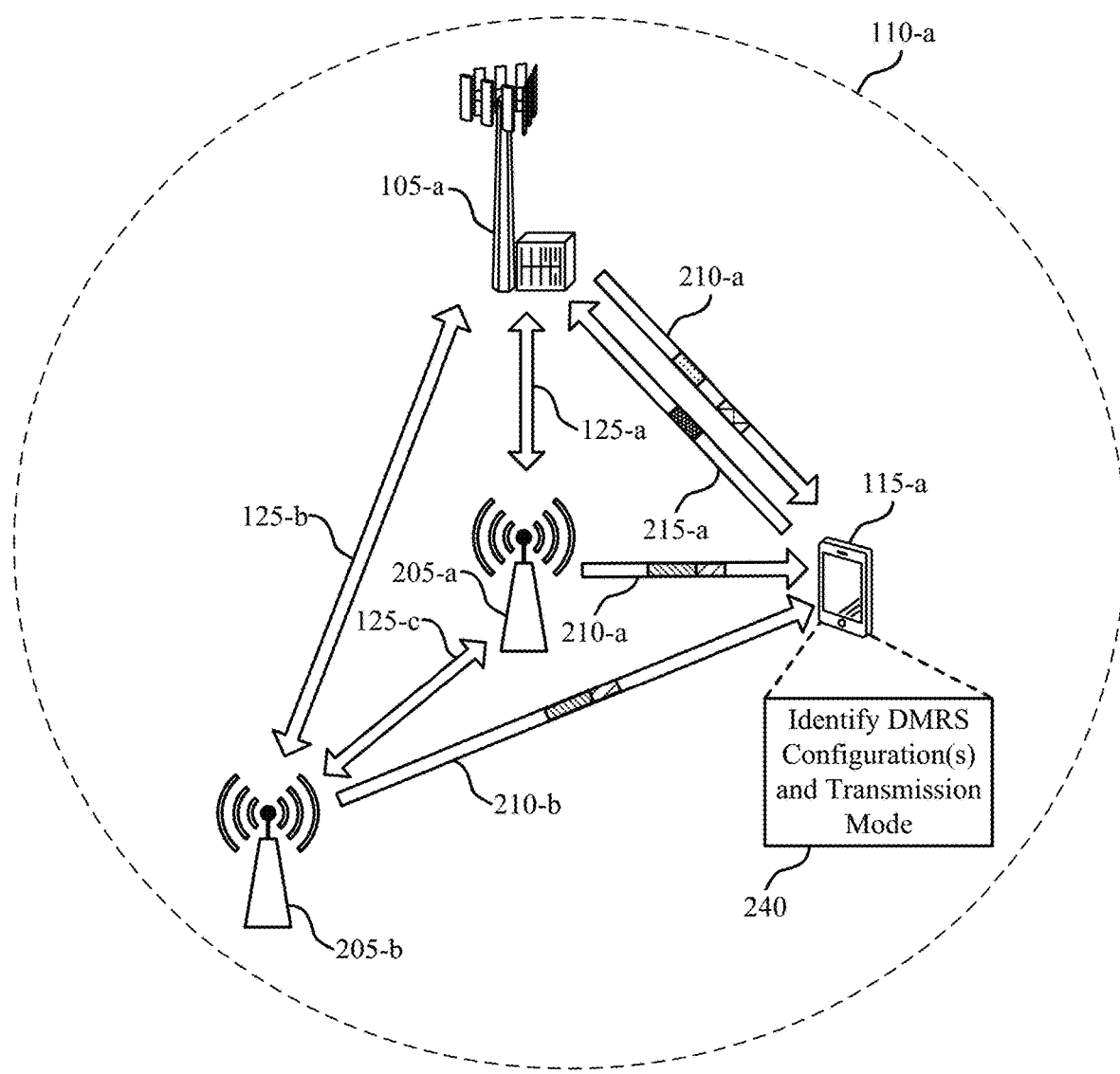

FIG. 2 illustrates an example of a wireless communications system 200 that supports dynamic configuration signaling of DMRS and transmission mode in accordance with aspects of the present disclosure. In some examples, the wireless communications system 200 may implement aspects of the wireless communications system 100 and may include UE 115-a, communication link 125-a through communication link 125-c, and base station 105-a with coverage area 110-a, which may be examples of a UE 115, communication links 125, and a base station 105 with a coverage area 110 as described with reference to FIG. 1. In some cases, the base station 105 may communicate directly with one or more UEs 115 via a downlink communication link 210, an uplink communication link 215, or both. For example, base station 105-a may transmit data or control signaling to UE 115-a via downlink communication link 210-a, and UE 115-a may transmit data or control signaling to base station 105-a via uplink communication link 215-a. In some other cases, the base station 105 may use one or more TRPs 205 to transmit or relay data or control signaling to the UEs 115.

In some examples, one or more TRPs 205, such as TRP 205-a, TRP 205-b, or both, may be operating as a base station 105, a network node, or both. A TRP 205 may relay signals between UE 115-a and base station 105-a via a communication link 125 between base station 105-a and the TRP 205 and a downlink communication link 210 between the TRP 205 and UE 115-a. For example, TRP 205-a may relay data or control signaling from base station 105-a to UE 115-a via communication link 125-a and downlink communication link 210-b. Similarly, TRP 205-b may relay data or control signaling from base station 105-a to UE 115-a via communication link 125-b and downlink communication link 210-b. Additionally or alternatively, the TRPs 205 may relay information from UE 115-a to base station 105-a via an uplink communication link 215, communication links 125, or both. In some examples, the TRPs 205, such as TRP 205-a, TRP 205-b, or both, may independently transmit or receive signals from UE 115-a (e.g., via a downlink communication link 210, an uplink communication link 215, or both). In some cases, UE 115-a may receive an indication of a transmission mode and associated DMRS configuration from base station 105-a via dynamic or semi-dynamic control signaling, such as a DCI message or a MAC-CE.

In some examples, TRPs 205, base stations 105, or both may communicate with one or more UEs 115 using a communication scheme, such as an SDM scheme, an FDM scheme, a TDM scheme, or a combination. The TRPs 205 may coordinate a transmission of a downlink channel (e.g., a physical downlink shared channel (PDSCH), a physical downlink control channel (PDCCH), or both), an uplink channel (e.g., a physical uplink shared channel (PUSCH), a physical uplink control channel (PUCCH), or both). For example, an SDM scheme may involve TRP 205-a and TRP 205-b performing a joint transmission over a same resource (e.g., over a same set of resource elements and OFDM symbols) based on transmitting different layers, such as spatial layers, with different transmission configuration indication (TCI) states. Additionally or alternatively, an FDM scheme may involve TRP 205-a and TRP 205-b performing the joint transmissions over different frequency resources and overlapping time resources, such as over different sets of resource elements but over a same set of OFDM symbols, based on transmitting different sets of frequency-domain resources (e.g., resource elements) with different TCI states. In some examples of a TDM scheme, TRP 205-a and TRP 205-b may perform the joint transmissions over different time resources and overlapping frequency resources, such as over different sets of OFDM symbols and overlapping set of resource elements, based on transmitting different sets of time-domain resources (e.g., OFDM symbols, slots, or minislots) with different TCI states.

In some examples, TRP 205-a and TRP 205-b may perform joint transmissions to UE 115-a using an SFN scheme, which may also be referred to as a single frequency communication scheme. The SFN scheme may be a type of multi-TRP or single-TRP communication scheme in which a downlink communication link 210 between a TRP 205 and a UE 115 and a downlink portion of a communication link 125 between the TRP 205 and the base station 105 may include the same frequency bands or channel. For example, TRP 205-a and TRP 205-b may transmit a same transmission over the same downlink communication link 210 according to an SDM scheme, an FDM scheme, a TDM scheme, an SFN scheme, or the like, where the downlink transmission is associated with two or more TCI states corresponding to the two or more TRPs 205. In other words, the downlink communication link 210 may be or be part of an "SFNed" downlink communication link. TRP 205-a and TRP 205-b may perform joint transmissions to UE 115-a according to various types of SFN communication schemes, such as an SFN communication scheme 0, an SFN communication scheme 1, or an SFN communication scheme 2, which is described in further detail with respect to FIG. 3. Receiving UE 115-a may use macro diversity or frequency diversity gain to assist in receiving signals from the multiple spatially dispersed TRPs 205. In some cases, one or more TRPs 205 configured to use SFN may use beamforming to transmit a signal over one or more beams and may alternatively or additionally transmit a signal in an area, direction, or both. In some examples, the UE 115 may use an SFN scheme if the UE 115 has relatively high mobility, such as in an HST scenario. Further, SFN communications may be useful for some service types, such as broadcast or multicast services.

In some examples, the framework of the SDM scheme and the SFN scheme may be unified such that the UE 115 may support the combined SDM and SFN scheme. For example, the UE 115 may communicate signaling using an SDM scheme or an SFN scheme based on DMRS ports and TCI states. The UE 115 may have multiple DMRS ports, each DMRS port configured with one or more TCI states. The UE 115 may use an SFN scheme or SDM scheme for communications across multiple TCI states simultaneously using one or more CDM groups for DMRS ports related to different TRPs. For example, for an SDM scheme, the UE 115 may have a DMRS Port 0 and Port 1 associated with TCI states 1 corresponding to the first TRP and to the first CDM group and a DMRS Port 2 and 3 associated with TCI states 2 corresponding to the second TRP and to the second CDM group. The UE 115 may apply an SFN scheme to communications across TCI states 1 and 2, which may be referred to as SFNed layer 0 and SFNed layer 1 if two layers transmission is used. The UE 115 may also use an SDM scheme for PDSCH communications using DMRS ports associated with different TRPs/TCIs and allocated on the corresponding different CDM groups (e.g., DMRS Port 0, for SDM layer 0, and DMRS Port 2, for SDM layer 1). In some other examples, the UE 115 may have a DMRS Port 0 configured with TCI state 1 and DMRS ports 2 configured with TCI state 2, and a DMRS port 1 or/and 3 configured with TCI state 1 and 2. The UE 115 may apply an SFN scheme to simultaneously communications across TCI states 1 and 2 associated with DMRS Ports 1 or/and 3. The UE 115 may use an SDM scheme for communications using DMRS Port 0, DMRS Port 2,).

In some examples, a network (e.g., including one or more TRPs 205, a base station 105, one or more UEs 115, or a combination) may support multi-TRP communication, single-TRP communication, or both. For example, as illustrated in wireless communications system 200, TRP 205-a, TRP 205-b, or both may perform a joint transmission (e.g., multi-TCI or multi-TRP transmission) and signaling to UE 115-a, may independently communicate with UE 115-a (e.g., may perform a non-joint transmission or single TCI or TRP based transmission), or both. In some examples of multi-TRP communication, the TRPs 205 may communicate with the one or more UEs 115 using different communication schemes (e.g., the SDM, FDM, TDM, multi-TRP scheme, or one of the SFN schemes with or without Doppler shift pre-compensation or a single TRP/TCI based transmission with dynamic transmission point switching) to increase spectral efficiency. Two or more transmission scheme options or the corresponding transmission modes may be switched dynamically by the network depending on network loading, UE location, channel conditions, UE speed, UE type and other factors.

A wireless communications system 200 may support the transmission of reference signals to increase an efficiency and a reliability of communications between wireless devices (e.g., a base station 105 and a UE 115). Reference signals may be transmitted from a base station 105 to a UE 115, and vice versa. Reference signals transmitted to a UE 115 may be referred to as downlink reference signal and reference signals transmitted to a base station 105 may be referred to as uplink reference signals. Reference signals may be used by the wireless devices to determine characteristics of a channel. The characteristics of a channel may also be referred to as a channel estimate or channel conditions or channel metrics. Reference signals may include channel state information-reference signal (CSI-RS), downlink DMRS, uplink DMRS, sounding reference signal (SRS), tracking reference signal (TRS), and phase tracking reference signal (PTRS).

A wireless communications system 200 may also support the reporting of information about a channel determined using reference signals. A UE 115 may use CSI-RS to determine preferred (e.g., optimal) transmission parameters for a channel, such as a preferred precoding matrix, rank, and/or modulation coding scheme (MCS). The UE 115 may determine a preferred transmission parameter based on determining that a transmission parameter will maximize a link efficiency metric (e.g., a spectral efficiency metric), based on a post-processing signal quality ratio (e.g., post-processing signal to interface plus noise ratio (SINR)) and the corresponding estimated spectral efficiency for a channel, or both. The UE 115 may indicate the preferred transmission parameters to a base station 105 in a channel state feedback (CSF) report (which may also be referred to as a channel state information (CSI) report) that may have different formats and may include a precoding matrix indicator (PMI) field that conveys a PMI, a rank indicator (RI) field that conveys an RI, a strongest layer indicator (SLI) field that conveys an SLI; and a channel quality indicator (CQI) field that conveys a CQI. The base station 105 may use the PMI and RI to determine a precoding matrix and rank to use for subsequent transmissions and the CQI to determine an MCS for subsequent transmission.

A UE 115 may use a CSI-RS transmission to determine a channel estimate that is used to assist in link adaptation—e.g., by assisting in the adaptation of transmission parameters. The channel estimate may be used to determine a signal quality ratio (e.g., post-processing signal-to-noise ratio (SNR) or post-processing SINR) for the channel, a delay spread ($\tau_{rms}$) for the channel or a classification of the channel (or channel type), a precoding matrix to use for communications over the channel, a rank to use for communications over the channel, or any combination thereof. A downlink DMRS transmission may also be used by a UE 115 to determine a data channel estimate that may be used to demodulate and decode transmissions received in a data channel. The channel estimate determined using the CSI-RS transmission (e.g., non-precoded reference signal with a 1D or a single symbol allocation pattern per CSI-RS port) may be different than the channel estimate determined using the downlink DMRS transmission (e.g., a precoded reference signal with a 2D allocation pattern per DMRS port). Thus, a downlink DMRS may be transmitted using resources that are associated with data resources allocated to a UE 115. A TRS transmission may be used by a UE 115 for synchronization loops and for determination of mid and long-term characteristics of a channel, such as a Doppler frequency or Doppler shift and Doppler spread or time correlation of the channel, delay spread, and power delay profile and SNR per transmission point.

An uplink DMRS may be used by a base station 105 to determine a channel estimate for an uplink channel between the base station and a UE 115 that transmitted the uplink DMRS (e.g., so the base station 105 can perform coherent demodulation of the PUCCH and the PUSCH). For example, each scheduled PUCCH and PUSCH may have its own DMRS, which may assist the base station 105 with demodulation and decoding. The uplink SRS may be used by a base station 105 for uplink link adaption, uplink transmission parameter selection, uplink channel characteristics estimation like delay spread, Doppler shift and Doppler spread or time correlation of the channel, uplink channel SNR and other uplink measurements, among other uses. In some examples, an uplink SRS may be used by a base station 105 to determine the uplink channel quality over a wide bandwidth so that the base station 105 can perform frequency-selective scheduling for the UE 115 that transmitted the uplink SRS.

A reference signal may be transmitted over communication resources in accordance with a reference signal configuration. A reference signal configuration may indicate which resource elements are allocated to a reference signal transmission—a resource element allocated to a transmission of a reference signal may be referred to as a pilot resource element. A group of resource elements (e.g., contiguous or noncontiguous resource elements) within a symbol period allocated to a transmission of a reference signal may be referred to as a pilot symbol. In some cases, a reference signal configuration explicitly or implicitly indicates a temporal spacing ($D_t$) between resource elements allocated to a reference signal; a frequency spacing ($D_f$) between resource elements allocated to a reference signal; and a power boosting parameter ($\rho_p$) that indicates a power for transmitting the reference signal resource element relative to a power for transmitting a data resource element. Different reference signal configurations may be associated with different combinations of temporal spacing or time domain pattern, frequency spacing or frequency domain pattern, and power boosting—e.g., a first reference signal configuration may be associated with a first temporal spacing or pattern, a first frequency spacing or pattern, and a first power boosting, a second reference signal configuration may be associated with the second temporal spacing or pattern, the second frequency spacing or pattern, and a second power boosting, and so on.

A base station 105 may determine configurations for the different reference signals. In some cases, a base station 105 determines a downlink or uplink DMRS configuration for a UE 115 by selecting the DMRS configuration from a limited or predefined set of DMRS configurations. The base station 105 may then signal the selected DMRS configuration to a UE 115 using control signaling or a configuration, such as RRC, DCI based, or MAC-CE based configuration signaling. In some examples, the UE 115 may be semi statically RRC configured with a pilot pattern for a DMRS 220 that is defined by a DMRS type parameter, a number of DMRS positions parameter, and other DMRS or allocation related parameters. In some examples, a DMRS configuration per allocation may be done as a combination of explicit and implicit configuration. An explicit part may include DMRS type, the number of DMRS locations, first DMRS symbol location and the max number of DMRS symbols per location configuration. The explicit part of DMRS configuration may be RRC configured. An implicit part of the configuration may include predetermined DMRS symbols locations (time pattern) given the configured for DMRS RRC parameters while the locations are indicated implicitly depending among the rest on a combination of PDSCH mapping type (A or B) plus PDSCH allocation duration (symbols) which are signaled in the allocating (scheduling) DCI. A DMRS spacing in time, or a time domain DMRS pattern, may be based on a predetermined DMRS locations for a combination of a PDSCH and PUSCH mapping type and a PDSCH and PUSCH allocation duration in symbol time units (which may be signaled in a DCI message) and other DMRS or PDSCH and PUSCH related parameters. DMRS boosting may be predefined and fixed for some DCI types and RNTI combinations, and for other cases may be signaled by the allocating/scheduling DCI. In some examples, power boosting for a DMRS 220 may be determined based on a DMRS type and number of CDM groups that may not convey data. An accuracy of a channel estimate depends on a level of correlation of a channel in time and frequency, input SNR on DMRS resource elements and DMRS configuration or pattern. Channel parameters and SNR conditions may be different for different UEs 115 and may also vary in time. Thus, different DMRS configurations may be used to maximize a spectral efficiency of a link for different channel and SNR conditions.

In some examples, the UE 115 may select a DMRS configuration option using spectral efficiency maximization criteria per given channel characteristics, such as $\tau_{rms}$, Doppler characteristics of the channel ($f_D$), and input (thermal) SNR ($SNR_{in}$). The UE 115 may determine SINR values for each available downlink DMRS configuration candidate. In some examples, the UE 115 may determine a preferred downlink DMRS configuration of the downlink DMRS configurations that maximized a communication efficiency metric for the channel. For example, the UE 115 may determine the downlink DMRS configuration that maximizes spectral efficiency for the channel based on Equation 1:

$$\operatorname*{argmax}_{i=1:N}\left(N_{RE\_data}(DMRS\_i) \cdot \sum_{l=1:R} C_{QAM}(\overline{\gamma}_l(DMRS\_i))\right)$$

where $C_{QAM}$ may be the constrained capacity function for a maximal allowed modulation order (e.g., for a quadrature amplitude modulation (QAM) order or any other non-square constellation) that gives the estimated spectral efficiency per resource element per layer; $N_{RE\_data}$ may be the number of data resource elements per resource allocation (or per resource block across the assumed number of OFDM symbols); DMRS_i may be the downlink DMRS configuration candidate defined by a combination of parameters ($D_t$, $D_f$, SNR($\rho_p$)); and $\overline{\gamma}_l(\gamma_{DMRS\_i})$ may be the average post-processing SINR per layer l for a corresponding downlink DMRS configuration DMRS_i. $N_{RE\_data}$ may be a function of $D_t$ and $D_f$ (or the corresponding DMRS overhead) of the corresponding downlink DMRS configuration DMRS_i.

A result of Equation 1 may output an argument k that results in a largest value for the equation inside of the outermost (largest) set of parenthesis shown in Equation 1. The argument k that corresponds to the largest value may also correspond to the kth downlink DMRS configuration candidate DMRS_k. In some cases, two downlink DMRS configurations that have the same SINR value may result in different outcomes for the equation inside of the outermost set of parenthesis shown in Equation 1—e.g., the one of the two downlink DMRS configurations that uses additional resource elements may result in a smaller value. For similar reasons, a downlink DMRS configuration that has a larger SINR may result in a smaller value than a downlink DMRS configuration that has a smaller SINR. Similar equations may be used to determine which of the downlink DMRS configurations will maximize other communication metrics for a channel.

In some examples, a UE 115 may assist in DMRS adaptation in downlink. That is, the DMRS selection for downlink may be performed by the UE 115 as a part of downlink communication link 210 adaptation procedures based on CSI-RS processing, DMRS processing, or both. In some examples, $f_d$, $\tau_{rms}$, and $SNR_{in}$ corresponding to the effective downlink channel characteristics may be estimated based on a TRS, a CSI-RS, a DMRS, or a combination thereof.

In some other examples, the UE 115 may receive dynamic signaling of a DMRS configuration in downlink, uplink, or both for a single TRP 205. For example, the UE 115 may perform MAC-CE based activation and complementary DCI based selection of one of the activated DMRS options. A base station 105 or other network entity may configure a number of DMRS configurations, such as in a DMRS configuration table, to be addressed in downlink (e.g., via RRC signaling). The DMRS configuration may account for network scheduling patterns or preferences and UE capabilities. Several DMRS configurations from the configured table may be activated by MAC-CE (synchronous, short latency). Reactivation may be done dynamically and may follow long term DMRS adaptation process. The activated DMRS options may be addressed as a code points for complementary DCI based selection (e.g., with a new DCI field, DCI type, DCI format, or a combination thereof). For each allocation, the scheduling DCI may select or otherwise signal one of the activated DMRS options. Usage of different activated DMRS options for different allocations may allow a higher flexibility for the network scheduler and an increased level of adaptation for different scheduling scenarios (e.g., slot based or mini slot based scheduling, MU-MIMO scenarios, PDSCH and downlink reference signal or other downlink logical channels multiplexing). The UE 115 may use a default predefined DMRS configuration option before entering a connected mode and before a first activation of a DMRS configuration option.

In some cases, the UE 115 may activate a single DMRS configuration that is signaled by MAC-CE. For example, one of the RRC configured DMRS configuration options (e.g., from the DMRS configurations table) may be dynamically activated or selected by the base station 105 or network entity using MAC-CE signaling (synchronous, short latency). Dynamic reactivation may follow the DMRS adaptation process. The base station 105 and the UE 115 may use the activated DMRS configuration option until re-selection or re-activation of another option (e.g., with no additional DCI based signaling).

In some examples, the UE 115 may perform a two-step DMRS adaptation procedure. The periodic or semi persistent CSF report may carry a DMRS configuration change request. In some cases, the reported CSF may be consistent with a DMRS configuration determined or used on the CSI reference slot. The DMRS configuration change request may trigger an extended aperiodic CSF and DMRS report scheduling. The CSF provided in the CSF and DMRS report may be consistent with one or more of the selected or reported DMRS options. In some cases, the network may suggest or configure multiple extensions for aperiodic CSF and DMRS reporting. For example, the multiple extensions may be per sub-band, per transport block (TB), per TRP 205 or per code-division multiplexing (CDM) group, per transmission mode (e.g., single TRP or multi-TRP, non-SFN, such as SDM, TDM, FDM, or multi-TRP schemes, SFN multi-TRP scheme 0, 1 or 2, with or without Doppler pre-compensation, etc.).

In some examples, a base station 105 or other network entity may control a list of DMRS hypotheses. The base station 105 may configure a UE 115 with a list of DMRS options to be addressed in DMRS selection and reporting (e.g., according to network scheduler preferences). An extended aperiodic DMRS and CSF report may be dynamically re-configured through CSI-RS trigger state options, which may include new configuration fields. In some examples, the UE 115 may select a preferred DMRS configuration 220 as part of CSF evaluation. For example, the UE 115 may average SINR across resource elements per stream (e.g., for a selected PMI, RI hypotheses) according to Equation 2:

$$\overline{\gamma_l}(p) = \frac{1}{N_{alloc}} \sum_{k=1}^{k=N_{alloc}} f(\hat{\gamma}(p, k, l))$$

where p is a selected PMI(RI) option, l is the stream index (l=1, . . . , RI), k is the resource element index, and f( ) is an optional transformation weighting applied to $\hat{\gamma}(p, k, l)$ prior to taking the average. Once the SINR is averaged, the UE 115 may perform a CSI-RS post processing SINR mapping to corresponding DMRS post processing SINR equivalents (e.g., performed per layer). For example, the post processing SINR mapping may be from one pilot configuration option to another given channel characteristics. Finally, the UE 115 may perform DMRS configuration option selection using a modified spectral efficiency maximization criteria according to Equation 1 (e.g., per group of layers, CDM, TRP 205, TB, transmission mode, transmission scheme, or a combination thereof).

In some examples, a UE 115 may receive a fixed RRC configured DMRS parameters from a base station 105. For example, a DMRS configuration per allocation may be performed as a combination of explicit and implicit configuration. The explicit part of the configuration may include the main DMRS parameters, such as DMRS type, number of DMRS locations, first DMRS symbol location, and the maximum number of DMRS symbols per location, which may be RRC configured. The implicit part of the configuration may include predetermined DMRS symbols locations (e.g., time pattern) given the configured DMRS RRC parameters that are defined implicitly by a combination of PDSCH mapping type (e.g., A or B), PDSCH duration (e.g., in symbols) and other parameters which may be signaled implicitly in the allocating DCI. In some cases, DMRS resource element boosting may be predefined and fixed for some DCI types, radio network temporary identifier (RNTI) combinations, or both, or may be signaled implicitly by the allocating DCI based on implicitly signaled number of CDM groups without data.

In some cases, RRC reconfiguration may be a nonsynchronous mechanism that involves several hundreds of milliseconds (ms) of latency for reconfiguration. During the reconfiguration period there may be an uncertainty on the base station 105 or network side regarding the currently addressed UE side configuration. For this reason, there may not be a practical way to convey RRC reconfiguration (e.g., DMRS adaptation) without introducing link interruption. Channel estimation accuracy may depend on the level of correlation of the channel in time and frequency, working SNR point of a UE 115, and on the pilot grid option (e.g., used for chest 2D plot grid). Channel parameters and SNR conditions may be different per UE 115 and may vary in time depending on channel scenario, UE type and allocation scenario, such as HST scenario or non-HST scenario, whether the UE 115 is static or mobile, whether the UE 115 is relatively close to the base station 105 or residing at a cell edge (e.g., the edge of coverage area 110-a), a single TRP or multi-TRP transmission with a different transmission mode option and with or without Doppler pre-compensation, and other factors. Different channel and SNR conditions and transmission mode options and scenarios may use different pilot configuration options in order to maximize spectral efficiency of a link per UE 115. Using fixed DMRS configuration at the base station 105 may cause a trade off from the network in advance between average pilots overhead and the performance of the UE 115. Thus, extra resource elements may be wasted for unnecessary pilots, in some cases, while in other cases UE performance may be floored due to improper pilot configuration.

In some examples, a UE 115 and base station may adopt an adaptive DMRS approach with UE-assisted DMRS selection and dynamic signaling of DMRS configuration per allocation or per some time period. An HST-SFN scenario that assumes multi TRP based transmission in SFN manner to a UE having a high mobility may be associated with extreme channel conditions that may be difficult to perform channel estimation for. The UE 115 and the network may use transmission techniques including SFN transmission scheme 1 and SFN transmission scheme 2 with and without Doppler shift pre-compensation. These techniques may be added to a portfolio of available options for the HST scenario, such as dynamic transmission point switching (DPS) technique with a single TRP based transmission, transparent SFN transmission with a transparent multi TRP transmission (e.g., SFN scheme 0), a multi TRP transmission with SDMFDM, TDM, or a combination thereof. The different techniques may cause different equivalent Doppler spread and Delay spread characteristics from the perspective of a UE receiver per UE location and UE speed scenario. Correspondingly, it may be beneficial to use a different DMRS configuration for similar SNR conditions, UE speed, and multi-TRP channel realization but with different transmission techniques.

In some cases, the UE 115 and the base station 105 may assume different HST-SFN techniques may be employed dynamically depending on UE location (e.g., between the two closest TRPs 205), UE type (e.g., a customer premises equipment (CPE) mounted on the train, a pedestrian UE 115 on the train, or a UE 115 on the station), channel conditions, network loading, applicability of a Doppler shift pre-compensation and its accuracy, as well as other factors. The dynamic usage of different HST-SFN techniques may bring an additional potential or value for DMRS adaptation in addition to a basic concept of adaptive DMRS selection as a function of channel characteristics and SNR for a transmission technique (e.g., a single TRP transmission in sub 6 GHz). In some examples, the UE 115, the base station 105, or both may use an extension of a dynamic signaling approach for joint signaling of DMRS 220 with a variety of transmission techniques suggested for HST-SFN scenarios. For example, the base station 105 may transmit a joint MAC-CE based dynamic signaling of DMRS configuration and HST-SFN transmission mode indicators or a joint DCI based signaling of DMRS configuration and HST-SFN transmission mode indication to enable DMRS adaptation in conjunction with a variety of dynamically switched HST-SFN transmission modes. The UE 115 and base station 105 may perform joint MAC-CE based or DCI based dynamic signaling for DMRS adaptation with a multi-TRP transmission scenario or a single TRP transmission mode.

In some examples, the network, such as the base station 105, one or more TRPs 205, or the UE 115, may apply a doppler shift pre-compensation for each TRP 205 or for one of the TRPs 205 based on Doppler shift signaling by a UE 115 per TRP 205. The UE 115 may measure the Doppler shift based on a corresponding TRS and may indicate the measured Doppler shift explicitly (e.g., via Doppler shift reporting) or implicitly (e.g., based on an SRS transmission performed based on the estimated Doppler shifts per TRP 205) to the network. Pre-compensation may be applied to one of the TRPs 205 such that the Doppler shift associated with the TRP 205 on the receiver side may equal a Doppler shift of another TRP 205. In some cases, a pre-compensation mode may be enabled or disabled dynamically depending on Doppler shift measurements accuracy, network or UE mismatches, continuous Doppler shift pre-compensation ability, UE location, channel conditions, TRS or SRS overhead, etc. For example, a DCI or MAC-CE signaling may enable or disable pre-compensation dynamically.

In some examples, the base station 105, the one or more TRPs 205, or the UE 115 may dynamically switch between an SFN transmission scheme and a DPS scheme or an SDM, FDM, or TDM transmission scheme. For example, the switching may be performed based on DCI or MAC-CE signaling. In some cases, the network may use the dynamic switching of transmission mode (e.g., SFN, DPS, SDM) depending on network loading, UE location, channel conditions, whether the UE 115 is on the train or on the station, or a combination thereof. Different transmission scheme options may be associated with different DMRS configurations. The preferred DMRS option per transmission scheme or transmission mode may vary in time depending on UE speed, UE location, and channel conditions. In some cases, multiple (e.g., two) different DMRS configurations may be addressed simultaneously for different TRPs 205.

In some cases, a DMRS configuration preference may be associated with an HST-SFN transmission scheme (e.g., scheme 1) with and without Doppler shift pre-compensation because of a different equivalent Doppler spread of a resulting SFN channel on DMRS ports. In some examples, a non-compensated HST-SFN case and pre-compensated HST-SFN case may be considered as two different scenarios for DMRS adaptation. Each case may be associated with a different DMRS configuration option for a similar scenario of HST-SFN geometry and similar channel and reception condition characteristics. Different preferred (e.g., optimal) DMRS configurations may be observed for scenarios with and without pre-compensation. In some cases, without pre-compensation DMRS configuration preference may vary depending on UE speed, location, and SNR because of SFN channel characteristics dynamics related to a "breathing" Doppler spectrum and power delay profile. In some other cases, a with pre-compensation multi-TRP SFN channel may be translated to a single TRP channel equivalent at list in terms of Doppler spectrum or Doppler spread and DMRS preference for the channel may have a relatively low dependence on UE speed and location.

In some cases, for an HST-SFN transmission scheme with accurate Doppler shift pre-compensation, for a CDL channel type with a strong LOS component, DMRS patterns with one or two DMRS symbols may be a preferred choice. In some other cases, for non-pre-compensated HST-SFN transmission schemes, a preferred DMRS configuration choice may vary between patterns with two, three, and four DMRS symbols depending on UE speed, UE location, and SNR per TRP. In some examples, DMRS preference without Doppler shift pre-compensation may have a relatively strong dependence on UE speed and UE location and may be expected to change quickly for the HST-SFN scenario. In some cases, the network may assume UE assisted DMRS reporting with relatively high reporting rate. Additionally or alternatively, the network may assume that the network may manage a DMRS pattern selection based on UE speed, a Doppler shift indication from a UE 115 per TRP 205, UE location, and operational downlink MCS. DMRS preference with accurate pre-compensation may have a relatively weak dependence (e.g., no dependence) on UE speed and location. However, the HST-SFN transmission scheme (e.g., scheme 1) scenario with Doppler shift pre-compensation may be sensitive to pre-compensation accuracy, such as accuracy and level of persistence of the indicated Doppler shifts. Non ideal and variable accuracy may introduce dynamics in preferred DMRS pattern selection for the scenario as well. Thus, UE assisted DMRS adaptation may be beneficial also for HST-SFN transmission scheme 1 with pre-compensation.

In some examples, for HST-SFN transmission scheme 1, a TRS may be transmitted in TRP-specific or a non-SFN manner. A DMRS 220 and PDSCH from TRPs 205 may be transmitted in an SFN manner. Each DMRS port may have two TCI states (e.g., a quasi-colocation (QCL) configuration or assumption may be with TRSs from multiple TRPs 205) and may experience a combined SFN channel. In some cases, there may be a different time-domain correlation for a DMRS 220 with and without pre-compensation. For example, without pre-compensation, the time domain correlation (or the equivalent Doppler spread of the SFN channel per DMRS port) may be a function of UE speed and UE location between TRPs 205. In some other examples, with accurate pre-compensation, the time domain correlation may not depend on UE speed and UE location relative to TRPs 205 since SFN channel may be translated to a single TRP channel equivalent in terms of time correlation and Doppler spread per DMRS port (e.g., CDL channel type with two dominant channel impulse response (CIR) taps with a similar or the same Doppler shift assuming that each TRP has CDL channel type with a strong LOS component).

In some cases, each TRP 205 may be associated with a different DMRS configuration preference, such as a different Doppler spread, delay spread, and SNR per TRP 205 in an HST-SFN transmission scheme (e.g., scheme 2). Multiple DMRS configuration options (e.g., two) may be used simultaneously for DMRS ports associated with different TRPs. With a CDL channel model and a LOS assumption (e.g., if the UE is a train mounted CPE), the DMRS preference per TRP 205 may be similar between TRPs 205 and may have a relatively slow or weak dependence on UE speed and UE location relative to the TRP 205. However, in case of a channel profile with a relatively less dominant line of sight (LOS) (e.g., a pedestrian UE on the train) or non-LOS (NLOS) channel type, DMRS preference per TRP 205 may be different and DMRS reselection may be more dynamic. Different DMRS patterns may release, or free, some portion of resource elements for data allocation. Otherwise, relatively denser DMRS preferences between TRPs 205 may be used for both TRPs 205).

In some examples, for HST-SFN transmission scheme 2, a TRS and a DMRS 220 may be transmitted in TRP-specific or a non-SFN manner. The PDSCH from TRPs 205 may be transmitted in SFN manner. Each DMRS port may be transmitted by a single TRP 205 and may have a TCI state corresponding to the TRP 205. The DMRS ports associated with each TRP 205 may be transmitted on different CDM groups (e.g., Ports of a TRP 205 on different CDM groups, such as Port 0 and Port 1 of TRP 205-*a* on a first CDM and Port 2 and Port 3 of TRP 205-*b* on a second CDM). Each DMRS port may experience a channel associated with a single corresponding TRP 205. In some cases, there may be different time domain correlation for DMRSs on different CDM groups (e.g., for different TRPs 205). In some cases, such as for scheme 2 or any other case with a non SFN transmission of DMRS, the effective time domain correlation for a DMRS 220 (or for a channel interpolation in time per DMRS port) may be the same with and without pre-compensation (e.g., assuming that the corresponding carrier frequency offset (CFO) or Doppler shift may be estimated based on a DMRS 220 or a TRS or SSB associated with the corresponding TRP and may be removed prior to channel time interpolation operation, such that the effective time correlation of DMRS ports may not be sensitive to any non-pre-compensated Doppler shift). Thus, in some cases, the time correlation for a DMRS 220 may not depend or almost not depend on UE speed and UE location between TRPs 205 (assuming CDL channel with a dominant LOS component per TRP 205).

In some examples, for a DPS transmission scheme, each TRP 205 may be associated with a different DMRS configuration preference, such as a different Doppler spread, delay spread, and SNR per TRP 205. With a CDL channel model and a LOS assumption (e.g., if the UE is a train mounted CPE), a DMRS preference per TRP 205 may be similar between TRPs 205 and may have a relatively weak dependence on UE speed and UE location relative to the TRP 205. Thus, the DMRS preferences per TRP 205 may be similar to the DMRS preference for a same TRP 205 as with HST-SFN transmission scheme 2 or any other scheme with a non SFN type of transmission of DMRS ports (e.g., single TRP channel is experienced per DMRS port and the same channel and SNR characteristics for the corresponding DMRS or TRP 205 may be assumed even if a different transmission schemes are applied). Dynamic switching between HST-SFN transmission scheme 2 and DPS may rely on the same DMRS configuration preference per TRP 205. In some cases, for dynamic switching between HST-SFN transmission scheme 1 and DPS, a DMRS preference for DPS may be similar to a DMRS preference for HST-SFN transmission scheme 1 with pre-compensation (e.g., because pre-compensation translates an SFN channel into a single TRP channel equivalent).

In some cases, the DPS transmission scheme may include a single TRP 205 and a corresponding associated single TCI transmission (e.g., from a UE perspective). In some examples, a different TRP 205 may be used as an active transmitter of a downlink message to the UE 115 based on a UE location. A TRS, a DMRS, and PDSCH may be transmitted in TRP-specific or non-SFN manner. Each DMRS port may be transmitted by a TRP 205 and may experience channel associated with a TRP 205. In some cases, there may be a different time domain correlation or other channel characteristics for a DMRS 220 when transmitted from different TRPs 205 according to the DPS transmission scheme. Doppler shift may be addressed by an FTL on the UE side (e.g., for a single TRP 205). The time domain correlation for the DMRS 220 per TRP 205 may depend on UE speed and UE location between TRPs 205 assuming non near LOS channel type per TRP.

In some examples, for an SDM, FDM, or TDM transmission scheme, each TRP may be associated with a different DMRS configuration preference (e.g., a different Doppler spread, delay spread, and SNR per TRP 205). In some cases, multiple DMRS configuration options (e.g., two) may be used simultaneously for DMRS ports associated with different TRPs 205. Dynamic switching between an SDM transmission scheme and the HST-SFN transmission scheme 2 may rely on a same DMRS preference per TRP 205. In some cases, DMRS preferences per TRP 205 for an SDM transmission scheme may be close to a DMRS preference for HST-SFN transmission scheme 1 with pre-compensation. In the case of dynamic switching between two transmission schemes, a common DMRS preference may be assumed (e.g., with an accurate pre-compensation assumption).

In some cases, for the SDM transmission scheme, a TRS and a DMRS 220 may be transmitted in TRP-specific or non-SFN manner. A PDSCH from TRPs 205 may be transmitted in an SDM mode (e.g., a same continuous transmission in parallel on different spatial layers). Each DMRS port may be transmitted by a single corresponding TRP 205 and may have a single TCI state association corresponding to one of the TRPs 205. The DMRS ports associated with each TRP 205 may be transmitted on different CDM groups. Each DMRS port may experience a channel associated with a single TRP 205. In some cases, there may be a different time domain correlation or other channel characteristics and SNR for a DMRS 220 on different CDM groups (e.g., TRPs 205). The time domain correlation for a DMRS 220 within a CDM group may be the same with and without pre-compensation (e.g., assuming CFO estimation based on TRS/SSB or other non SFN pilot and its removal from the DMRS 220 prior to channel estimation and interpolation in time in case that Doppler shift pre-compensation is not employed). Time domain correlation for a DMRS may depend on a UE speed and a UE location between TRPs 205 assuming non near LOS channel type per TRP 205.

In some cases, a TRP 205 or a base station 105 may transmit a DMRS configuration to the UE, such as by transmitting RRC signaling including an indication of the configuration. The semi statically configured DMRS may become outdated (or not optimally defined) as channel or reception conditions that the UE 115 experiences are changing or may not be aligned with the switched transmission mode, which may change equivalent channel characteristics. That is, the DMRS configuration may indicate a surplus of pilots or the pilot configuration may not allocate a sufficient number of pilots, which may cause inefficient communication or a reduced communication quality between the UE 115 and one or more TRPs 205.

In some examples, DMRS adaptation can be UE assisted, such that a UE 115 reports a DMRS configuration preference per transmission mode, per TRP 205 or both given the corresponding estimated channel characteristics and SNR per TRP 205. Additionally or alternatively, the network may manage a dynamic DMRS option selection per transmission mode and per TRP 205 based on UE speed, a Doppler shift indication from a UE 115 per TRP 205, UE location, operational downlink MCS, other channel measurements per TRP 205 based on SRS or a combination thereof. For example, base station 105-*a* may manage a dynamic DMRS option per transmission mode based on the speed of UE 115-*a*, the Doppler shift from UE 115-*a* for TRP 205-*a*, TRP 205-*b*, or both, the location of UE 115-*a*, the MCS that UE 115-*a* is using, or a combination thereof. Since different HST-SFN transmission modes may be associated with a different DMRS preference, and since HST-SFN transmission mode switching may be performed dynamically (e.g., via MAC-CE or DCI based transmission mode switching), the UE 115-*a* and base station 105-*a* may support joint dynamic signaling of a DMRS configuration and a transmission mode indication (e.g., HST-SFN transmission mode indication). In some examples, the dynamic signaling may involve transmitting the DMRS configuration and the transmission mode indication via a MAC-CE. In some other examples, the dynamic signaling may involve transmitting the DMRS configuration and the transmission mode indication via a DCI message.

In some examples, UE 115-*a* may receive control signaling 225-*a* from base station 105-*a* via downlink communication link 210-*a*. The control signaling 225-*a* may indicate a set of transmission mode indicators or transmission mode options and a set of DMRS configurations associated with each one of the transmission modes from a set of transmission modes. In some cases, control signaling 225-*a* may be RRC signaling or configuration that configures UE 115-*a* with the transmission mode indicators or transmission mode option and the set of a corresponding DMRS configurations. In some examples, the set of transmission modes may be addressed by a receiver of UE 115-*a* to receive one or more data messages 230 from multiple TRPs 205, such as TRP 205-*a* and TRP 205-*b*. The transmission modes set may include one or more transmission schemes, such as an SFN or HST-SFN transmission scheme 1 or 2 with or without Doppler pre-compensation, an FDM scheme, a TDM scheme, an SDM scheme, DPS, or the like. In some examples, UE 115-*a* may indicate a capability to support joint dynamic signaling of a DMRS configuration and a transmission mode indication or option to base station 105-*a*. In some cases, UE 115-*a* may indicate additional capability to support two different DMRS configurations or transmissions simultaneously for the same multi-TRP allocation while each one of the DMRS transmissions is performed by one of the involved TRPs 205. For example, UE 115-*a* may transmit capability information 235 to base station 105-*a* via uplink communication link 215-*a*, the capability information 235 indicating the capability to support joint dynamic signaling of transmission mode and of one or more DMRS configurations (e.g., via a MAC-CE or DCI message or a combination of both).

In some examples, once base station 105-*a* receives the capability information 235 from UE 115-*a*, base station 105-*a* may transmit additional control signaling 225-*b*. In some other examples, UE 115-*a* may not transmit the capability information 235, and base station 105-*a* may transmit control signaling 225-*b* independent of the capability information 235. Control signaling 225-*b* may indicate a transmission mode or a combination of transmission mode indicators and DMRS configuration parameters to signal one or more DMRS configurations for the indicated transmission mode. Base station 105-*b* may transmit the information in control signaling 225-*b* dynamically, such as via a MAC-CE, a DCI message, a combination, or the like. In some examples, at 240, UE 115-*a* may identify a DMRS configuration and a transmission mode based on control signaling 225-*b*. For example, UE 115-*a* may identify the DMRS configuration and the transmission mode based on the transmission mode indicator or indicators the DMRS configuration parameters, or both.

In some examples, UE 115-*a* may perform DMRS adaptation with transmission mode switching based on identifying the indicated DMRS configuration and the transmission mode. For example, the corresponding or preferred DMRS configuration for a specific transmission mode (e.g., HST-SFN transmission mode) may be switched together with transmission mode switching as a bundle based on control signaling 225-*b*, which may be a same MAC-CE. UE 115-*a* may perform DMRS adaptation in time also with a fixed transmission mode (not switched). For example, each transmission mode (e.g., HST-SFN transmission mode) may be associated with a set of DMRS configuration options. Thus, each transmission mode may have a list of defined or configured DMRS and transmission mode bundles. One of the bundles may be dynamically reactivated (e.g., exchanged) to allow for DMRS adaptation in time for a varying channel and reception conditions even with a fixed transmission mode. In some examples, a DMRS preference at UE 115-*a* may change without a change in transmission mode, which may allow DMRS adaptation in time with a dynamic DMRS signaling.

In some other examples, control signaling 225-*b* may dynamically indicate a joint DMRS configuration and transmission mode (e.g., an HST-SFN transmission mode with or without pre-compensation or SDM or single TRP 205) indication via a DCI message. The control signaling 225-*b* may indicate the joint DMRS configuration and transmission mode on a slot basis. The joint DCI based signaling of the DMRS configuration and the transmission mode indication may reduce a number of bits in the one or more corresponding DCI fields. For example, the reduction of the number of bits in the joint DMRS configuration and transmission mode field may be based on elimination of non-related DMRS options for different transmission modes (e.g., fewer combinations may be addressed).

In some examples, the DMRS configuration signaling per resource allocation may be performed as a combination of an explicit and implicit configuration. The explicit part of the configuration may be performed, in one example, using four RRC configured DMRS parameters, shown in Table 1. In other examples a subset of these parameters, alone or alone with other parameters may be used.

TABLE 1

| | DMRS parameter | DMRS parameter | DMRS parameter | DMRS parameter |
|---|---|---|---|---|
| RRC Parameter Name | dmrs-Type | dmrs-AdditionalPosition | maxLength | dmrs-TypeA-Position |
| Parameter Meaning | DMRS type A or B | Number of DMRS locations per allocation (1, 2, 3, or 4) | Max number of DMRS symbols per location (1 or 2) | First DMRS symbol location x for DMRS type A (x = 2 or 3), for DMRS type B (x = 0) |

In some examples, such as for an HST scenario, if the dmrs-AdditionalPosition RRC configured DMRS parameter is not selected properly per transmission mode, the downlink shared channel (e.g., PDSCH) performance may be degraded (e.g., according to a relatively strong channel estimation error component that may limit the effective post processing SINR). That is, the dmrs-AdditionalPosition selection may vary as a function of different transmission mode options, channel characteristics, UE speed, SNR, and UE location. In some cases, dynamic reconfiguration or signaling of dmrs-AdditionalPosition may improve link performance for different transmission scenarios (e.g., HST-SFN scenarios). Additionally or alternatively, it may be beneficial to dynamically change the other RRC configured DMRS parameters, which may provide additional flexibility for scheduling for dynamic switching of different transmission modes or scenarios, additional performance improvements, additional application of DMRS adaption, and the like. In some cases, such as if base station 105-a transmits control signaling 225-b (e.g., including the dynamic DMRS signaling) via a MAC-CE, the control signaling 225-b may address multiple of the DMRS parameters (e.g., dmrs-Type, dmrs-AdditionalPosition, maxLength, dmrs-TypeA-Position, or a combination thereof). In some other cases, such as if base station 105-a transmits control signaling 225-b via a DCI message, the control signaling 225-b may address a reduced number of DMRS parameters to reduce a number of bits in the DCI message dedicated to DMRS parameters. For example, the DCI message may include dmrs-AdditionalPosition but may not include the other DMRS parameters.

In some examples, for dynamic switching between transmission schemes (e.g., SFN scheme 1, SFN scheme 2 with or without Doppler shift pre-compensation, a multi-TRP SDM scheme, and DPS with a single TCI), the network may select a transmission scheme that UE 115-a may use. Control signaling 225-a may include an indication of the transmission scheme (e.g., one of the RRC configured transmission schemes may be switched dynamically). In some cases, UE 115-a may also perform dynamic switching (e.g., on or off) of Doppler shift pre-compensation. In some cases, the dynamic indication or signaling of the transmission mode (e.g., via a MAC-CE or DCI message in control signaling 225-b) may include one or more indicators, such as a scheme 1 indicator, a scheme 2 indicator, a Doppler shift pre-compensation indicator, a DPS scheme indicator, a multi-TRP scheme indicator corresponding to an SDM transmission mode or FDM or TDM transmission mode, a DPS indicator, or the like. Control signaling 225-b may include the one or more indicators jointly with one or more of the DMRS parameters.

To support dynamic switching of different transmission modes in conjunction with DMRS adaptation between different transmission modes and DMRS adaptation for a given transmission mode, base station 105-a may include a number of DMRS parameters and transmission mode indicators in control signaling 225-b to UE 115-a. If one or more non-SFN DMRS ports are associated with different TPRs 205 (e.g., TRP 205-a and TRP 205-b), multiple dmrs-AdditionalPosition parameters may be addressed simultaneously (e.g., one per TRP 205 or TCI). The usage of multiple DMRS configurations per allocation (e.g., for an HST-SFN or other multi-TRP scenario) may be RRC configured at a UE 115 based on UE capability. That is, capability information 235 may indicate a capability to use multiple DMRS configurations per allocation. The dynamic signaling of the DMRS configuration may include joint signaling of the transmission mode (e.g., SFN scheme 1 or SFN scheme 2 with or without Doppler shift pre-compensation, multi-TRP or SDM, FDM, or TDM mode, DPS with a single TCI mode, or the like) and the corresponding DMRS configuration. In some cases, base station 105-a may dynamically signal a partial joint combination of the transmission modes indicators (e.g., based on UE capability or network preference) and the DMRS configuration in control signaling 225-b. In some examples, base station 105-b may transmit control signaling 225-b with the joint dynamic signaling of the transmission mode and the DMRS configuration via one of a MAC-CE or a MAC-CE and DCI or a DCI.

In some examples, to support dynamic switching of different transmission modes in conjunction with DMRS adaptation for each transmission mode, base station 105-a may include a number of DMRS symbols or locations (e.g., a dmrs-AdditionalPosition) in control signaling 225-b, which may be a DCI message, per allocation. In some cases, such as for non SFN DMRS ports associated with different TPRs 205 (e.g., TRP 205-a and TRP 205-b), control signaling 225-b may include multiple DMRS configurations per allocation. The usage of multiple DMRS configurations per allocation (e.g., for an HST-SFN or other multi-TRP scenario) may be RRC configured at UE 115-a based on UE capability. In some cases, dynamic transmission modes switching may be performed based on the DCI message in control signaling 225-b. Control signaling 225-a may configure (e.g., RRC configure or enable) different transmission modes that may be used for dynamic switching. In some examples, if multiple DMRS parameters (e.g., where each DMRS parameter may be per TRP 205 or TCI) are signaled in the allocating DCI message, base station 105-*a* may suggest one or more pre-defined associations of the DMRS parameters for different CDM groups (e.g., according to a list of the corresponding DMRS ports). For example, a CDM group 0 (e.g., for DMRS ports 0 and 1) may be associated with a first DMRS field in the scheduling DCI. Additionally or alternatively, a CDM group 1 (e.g., for DMRS ports 2 and 3) may be associated with a second DMRS field in the scheduling DCI. In some examples, different CDM groups may be associated with different TRPs 205 or TCI states for SFN transmission scheme 2 and a multi-TRP transmission scheme, such as an SDM, FDM, or TDM transmission scheme.

In some cases, for joint signaling of a transmission scheme configuration and DMRS configuration, one or more dmrs-AdditionalPosition options may be relevant for each transmission mode option. The joint signaling of the transmission scheme configuration and DMRS configuration may increase signaling efficiency when compared with signaling each one of the DCI fields corresponding to a transmission scheme indication and a DMRS indication separately (e.g., because joint coding may allow base station 105-*a* to use fewer DCI bits). In some examples, base station 105-*a* and UE 115-*a* may use a list of a pre-defined or otherwise configured code points for one or more DCI fields related to a transmission mode and DMRS configuration (e.g., an HST-SFN configuration). Each DCI field code point may address a combination of a transmission mode option and a DMRS option. Each DCI field code point may be signaled by the scheduling DCI. For example, the scheduling DCI may include a configuration field with a value defining a joint transmission mode and DMRS configuration per allocation.

In some examples, the DCI message in control signaling 225-*b* may include a list of parameters, indicators, flags, or a subset of the list that may be mapped to a code point of a transmission configuration field (e.g., an HST-SFN, a multi-TRP, or a single TRP transmission configuration field) in the scheduling DCI. In some cases, there may be a single DMRS configuration per allocation (e.g., for both TRPs 205 if the transmission mode is an SFN scheme 2 or multi-TRP SDM/FDM/TDM scheme). Additionally or alternatively, the DCI may include multiple DMRS configurations per allocation, such as two DMRS configurations, for non-SFN DMRS scenarios. In some examples, the length of the DCI field for a joint DMRS and transmission mode configuration may be defined by a maximum number of configuration bundles (e.g., a DMRS and transmission mode indicator), while each one of the bundles may be mapped to a specific code point of the DCI field. In some cases, the number of configuration bundles ($N_{conf\ bundles}$) may be defined according to Equation 3:

$$N_{conf\ bundles} \leq 2^{DCI\ field\ length}$$

The list of configuration bundles may be predefined or RRC configured per UE 115 based on UE capability and based on a network deployment scenario and transmission mode preferences.

In some examples, UE 115-*a* may receive one or more DMRSs 220 from TRP 205-*a*, TRP 205-*b*, or both based on the joint DMRS configuration and transmission mode configuration. UE 115-*a* may use the transmission mode indicated in the joint DMRS configuration and transmission mode configuration to receive one or more data messages 230 from TRP 205-*a*, TRP 205-*b*, or both based on the received DMRSs 220.

Figure 3A:
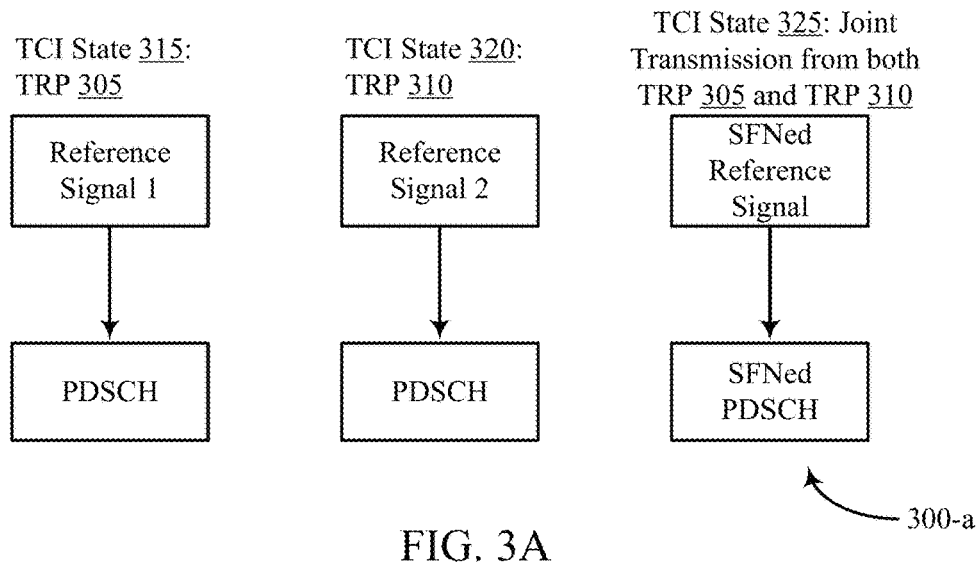
FIGS. 3A through 3C illustrate examples of communication scheme diagrams that support dynamic configuration signaling of DMRS and transmission mode in accordance with aspects of the present disclosure.
Figure 3B:
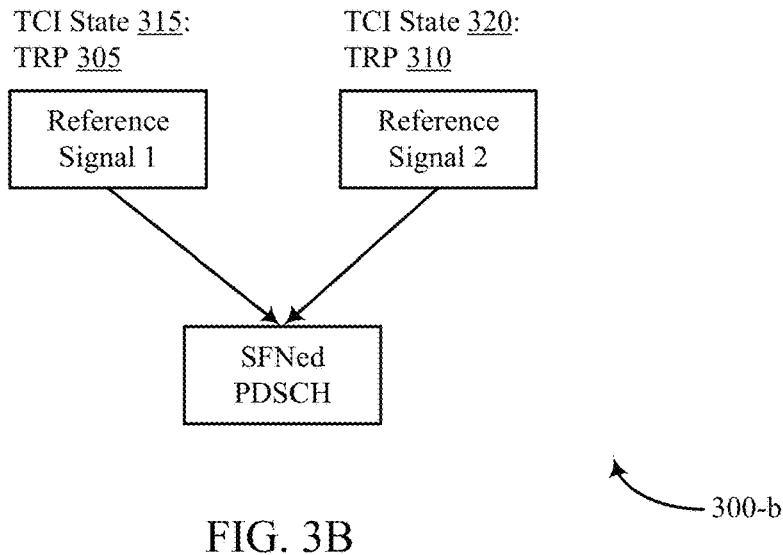
Figure 3C:
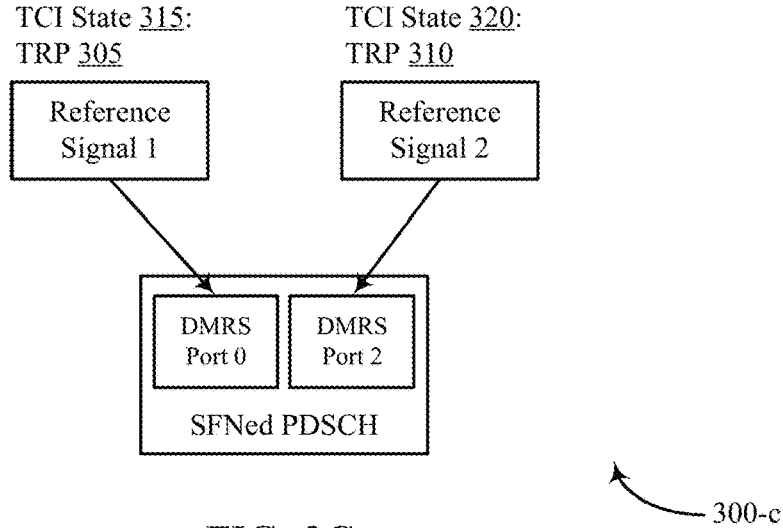

FIGS. 3A through 3C illustrates examples of communication scheme diagrams 300 that supports configuration signaling of DMRS and transmission mode in accordance with aspects of the present disclosure. In some examples, the communication scheme diagrams 300-*a*, 300-*b*, and 300-*c* may be implemented to realize aspects of the wireless communications system 100 or the wireless communications system 200. For example, TRP 305, TRP 310, or both, which may be examples of TRPs 205 as described with reference to FIG. 2 (e.g., multi-TRPs), and UEs 115 may employ one or more SFN schemes illustrated by communication scheme diagrams 300-*a*, 300-*b*, and 300-*c* as described with reference to FIGS. 1 and 2. A base station 105 may dynamically transmit a joint DMRS configuration and transmission mode configuration. The transmission mode configuration may relate to a transmission mode for communicating with one or more TRPs 205. In some cases, TRP 305, TRP 310, or both may transmit one or more data messages to a UE 115 using an SFN scheme of the SFN schemes based on the joint DMRS configuration and transmission mode indication. In some cases, the communication scheme diagrams 300-*a*, 300-*b*, and 300-*c* may illustrate joint downlink transmissions to the UE 115 from a TRP 305 applying a TCI state 315 and from a TRP 310 applying a TCI state 320.

The communication scheme diagram 300-*a* illustrates an SFN scheme 0. In some aspects, the SFN communication 0 may also refer to a transparent SFN scheme. In some examples, the TRP 305 and the TRP 310 may each transmit two separate reference signals (e.g., a reference signal 1 and a reference signal 2, respectively). For example, a single TRP, such as the TRP 305 or the TRP 310, may transmit a reference signal, such as Reference Signal 1 or Reference Signal 2, respectively. In some other examples, communication scheme diagram 300-*a* may illustrate a transparent SFN scheme using multiple TRPs, such as TRP 305 and TRP 310. In the transparent SFN scheme, the TRP 305 and the TRP 310 may transmit a joint transmission of an SFNed Reference Signal. Each transmission scheme scenario (e.g., a single TRP or the joint transmission from multiple TRPs) may have different TCI or QCL states and TRSs correspondingly. In some cases, for a single TRP transmission, the TRP 305 may have a TCI state 315 and the TRP 310 may have a TCI state 320. In some other cases, such as for the joint transmission, the TRP 305 and the TRP 310 may have a single TCI state 325. In some examples, a DMRS may be QCLed with the indicated one or two TCI states, each DMRS port may be QCLed with one of the indicated TCI states as in the case of SDM, TDM, FDM, or SFN scheme 2 (e.g., illustrated in FIG. 3C), or each DMRS port may be QCLed with both TCI states as in the case of SFN scheme 1 (e.g., illustrated in FIG. 3B). For SFN transmission scheme 0, the TRP may not use two TCI states, but may use a single TCI state and a single SFNed TRS or DMRS. In some examples, to achieve an "SFNed" PDSCH, the TRP 305 and the TRP 310 may define an additional TCI state, such as a TCI state 325, that may be used to transmit an "SFNed" reference signal (such as a TRS) associated with an "SFNed" PDSCH. The "SFNed" PDSCH in the SFN communication 0 may include DMRS ports and data layers that are associated with the additional TCI state 325.

The communication scheme diagram 300-*b* illustrates an SFN scheme 1. In such an SFN scheme 1, the TRP 305 and the TRP 310 may transmit two separate reference signals (e.g., a reference signal 1 and a reference signal 2, respectively) and also with a joint "SFNed" PDSCH in which each DMRS port or data layer of the "SFNed" PDSCH is associated with both the TCI state 315 and the TCI state 320. In other words, the TRP 305 and the TRP 310 may transmit reference signals (such as TRSs) in a TRP-specific or non-SFN manner while the associated DMRS and PDSCH or PDCCH from the TRPs are transmitted in an SFN manner.

The communication scheme diagram 300-c illustrates an SFN scheme 2. In such an SFN scheme 2, the TRP 305 and the TRP 310 may transmit two separate reference signals (e.g., a reference signal 1 and a reference signal 2, respectively) and also with a joint PDSCH in which each data layer of the joint PDSCH is associated with the TCI state 315 and the TCI state 320 while each DMRS port of the joint PDSCH is associated with either the TCI state 315 or the TCI state 320 (e.g., not both). For example, a DMRS port 0 of the joint PDSCH may be associated with the TCI state 315 (and not with the TCI state 320) and a DMRS port 2 of the joint PDSCH may be associated with the TCI state 320 (and not with the TCI state 315). In other words, the TRP 305 and the TRP 310 may transmit reference signals (such as TRSs) and DMRS in a TRP-specific or non-SFN manner while the associated with PDSCH (e.g., data layers) from the TRPs is transmitted in an SFN manner.

In some examples, a UE 115 may receive a configuration from a TRP 205 that indicates a set of parameters common to the SDM scheme and an SFN scheme. The UE 115 may receive an indication of a communication scheme from the TRP 205 indicating one of SFN scheme 0, SFN scheme 1, or SFN scheme 2 illustrated in communication scheme diagram 300-a through communication scheme diagram 300-c, respectively. The UE 115 may determine a set of parameters for communication with TRP 305, TRP 310, or both specific to the SFN scheme. For example, the indication of the communication scheme may include one or more parameters specific to the SFN scheme and multi-TRP or single TRP transmission. The UE 115 may receive transmission from TRP 305, TRP 310, or both and may process the transmission according to the SDM, TDM, or FDM scheme. For example, the UE 115 may perform channel estimation based on the SDM scheme.

In some cases, a UE 115 and a base station 105 may communicate using one or more TRPs, such as TRP 305, TRP 310, or both, in an HST scenario. The UE 115 may identify a transmission scheme, such as SFN scheme 1, SFN scheme 2, a multi-TRP SDM scheme, or DPS with a single TCI based on the dynamically signaled joint DMRS configuration and transmission mode configuration. The UE 115 may use the transmission scheme to receive one or more downlink transmissions from the base station 105 via TRP 305, TRP 310, or both.

FIGS. 4A through 4C illustrates examples of resource diagrams 400 that supports configuration signaling of DMRS and transmission mode in accordance with aspects of the present disclosure. In some examples, the resource diagrams 400-a through 400-c may be implemented to realize aspects of the wireless communications system 100, the wireless communications system 200, or the communication scheme diagrams 300. For example, a base station 105 may transmit a DCI including a joint DMRS configuration and transmission mode configuration to a UE 115. In some examples, as illustrated in FIG. 4A and FIG. 4B, the base station 105 may transmit the joint DMRS configuration and transmission mode configuration in disjoint DCI fields with one or more DMRS configurations per allocation. In some other examples, as illustrated in FIG. 4C, the base station 105 may transmit the joint DMRS configuration and transmission mode configuration in a joint DCI field. The UE 115 may use the joint DMRS configuration and transmission mode configuration to communicate with the base station 105 via one or more TRPs 205.

In some examples, a base station 105 may dynamically update a DMRS configuration and a transmission mode configuration using a DCI message. The DCI message may include multiple fields, which may each contain one or more bits. For example, the DCI message may include one or more fields for the DMRS configuration and transmission mode configuration and one or more additional DCI fields 405. In some examples, as illustrated in FIG. 4A and FIG. 4B, the base station 105 may include separate transmission mode configuration fields 410 and DMRS configuration fields 415. For example, resource diagram 400-a may include a transmission mode configuration field 410-a and a DMRS configuration field 415-a. The DMRS configuration field 415 may include one or more DMRS parameters, such as a dmrs-AdditionalPosition parameter for an updated DMRS configuration. The UE 115 may use the DMRS parameters to identify an updated or switched DMRS configuration. The UE 115 may use the DMRS configuration to receive one or more DMRSs from multiple TRPs. In some examples, the base station 105 may include a single DMRS configuration per allocation in the DCI message. In some examples, the base station 105 may use a single DMRS configuration per allocation for any transmission mode.

In some other examples, resource diagram 400-b may include a transmission mode configuration field 410-a and multiple DMRS configuration fields 415, such as DMRS configuration field 415-b and DMRS configuration field 415-c. Each DMRS configuration field 415 may include one or more DMRS parameters, such as a dmrs-AdditionalPosition parameter for each TRP in communication with the UE 115 or for each TCI. For example, the UE 115 may receive a dmrs-AdditionalPosition parameter for a first TRP (e.g., TRP1) and a dmrs-AdditionalPosition parameter for a second TRP (e.g., TRP2), which may be two DMRS configurations per allocation. The UE 115 may use each of the DMRS parameters to identify an updated or switched DMRS configuration. The UE 115 may use the DMRS configuration to receive one or more DMRSs from multiple TRPs. In some cases, the base station 105 may include multiple DMRS configurations per allocation for a transmission mode with non SFN DMRSs, such as SFN scheme 2, a multi-TRP SDM, FDM, or TDM scheme, or the like.

In some examples, as illustrated in FIG. 4C, the base station 105 may include a joint transmission mode configuration and one or more DMRS configuration fields 420. The joint transmission mode configuration and one or more DMRS configuration field 420 may span a number, N, of bits in the DCI message. For example, resource diagram 400-a may include a transmission mode configuration field 410-a and a DMRS configuration field 415-a. The joint transmission mode configuration and one or more DMRS configuration field 420 may include one or more DMRS parameters, one or more transmission mode indicators or options, or both and may be mapped to a code point. The number of code points, K, may be related to N (e.g., K≤$2^N$). The UE 115 may use the DMRS parameters to identify a DMRS configuration. The UE 115 may use the DMRS configuration to receive one or more DMRSs from multiple TRPs. In some examples, the base station 105 may use the joint transmission mode configuration and one or more DMRS configuration field 420 for any transmission mode.

In some examples, the transmission mode configuration field 410 may include one or more transmission mode indicators or options. The UE 115 may identify or receive a direct indication of the transmission mode, and may use the transmission mode to receive the DMRSs, one or more data messages, or both from surrounding TRPs.

FIGS. 5A and 5B illustrate examples of configuration diagrams 500 that supports configuration signaling of DMRS and transmission mode in accordance with aspects of the present disclosure. In some examples, the configuration diagrams 500-a and 500-b may be implemented to realize aspects of the wireless communications system 100, the wireless communications system 200, or the communication scheme diagrams 300. For example, a base station 105 may transmit a MAC-CE conveying control information indicating a joint DMRS and transmission mode configuration option to a UE 115. The UE 115 may use the joint DMRS configuration and transmission mode configuration to communicate with the base station 105 via one or more TRPs 205 according to the configuration diagram 500-a and configuration diagram 500-b.

In some examples, a combination of the DMRS parameters and transmission mode indicators or options may define a transmission configuration candidate for a downlink shared channel (e.g., PDSCH). Multiple joint configuration candidates, which may be referred to as bundles, may be RRC configured by a network (e.g., via a base station 105) at a UE 115. The options for different bundles may be included in a table of PDSCH configuration candidates. For example, the table may include N entries of SFN PDSCH configurations.

The network may RRC configure a number of PDSCH configurations (e.g., according to the PDSCH configuration candidates table) minding network scheduling patterns, network scheduling preferences, and UE capabilities. In some cases, as illustrated in FIG. 5A, several PDSCH configurations from the configured table may be activated by a MAC-CE. The activated PDSCH configurations may be addressed as code points for a complementary DCI based selection (e.g., according to a new DCI field, DCI type, DCI format, or the like). For each allocation, the scheduling DCI may select and signal one of the activated PDSCH configuration options. The existing RRC configuration structure and parameters may be applicable before the first activation of a PDSCH configuration option. A default or otherwise predefined PDSCH configuration option may be used prior to a UE entering a connected mode and prior to an initial activation of a PDSCH configuration option.

For example, a UE 115 may receive one or more MAC-CEs in control signaling that indicates multiple activated transmission mode configurations 505. In some cases, the MAC-CE signaling may be used to change the list of activated transmission mode configurations. The control signaling may indicate SFN PDSCH configuration 3, SFN PDSCH configuration 6, SFN PDSCH configuration N−1 etc. from the RRC configured table. The UE may map the activated transmission mode configurations 505 (e.g., SFN PDSCH) to DCI code points. Thus, the UE may perform dynamic switching of transmission modes on a slot basis. In some cases, the network and the UE may use the activated PDSCH configuration option until re-selection or re-activation of another option (e.g., with no additional DCI based signaling).

In some examples, a number of PDSCH configurations may be RRC configured by the network (e.g., according to the PDSCH configuration candidates table) minding network scheduling patterns, network scheduling preferences, and UE capabilities. In some cases, as illustrated in FIG. 5B, one of the RRC configured PDSCH configuration options (e.g., from PDSCH configuration candidates table) may be dynamically activated or selected by the network using MAC-CE signaling. For example, a UE 115 may receive a MAC-CE in control signaling that indicates a single activated transmission mode configuration 505. The control signaling may indicate SFN PDSCH configuration 3 from the RRC configured table.

Figure 6:
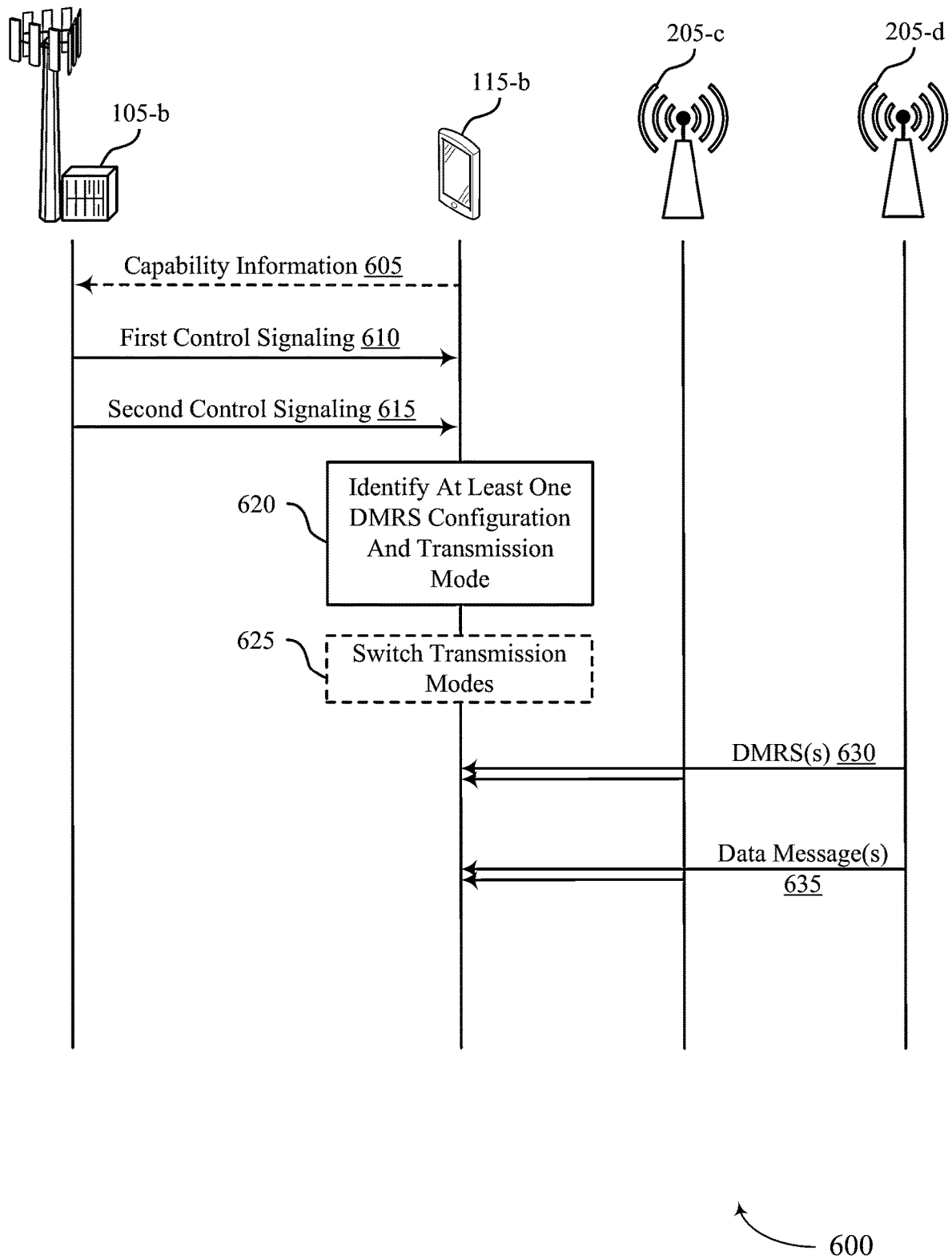
FIG. 6 illustrates an example of a process flow that supports dynamic configuration signaling of DMRS and transmission mode in accordance with aspects of the present disclosure.

FIG. 6 illustrates an example of a process flow 600 that supports configuration signaling of DMRS and transmission mode in accordance with aspects of the present disclosure. In some examples, process flow 600 may implement aspects of wireless communications system 100, wireless communications system 200, communication scheme diagrams 300, resource diagrams 400, and configuration diagrams 500. The process flow 600 may illustrate an example of a base station 105, such as base station 105-b, transmitting control signaling including a joint DMRS configuration and transmission mode configuration to a UE 115, such as UE 115-b. UE 115-b may use the joint DMRS configuration and transmission mode configuration to communicate with base station 105-b via one or more TRPs 205, such as TRP 205-c and TRP 205-d. Alternative examples of the following may be implemented, where some processes are performed in a different order than described or are not performed. In some cases, processes may include additional features not mentioned below, or further processes may be added.

At 605, UE 115-b may transmit capability information to the base station. For example, UE 115-b may transmit a message indicating a maximum number of simultaneously addressed DMRS configurations per PDSCH allocation and a list of PDSCH transmission modes supported by UE 115-b.

At 610, UE 115-b may receive first control signaling from base station 105-b. For example, UE 115-b may receive RRC configuration. The first control signaling may identify a set of transmission mode indicators or transmission mode options and a set of DMRS configurations for a set of transmission modes. In some cases, the set of transmission modes may be addressed by a receiver of UE 115-b to receive one or more data messages from multiple TRPs 205, such as TRP 205-c and TRP 205-d. In some examples, the first control signaling may indicate a downlink configuration candidate table. Additionally or alternatively, the first control singling may configure a list of one or more downlink configuration options based on a capability of the UE to support the list of downlink configuration options. In some cases, there may be a list of separate capabilities to support different aspects of DMRS and different aspects of transmissions modes. Based on the indicated UE capabilities, the network may define the valid list of downlink configuration options.

In some examples, base station 105-b may dynamically configure a transmission mode at UE 115-b via implicit or explicit signaling, using a one or more indicators or control bits, or a hybrid signaling where some of the parameters are statically RRC configured and others may be dynamically selected based on a DCI message, a MAC-CE, or both.

At 615, UE 115-b may receive second control signaling from base station 105-b. The second control signaling may indicate a transmission mode or a combination of transmission mode indicators and a combination of one or more DMRS configuration parameters to signal one or more DMRS configurations for the indicated transmission mode. In some examples, the second control signaling may include a control message indicating the DMRS configuration and the transmission mode. In some examples, the second control signaling may include a control message indicating an index of the DMRS configuration in the set of DMRS configurations and the transmission mode. In some cases, the one or more DMRS configuration parameters include a number of additional DMRS symbol locations.

In some cases, UE 115-*b* may receive a MAC-CE in the second control signaling indicating a set of combinations of the one or more DMRS configurations or parameters in combination with transmission mode indicators or a transmission mode indication. UE 115-*b* may receive a DCI message in the second control signaling indicating the one or more DMRS configurations and the transmission mode out of the set of combinations indicated or activated by the MAC-CE.

Additionally or alternatively, UE 115-*b* may receive a DCI message in the second control signaling including one or more fields indicating the DMRS configuration and the transmission mode. In some cases, the fields include a field for the DMRS configuration and a different field for the transmission mode. In some other cases, the fields include a field for a configuration of the DMRS configuration for TRP 205-*c*, an additional field for a configuration of the DMRS configuration for TRP 205-*d*, and another field for the transmission mode. In some examples, the fields include a field for a joint signaling of the DMRS configuration and the transmission mode. In some cases, UE 115-*b* may determine a length of one or more fields of a DCI message indicating the one or more DMRS configurations and a transmission mode based on transmitting the message including the capability information, receiving the first control signaling, receiving the second control signaling, or any combination thereof.

In some cases, each DMRS field in the DCI message (e.g., if there are more than one DMRS fields) may corresponds to a CDM group for a set of DMRS ports that may be associated with a TRP 205. In some examples, the lowest TCI state identifier and a corresponding TRP 205 may be associated with a lowest CDM group and correspondingly linked to a specific DMRS field in the DCI message, for example, a first DMRS filed in the DCI message and a higher TCI state identifier for another TRP 205 may be associated with a higher CDM group index and a second DMRS field in the DCI message.

In some examples, UE 115-*b* may receive a MAC-CE activating multiple downlink configurations from the downlink configuration candidate table received in the first control signaling. In some cases, UE 115-*b* may subsequently receive a DCI message complementary indicating a downlink configuration from the set of downlink configurations activated by the MAC-CE for a data message. In some examples, UE 115-*b* may receive one or more data messages from the multiple TRPs 205, such as TRP 205-*c* and TRP 205-*d*, according to a default or a pre-determined or configured by a regular RRC configuration transmission mode and DMRS configuration before receiving any MAC-CE activating the downlink configurations.

In some cases, one or more downlink configuration options of the list indicated in the first control signaling may be activated based on a MAC-CE. The second control signaling may include the MAC-CE and each downlink configuration option may be a combination of a transmission mode or a set of transmission parameters identifying the transmission mode and a set of one or more DMRS configuration parameters for the transmission mode.

At 620, UE 115-*b* may identify a DMRS configuration of the set of DMRS configurations and the transmission mode based on the transmission mode indicators and the one or more DMRS configuration parameters. In some cases, UE 115-*b* may identify the DMRS configuration based on a combination of transmission mode indicators or the transmission mode and the one or more DMRS configuration parameters, a DMRS configuration for TRP 205-*c* and a DMRS configuration for TRP 205-*d*.

In some examples, UE 115-*b* may identify the transmission mode based on transmission mode indicators defined under a joint configuration option activated by a same MAC-CE, a joint transmission mode and DMRS configuration signaled by a same DCI, or a disjoint transmission mode and DMRS configuration signaled by a same DCI. In some cases, for MAC-CE based and DCI based joint transmission mode and DMRS signaling, a DMRS configuration may not be signaled independently from a transmission mode signaling. For example, the DMRS configuration and the transmission mode may be signaled or predefined together under a configuration line in configuration table, such as if base station 105-*b* performs MAC-CE based activation, MAC-CE based activation and complementary DCI, or joint DCI field based signaling. In some examples, DMRS configuration signaling for UE 115-*b* may partially depend on transmission mode signaling in the case of disjoint DCI fields for the transmission mode and the DMRS configuration. In some other examples, a DMRS configuration may be defined by the signaled DMRS parameters (e.g., implicit or explicit) directly from the dedicated DCI fields without inherent coupling with the signaled transmission mode.

In some cases, for one or more transmission modes, there may be a DMRS configuration per TRP 205. UE 115-*b* may signal a capability to receive multiple DMRS configurations simultaneously for the same allocation. In some examples, a network may configure capable UEs 115 with simultaneous (e.g., more than a single) DMRS configuration signaling for the corresponding transmission modes (e.g., via control signaling from base station 105-*b*). If the network configures the UEs 115, then each UE 115 may receive multiple (e.g., two) DMRS configurations for relevant transmission modes (e.g., two differently configured DMRSs to be received simultaneously per allocation). If the network performs joint signaling of transmission mode and DMRS configuration, then the signaling may be the same for multiple DMRS configurations or a single DMRS configuration. The network may select a relevant preconfigured bundle (e.g., with one or more DMRS configurations together with a transmission mode). In some cases, such as for disjoint signaling for transmission mode and DMRS configuration, the number of DMRS fields and the size of the DMRS fields in a DCI message from the transmission mode may depend on the other fields in the DCI message.

At 625, UE 115-*b* may switch to the identified transmission mode based on receiving the control message indicating the DMRS configuration and the transmission mode. UE 115-*b* may switch transmission modes, DMRS configurations, or both based on a same MAC-CE command activating a joint configuration bundle or based on a same DCI. In some cases, UE 115-*b* may use the joint configuration bundle until the next reactivation.

At 630, UE 115-*b* may receive one or more DMRSs from the multiple TRPs 205 according to the identified DMRS configuration. For example, UE 115-*b* may receive one or more DMRSs from TRP 205-*c* and one or more DMRSs from TRP 205-*d* (e.g., simultaneously). In some cases, UE 115-*b* may receive the DMRSs based on the received control message indicating the DMRS configuration and the transmission mode.

At 635, UE 115-*b* may receive the one or more data messages from the multiple TRPs 205 based on the transmission mode and the received one or more DMRSs. For example, base station 105-*b* may transmit the one or more data messages to UE 115-*b* via TRP 205-*c* and TRP 205-*d*. In some other examples, TRP 205-*c*, TRP 205-*d*, or both may be acting independent of base station 105-*b*, and may transmit the one or more data messages to UE 115-*b*. In some cases, UE 115-*b* may receive the one or more data messages from a TRP 205-*c* and a TRP 205-*d* based on the transmission mode indicated by the received control signaling (e.g., first control signaling, second control signaling, or both). In some cases, UE 115-*b* may receive one or more PDSCHs including the data messages.

Figure 7:
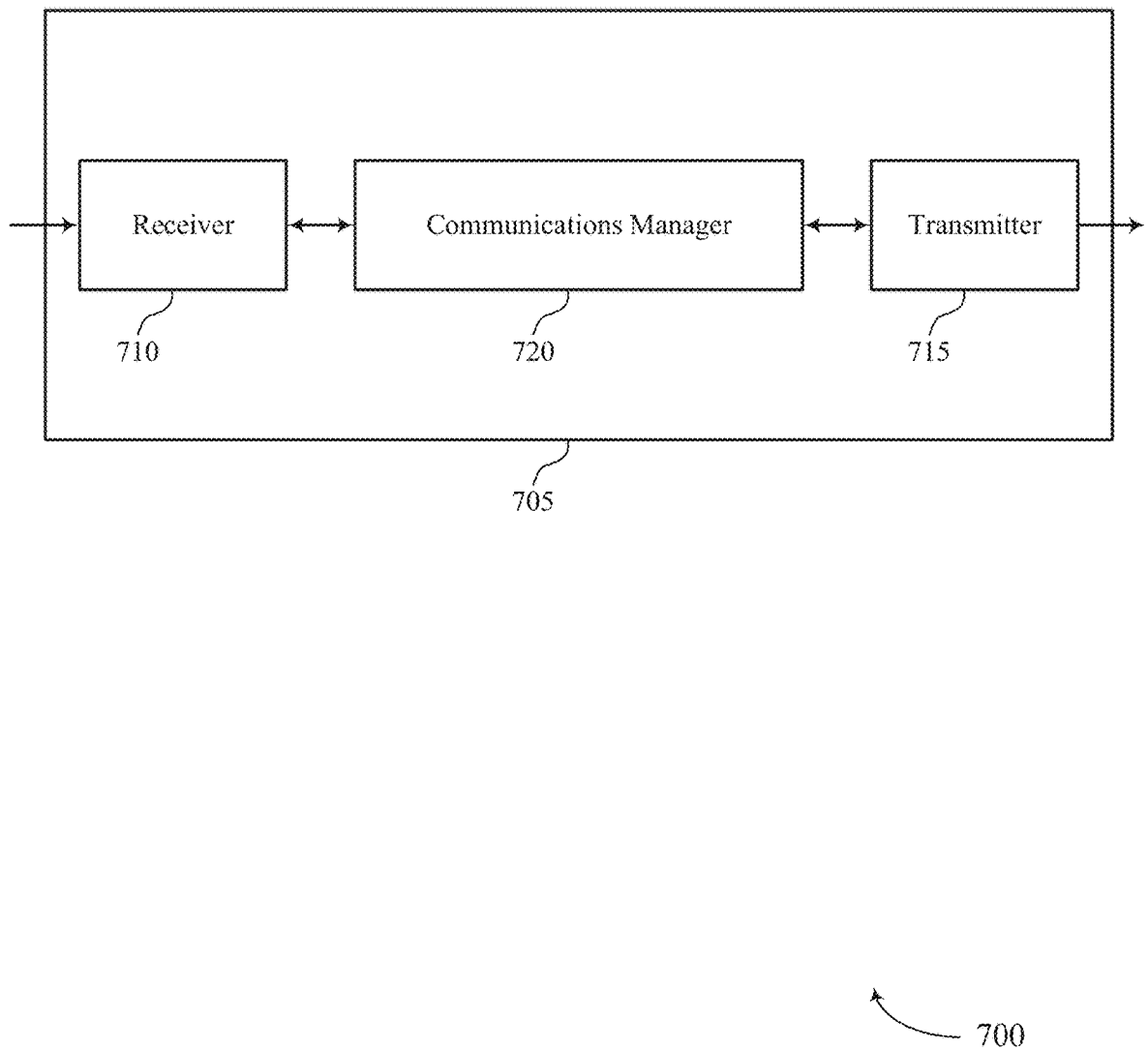
FIGS. 7 and 8 show block diagrams of devices that support dynamic configuration signaling of DMRS and transmission mode in accordance with aspects of the present disclosure.

FIG. 7 shows a block diagram 700 of a device 705 that supports configuration signaling of DMRS and transmission mode in accordance with aspects of the present disclosure. The device 705 may be an example of aspects of a UE 115 as described herein. The device 705 may include a receiver 710, a transmitter 715, and a communications manager 720. The device 705 may also include one or more processors, memory coupled with the one or more processors, and instructions stored in the memory that are executable by the one or more processors to enable the one or more processors to perform the configuration signaling of DMRS and transmission mode features discussed herein. Each of these components may be in communication with one another (e.g., via one or more buses).

The receiver 710 may provide a means for receiving information such as packets, user data, control information, or any combination thereof associated with various information channels (e.g., control channels, data channels, information channels related to configuration signaling of DMRS and transmission mode). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to configuration signaling of DMRS and transmission mode). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of configuration signaling of DMRS and transmission mode as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The communications manager 720 may be configured as or otherwise support a means for receiving second control signaling indicating a transmission mode of the set of transmission modes or a combination of transmission mode indicators and a combination of one or more DMRS configuration parameters to signal one or more DMRS configurations corresponding to the transmission mode. The communications manager 720 may be configured as or otherwise support a means for identifying, based on the transmission mode indicators and the one or more DMRS configuration parameters, at least one DMRS configuration of the set of DMRS configurations and the transmission mode of the set of transmission modes. The communications manager 720 may be configured as or otherwise support a means for receiving one or more DMRSs from the multiple TRPs according to the identified at least one DMRS configuration. The communications manager 720 may be configured as or otherwise support a means for receiving, from the multiple TRPs, the one or more data messages based on the transmission mode and the received one or more DMRSs.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for a base station to transmit control signaling including a joint DMRS configuration and transmission mode configuration to a UE, which may reduce processing, reduce power consumption, cause more efficient utilization of communication resources, and the like.

Figure 8:
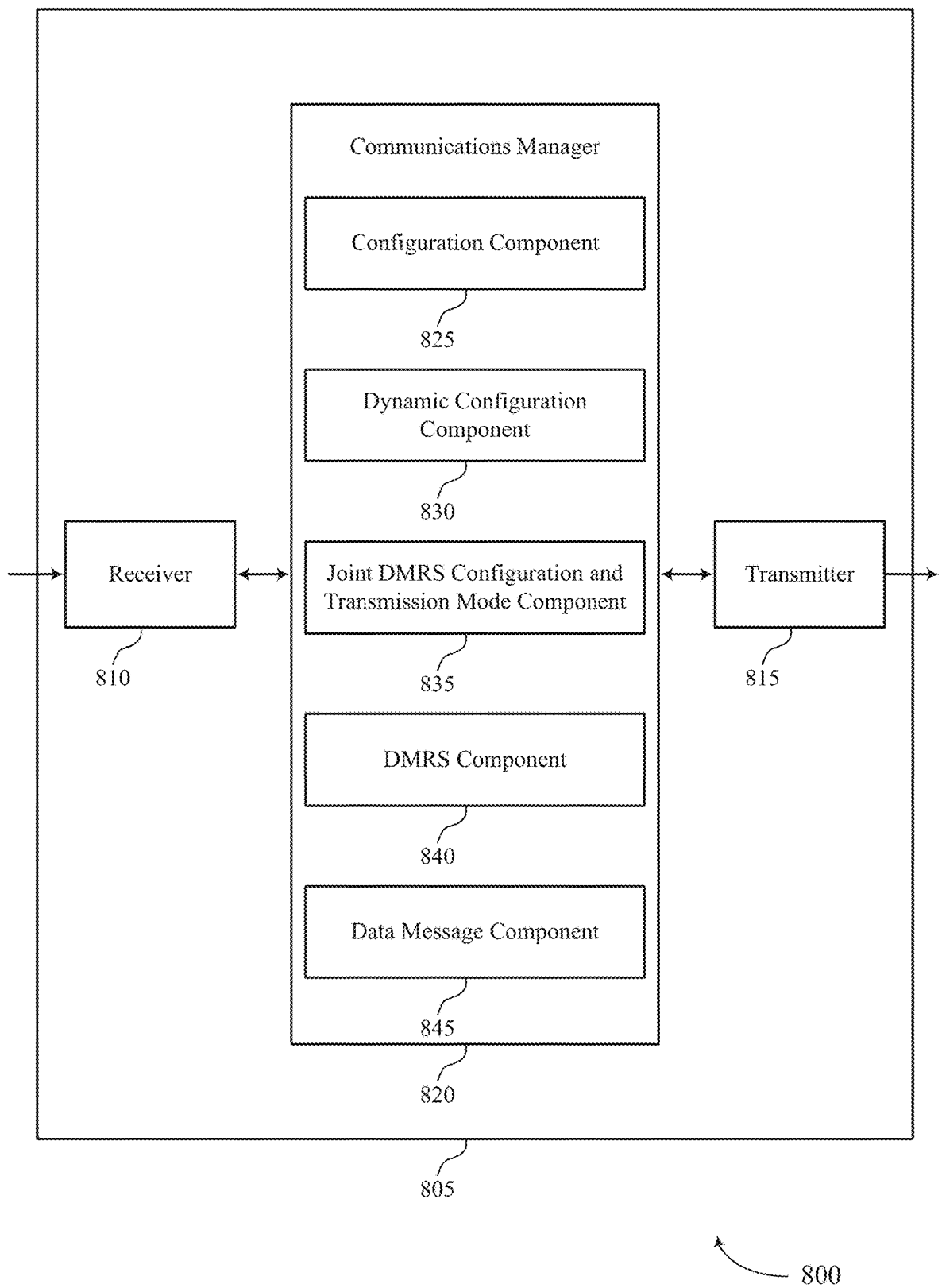

FIG. 8 shows a block diagram 800 of a device 805 that supports configuration signaling of DMRS and transmission mode in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to configuration signaling of DMRS and transmission mode). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to configuration signaling of DMRS and transmission mode). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of configuration signaling of DMRS and transmission mode as described herein. For example, the communications manager 820 may include a configuration component 825, a dynamic configuration component 830, a joint DMRS configuration and transmission mode component 835, a DMRS component 840, a data message component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The configuration component 825 may be configured as or otherwise support a means for receiving, from a base station, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The dynamic configuration component 830 may be configured as or otherwise support a means for receiving second control signaling indicating a transmission mode of the set of transmission modes or a combination of transmission mode indicators and a combination of one or more DMRS configuration parameters to signal one or more DMRS configurations corresponding to the transmission mode. The joint DMRS configuration and transmission mode component 835 may be configured as or otherwise support a means for identifying, based on the transmission mode indicators and the one or more DMRS configuration parameters, at least one DMRS configuration of the set of DMRS configurations and the transmission mode of the set of transmission modes. The DMRS component 840 may be configured as or otherwise support a means for receiving one or more DMRSs from the multiple TRPs according to the identified at least one DMRS configuration. The data message component 845 may be configured as or otherwise support a means for receiving, from the multiple TRPs, the one or more data messages based on the transmission mode and the received one or more DMRSs.

In some cases, the configuration component 825, the dynamic configuration component 830, the joint DMRS configuration and transmission mode component 835, the DMRS component 840, and the data message component 845, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration component 825, the dynamic configuration component 830, the joint DMRS configuration and transmission mode component 835, the DMRS component 840, and the data message component 845 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
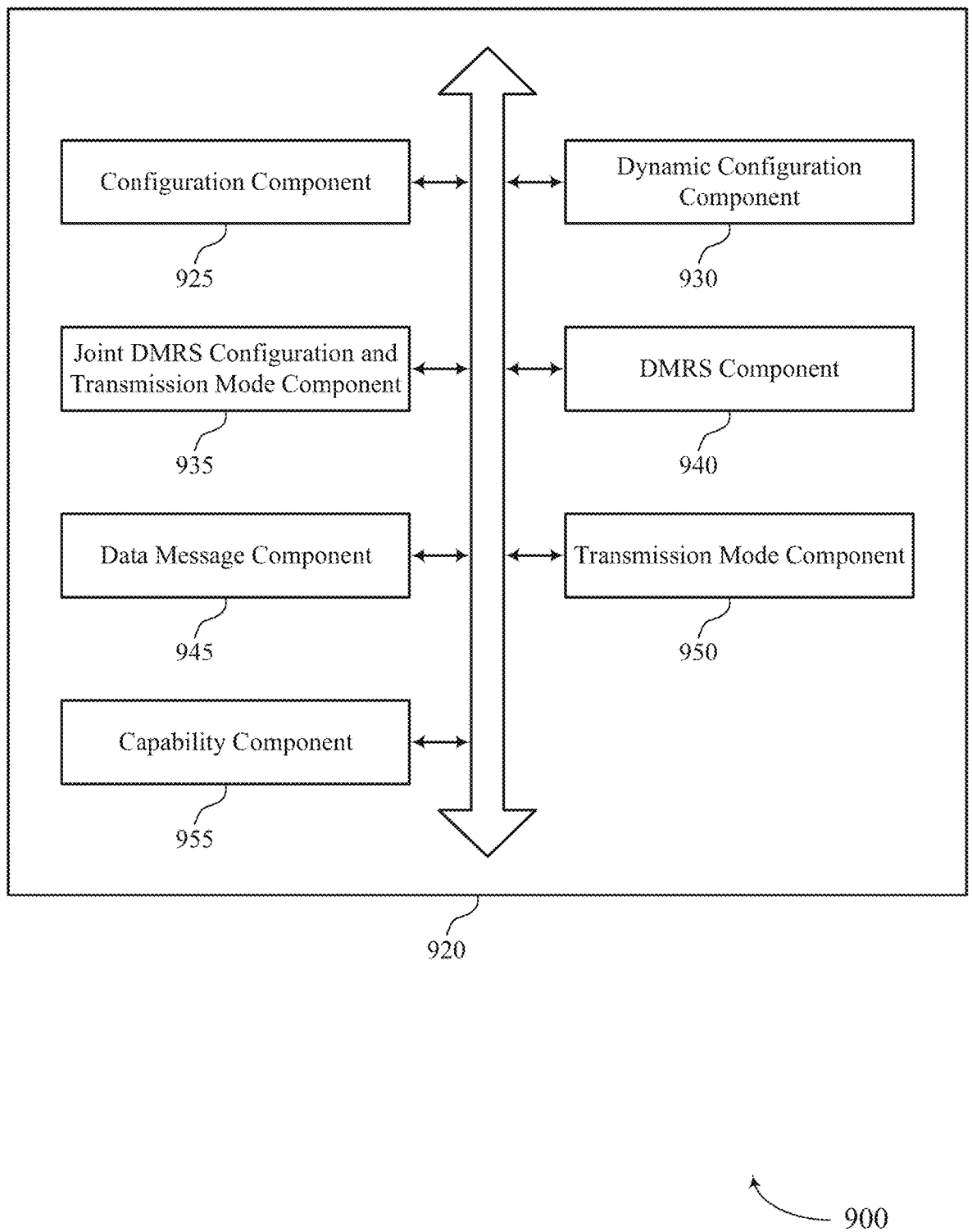
FIG. 9 shows a block diagram of a communications manager that supports dynamic configuration signaling of DMRS and transmission mode in accordance with aspects of the present disclosure.

FIG. 9 shows a block diagram 900 of a communications manager 920 that supports configuration signaling of DMRS and transmission mode in accordance with aspects of the present disclosure. The communications manager 920 may be an example of aspects of a communications manager 720, a communications manager 820, or both, as described herein. The communications manager 920, or various components thereof, may be an example of means for performing various aspects of configuration signaling of DMRS and transmission mode as described herein. For example, the communications manager 920 may include a configuration component 925, a dynamic configuration component 930, a joint DMRS configuration and transmission mode component 935, a DMRS component 940, a data message component 945, a transmission mode component 950, a capability component 955, or any combination thereof. Each of these components may communicate, directly or indirectly, with one another (e.g., via one or more buses).

The communications manager 920 may support wireless communication at a UE in accordance with examples as disclosed herein. The configuration component 925 may be configured as or otherwise support a means for receiving, from a base station, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The dynamic configuration component 930 may be configured as or otherwise support a means for receiving second control signaling indicating a transmission mode of the set of transmission modes or a combination of transmission mode indicators and a combination of one or more DMRS configuration parameters to signal one or more DMRS configurations corresponding to the transmission mode. The joint DMRS configuration and transmission mode component 935 may be configured as or otherwise support a means for identifying, based on the transmission mode indicators and the one or more DMRS configuration parameters, at least one DMRS configuration of the set of DMRS configurations and the transmission mode of the set of transmission modes. The DMRS component 940 may be configured as or otherwise support a means for receiving one or more DMRSs from the multiple TRPs according to the identified at least one DMRS configuration. The data message component 945 may be configured as or otherwise support a means for receiving, from the multiple TRPs, the one or more data messages based on the transmission mode and the received one or more DMRSs.

In some examples, to support receiving the second control signaling, the dynamic configuration component 930 may be configured as or otherwise support a means for receiving a control message that includes an indication of the at least one DMRS configuration and the transmission mode. In some examples, to support receiving the second control signaling, the transmission mode component 950 may be configured as or otherwise support a means for switching to the transmission mode based on receiving the control message that includes the indication, where receiving the one or more DMRSs is based on the received second control message.

In some examples, to support receiving the second control signaling, the dynamic configuration component 930 may be configured as or otherwise support a means for receiving a control message including an index of the at least one DMRS configuration in the set of DMRS configurations and the transmission mode.

In some examples, to support identifying the at least one DMRS configuration of the set of DMRS configurations, the joint DMRS configuration and transmission mode component 935 may be configured as or otherwise support a means for identifying, based on a first combination of transmission mode indicators or the transmission mode and the one or more DMRS configuration parameters, a first DMRS configuration and a second DMRS configuration of the set of DMRS configurations, the first DMRS configuration associated with a first TRP of the multiple TRPs, and the second DMRS configuration associated with a second TRP of the multiple TRPs.

In some examples, to support receiving the second control signaling, the dynamic configuration component 930 may be configured as or otherwise support a means for receiving a MAC-CE indicating a set of combinations of the one or more DMRS configurations or corresponding parameters in combination with transmission mode indicators or a corresponding transmission mode indication. In some examples, to support receiving the second control signaling, the dynamic configuration component 930 may be configured as or otherwise support a means for receiving a DCI message including an indication of the at least one or more DMRS configurations and the transmission mode out of the set of combinations indicated by the MAC-CE.

In some examples, the capability component 955 may be configured as or otherwise support a means for transmitting, to the base station, a message including capability information corresponding to a maximum number of simultaneously addressed DMRS configurations per PDSCH allocation and a list of PDSCH transmission modes supported by the UE. In some examples, the dynamic configuration component 930 may be configured as or otherwise support a means for determining a length of one or more fields of a DCI message indicating the at least one DMRS configuration and the transmission mode based on transmitting the message, receiving the first control signaling, receiving the second control signaling, or any combination thereof.

In some examples, to support receiving the second control signaling, the dynamic configuration component 930 may be configured as or otherwise support a means for receiving a DCI message including one or more fields indicating the at least one DMRS configuration and the transmission mode.

In some examples, the one or more fields include a first field for the at least one DMRS configuration and a second field for the transmission mode.

In some examples, the one or more fields include a first field for a first configuration of the at least one DMRS configuration that corresponds to a first TRP of the multiple TRPs, a second field for a second configuration of the at least one DMRS configuration that corresponds to a second TRP of the multiple TRPs, and a third field corresponding to the transmission mode.

In some examples, the one or more fields include a field for a joint signaling of the at least one DMRS configuration and the transmission mode.

In some examples, the first control signaling includes RRC signaling indicating a downlink configuration candidate table, and the dynamic configuration component 930 may be configured as or otherwise support a means for receiving a MAC-CE activating a set of multiple downlink configurations from the downlink configuration candidate table. In some examples, the first control signaling includes RRC signaling indicating a downlink configuration candidate table, and the dynamic configuration component 930 may be configured as or otherwise support a means for receiving a DCI message indicating a downlink configuration from the set of multiple downlink configurations activated by the MAC-CE for an associated data message of the one or more data messages.

In some examples, the dynamic configuration component 930 may be configured as or otherwise support a means for receiving, before receiving the MAC-CE activating a set of multiple downlink configurations, the one or more data messages from the multiple TRPs according to a default or a pre-determined or configured by a regular RRC configuration transmission mode and DMRS configuration.

In some examples, to support receiving the first control signaling, the capability component 955 may be configured as or otherwise support a means for receiving RRC signaling configuring a list of one or more downlink configuration options based on a capability of the UE to support the list of the one or more downlink configuration options, where one or more downlink configuration options can be activated based on a MAC-CE, where the second control signaling includes the MAC-CE and each downlink configuration option of the one or more downlink configuration options is a combination of a transmission mode or a set of transmission parameters identifying the transmission mode and a set of one or more DMRS configuration parameters associated with a corresponding transmission mode.

In some examples, the data message component 945 may be configured as or otherwise support a means for receiving, based on the received one or more DMRSs, the one or more data messages from a first TRP and a second TRP based on the transmission mode indicated by the received control signaling.

In some examples, the one or more DMRS configuration parameters include a number of additional DMRS symbol locations.

In some cases, the configuration component 925, the dynamic configuration component 930, the joint DMRS configuration and transmission mode component 935, a DMRS component 940, the data message component 945, the transmission mode component 950, the capability component 955, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration component 925, the dynamic configuration component 930, the joint DMRS configuration and transmission mode component 935, a DMRS component 940, the data message component 945, the transmission mode component 950, the capability component 955 discussed herein.

Figure 10:
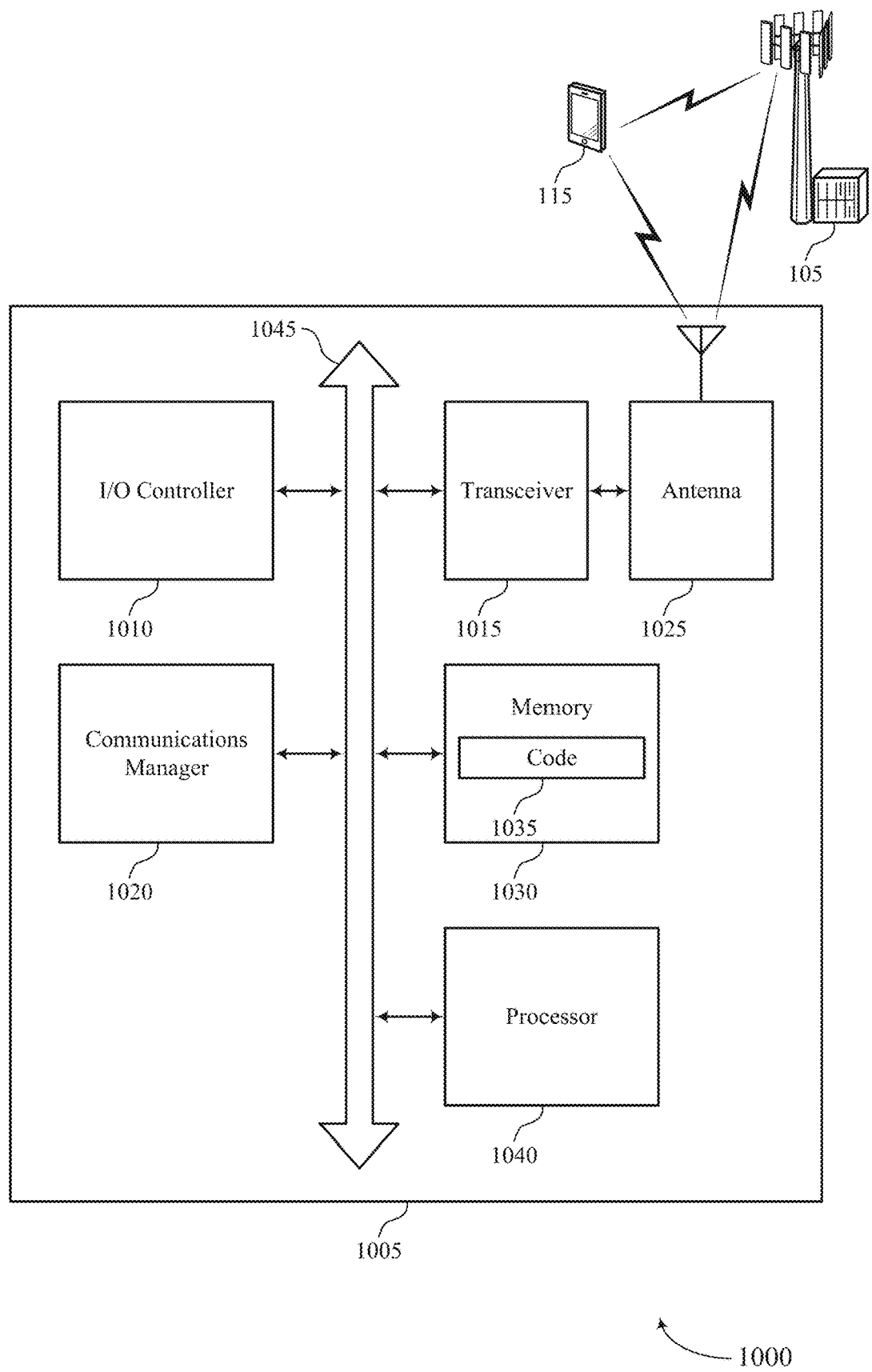
FIG. 10 shows a diagram of a system including a device that supports dynamic configuration signaling of DMRS and transmission mode in accordance with aspects of the present disclosure.

FIG. 10 shows a diagram of a system 1000 including a device 1005 that supports configuration signaling of DMRS and transmission mode in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting configuration signaling of DMRS and transmission mode). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The communications manager 1020 may be configured as or otherwise support a means for receiving second control signaling indicating a transmission mode of the set of transmission modes or a combination of transmission mode indicators and a combination of one or more DMRS configuration parameters to signal one or more DMRS configurations corresponding to the transmission mode. The communications manager 1020 may be configured as or otherwise support a means for identifying, based on the transmission mode indicators and the one or more DMRS configuration parameters, at least one DMRS configuration of the set of DMRS configurations and the transmission mode of the set of transmission modes. The communications manager 1020 may be configured as or otherwise support a means for receiving one or more DMRSs from the multiple TRPs according to the identified at least one DMRS configuration. The communications manager 1020 may be configured as or otherwise support a means for receiving, from the multiple TRPs, the one or more data messages based on the transmission mode and the received one or more DMRSs.

By including or configuring the communications manager 1020 in accordance with examples as described herein, the device 1005 may support techniques for a base station to transmit control signaling including a joint DMRS configuration and transmission mode configuration to a UE, which may improve communication reliability, reduce latency, improve user experience related to reduced processing, reduce power consumption, cause more efficient utilization of communication resources, improve coordination between devices, increase battery life, improve utilization of processing capability, and the like.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of configuration signaling of DMRS and transmission mode as described herein, or the processor 1040 and the memory 1030 may be otherwise configured to perform or support such operations.

Figure 11:
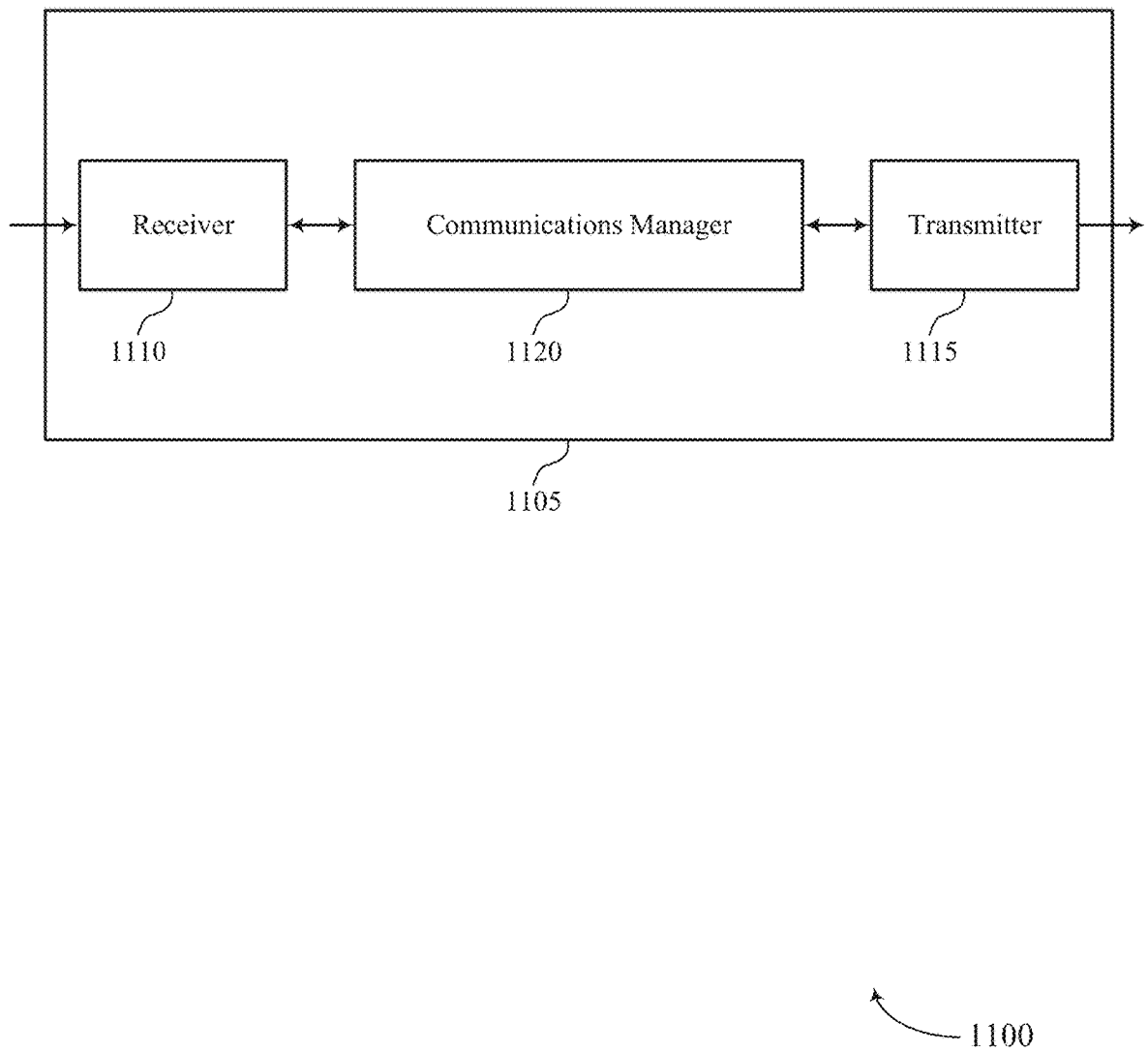
FIGS. 11 and 12 show block diagrams of devices that support dynamic configuration signaling of DMRS and transmission mode in accordance with aspects of the present disclosure.

FIG. 11 shows a block diagram 1100 of a device 1105 that supports configuration signaling of DMRS and transmission mode in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to configuration signaling of DMRS and transmission mode). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to configuration signaling of DMRS and transmission mode). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of configuration signaling of DMRS and transmission mode as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The communications manager 1120 may be configured as or otherwise support a means for transmitting second control signaling indicating a transmission mode of the set of transmission modes or a combination of transmission mode indicators and a combination of one or more DMRS configuration parameters to signal one or more DMRS configurations corresponding to the transmission mode. The communications manager 1120 may be configured as or otherwise support a means for transmitting one or more DMRSs from the multiple TRPs according to at least one DMRS configuration of the set of DMRS configurations and the transmission mode of the set of transmission modes based on the transmission mode indicators and the one or more DMRS configuration parameters. The communications manager 1120 may be configured as or otherwise support a means for transmitting, via the multiple TRPs, the one or more data messages based on the transmission mode and the transmitted one or more DMRSs.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for a base station to transmit control signaling including a joint DMRS configuration and transmission mode configuration to a UE, which may reduce processing, reduce power consumption, cause more efficient utilization of communication resources, and the like.

Figure 12:
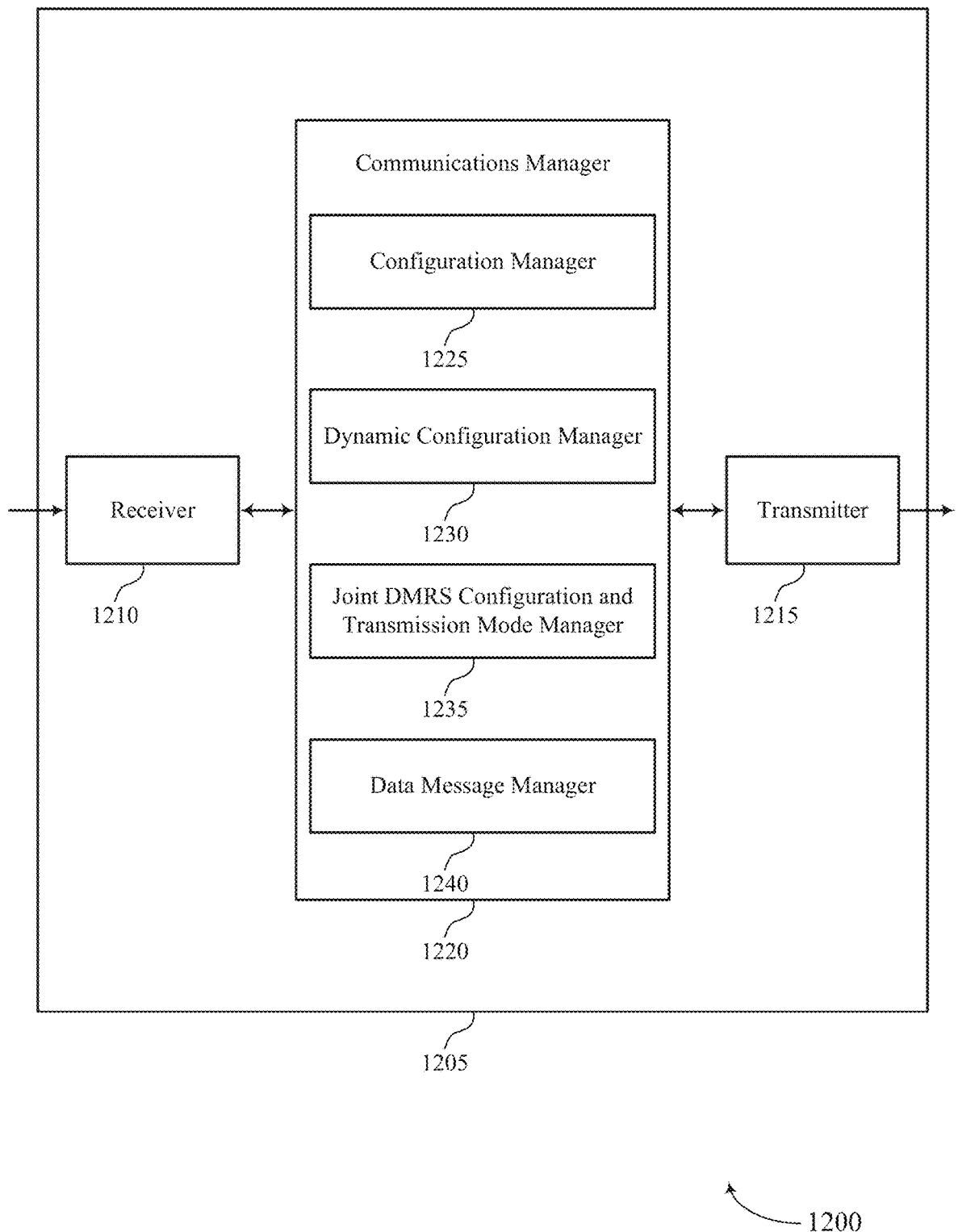

FIG. 12 shows a block diagram 1200 of a device 1205 that supports configuration signaling of DMRS and transmission mode in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to configuration signaling of DMRS and transmission mode). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to configuration signaling of DMRS and transmission mode). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of configuration signaling of DMRS and transmission mode as described herein. For example, the communications manager 1220 may include a configuration manager 1225, a dynamic configuration manager 1230, a joint DMRS configuration and transmission mode manager 1235, a data message manager 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The configuration manager 1225 may be configured as or otherwise support a means for transmitting, to a UE, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The dynamic configuration manager 1230 may be configured as or otherwise support a means for transmitting second control signaling indicating a transmission mode of the set of transmission modes or a combination of transmission mode indicators and a combination of one or more DMRS configuration parameters to signal one or more DMRS configurations corresponding to the transmission mode. The joint DMRS configuration and transmission mode manager 1235 may be configured as or otherwise support a means for transmitting one or more DMRSs from the multiple TRPs according to at least one DMRS configuration of the set of DMRS configurations and the transmission mode of the set of transmission modes based on the transmission mode indicators and the one or more DMRS configuration parameters. The data message manager 1240 may be configured as or otherwise support a means for transmitting, via the multiple TRPs, the one or more data messages based on the transmission mode and the transmitted one or more DMRSs.

Figure 13:
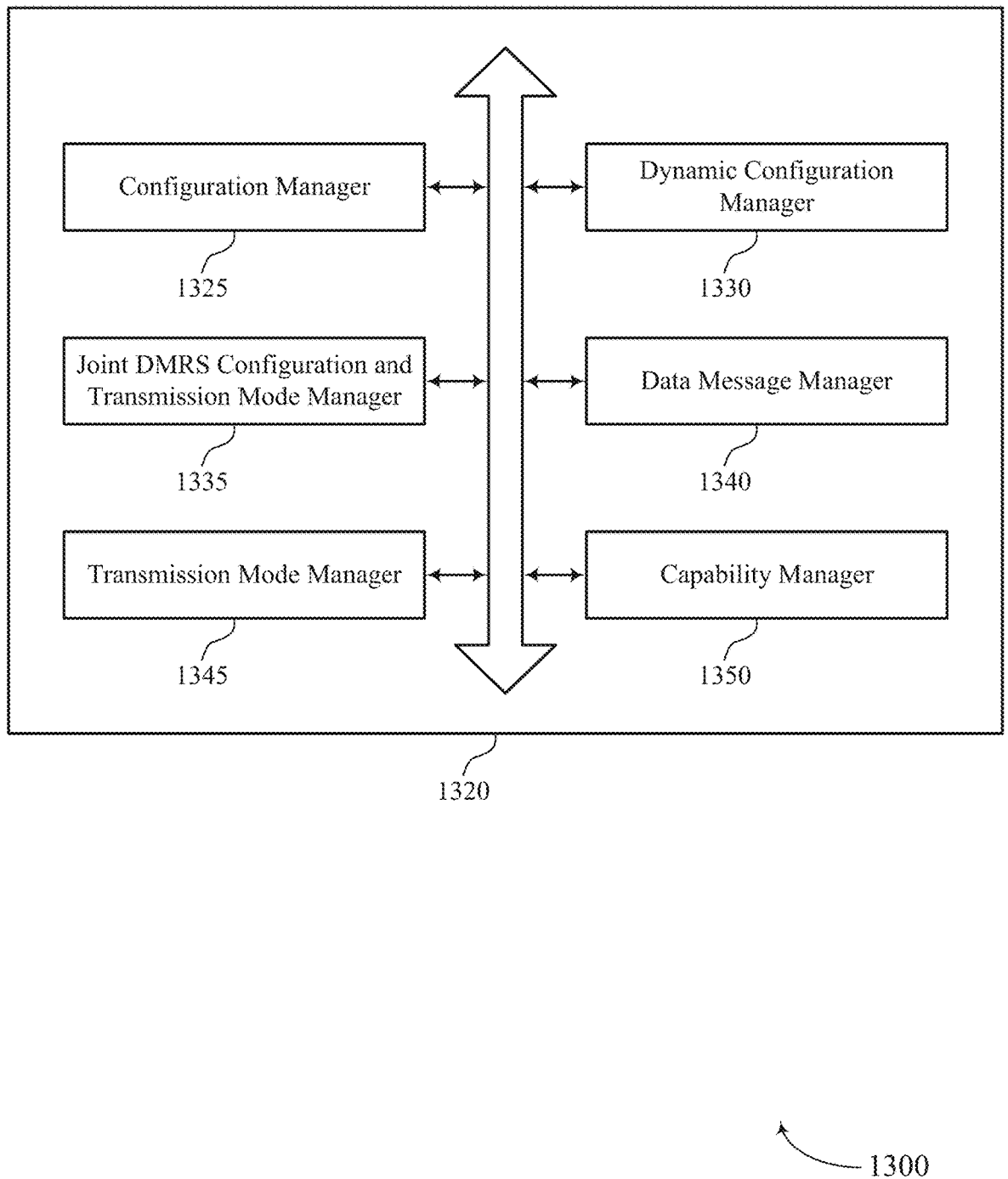
FIG. 13 shows a block diagram of a communications manager that supports dynamic configuration signaling of DMRS and transmission mode in accordance with aspects of the present disclosure.

FIG. 13 shows a block diagram 1300 of a communications manager 1320 that supports configuration signaling of DMRS and transmission mode in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of configuration signaling of DMRS and transmission mode as described herein. For example, the communications manager 1320 may include a configuration manager 1325, a dynamic configuration manager 1330, a joint DMRS configuration and transmission mode manager 1335, a data message manager 1340, a transmission mode manager 1345, a capability manager 1350, or any combination thereof. Each of these components may communicate, directly or indirectly, with one another (e.g., via one or more buses).

The communications manager 1320 may support wireless communication at a base station in accordance with examples as disclosed herein. The configuration manager 1325 may be configured as or otherwise support a means for transmitting, to a UE, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The dynamic configuration manager 1330 may be configured as or otherwise support a means for transmitting second control signaling indicating a transmission mode of the set of transmission modes or a combination of transmission mode indicators and a combination of one or more DMRS configuration parameters to signal one or more DMRS configurations corresponding to the transmission mode. The joint DMRS configuration and transmission mode manager 1335 may be configured as or otherwise support a means for transmitting one or more DMRSs from the multiple TRPs according to at least one DMRS configuration of the set of DMRS configurations and the transmission mode of the set of transmission modes based on the transmission mode indicators and the one or more DMRS configuration parameters. The data message manager 1340 may be configured as or otherwise support a means for transmitting, via the multiple TRPs, the one or more data messages based on the transmission mode and the transmitted one or more DMRSs.

In some examples, to support transmitting the second control signaling, the dynamic configuration manager 1330 may be configured as or otherwise support a means for transmitting a control message that includes an indication of the at least one DMRS configuration and the transmission mode. In some examples, to support transmitting the second control signaling, the transmission mode manager 1345 may be configured as or otherwise support a means for switching to the transmission mode based on transmitting the control message that includes the indication, where transmitting the one or more DMRSs is based on the transmitted second control message.

In some examples, to support transmitting the second control signaling, the dynamic configuration manager 1330 may be configured as or otherwise support a means for transmitting a control message including an index of the at least one DMRS configuration in the set of DMRS configurations and the transmission mode.

In some examples, a first combination of transmission mode indicators or the transmission mode and the one or more DMRS configuration parameters indicate at least a first DMRS configuration and a second DMRS configuration of the set of DMRS configurations, the first DMRS configuration associated with a first TRP of the multiple TRPs, and the second DMRS configuration associated with a second TRP of the multiple TRPs.

In some examples, to support transmitting the second control signaling, the dynamic configuration manager 1330 may be configured as or otherwise support a means for transmitting a MAC-CE indicating a set of combinations of the one or more DMRS configurations or corresponding parameters in combination with transmission mode indicators or a corresponding transmission mode indication. In some examples, to support transmitting the second control signaling, the dynamic configuration manager 1330 may be configured as or otherwise support a means for transmitting a DCI message including an indication of the one or more DMRS configurations and the transmission mode out of the set of combinations indicated by the MAC-CE.

In some examples, the capability manager 1350 may be configured as or otherwise support a means for receiving, from the UE, a message including capability information corresponding to a maximum number of simultaneously addressed DMRS configurations per PDSCH allocation and a list of PDSCH transmission modes supported by the UE. In some examples, the dynamic configuration manager 1330 may be configured as or otherwise support a means for determining a length of one or more fields of a DCI message indicating the at least one DMRS configuration and the transmission mode based on receiving the message, transmitting the first control signaling, transmitting the second control signaling, or any combination thereof.

In some examples, to support transmitting the second control signaling, the joint DMRS configuration and transmission mode manager 1335 may be configured as or otherwise support a means for transmitting a DCI message including one or more fields indicating the at least one DMRS configuration and the transmission mode.

In some examples, the first control signaling includes RRC signaling indicating a downlink configuration candidate table, and the joint DMRS configuration and transmission mode manager 1335 may be configured as or otherwise support a means for transmitting a MAC-CE activating a set of multiple downlink configurations from the downlink configuration candidate table. In some examples, the first control signaling includes RRC signaling indicating a downlink configuration candidate table, and the joint DMRS configuration and transmission mode manager 1335 may be configured as or otherwise support a means for transmitting a DCI message indicating a downlink configuration from the set of multiple downlink configurations activated by the MAC-CE for an associated data message of the one or more data messages.

In some examples, to support transmitting the first control signaling, the configuration manager 1325 may be configured as or otherwise support a means for transmitting RRC signaling configuring a list of one or more downlink configuration options based on a capability of the UE to support the list of the one or more downlink configuration options, where one or more downlink configuration options can be activated based on a MAC-CE, where the second control signaling includes the MAC-CE and each downlink configuration option of the one or more downlink configuration options is a combination of a transmission mode or a set of transmission parameters identifying the transmission mode and a set of one or more DMRS configuration parameters associated with a corresponding transmission mode.

In some examples, the one or more DMRS configuration parameters include a number of additional DMRS symbol locations.

Figure 14:
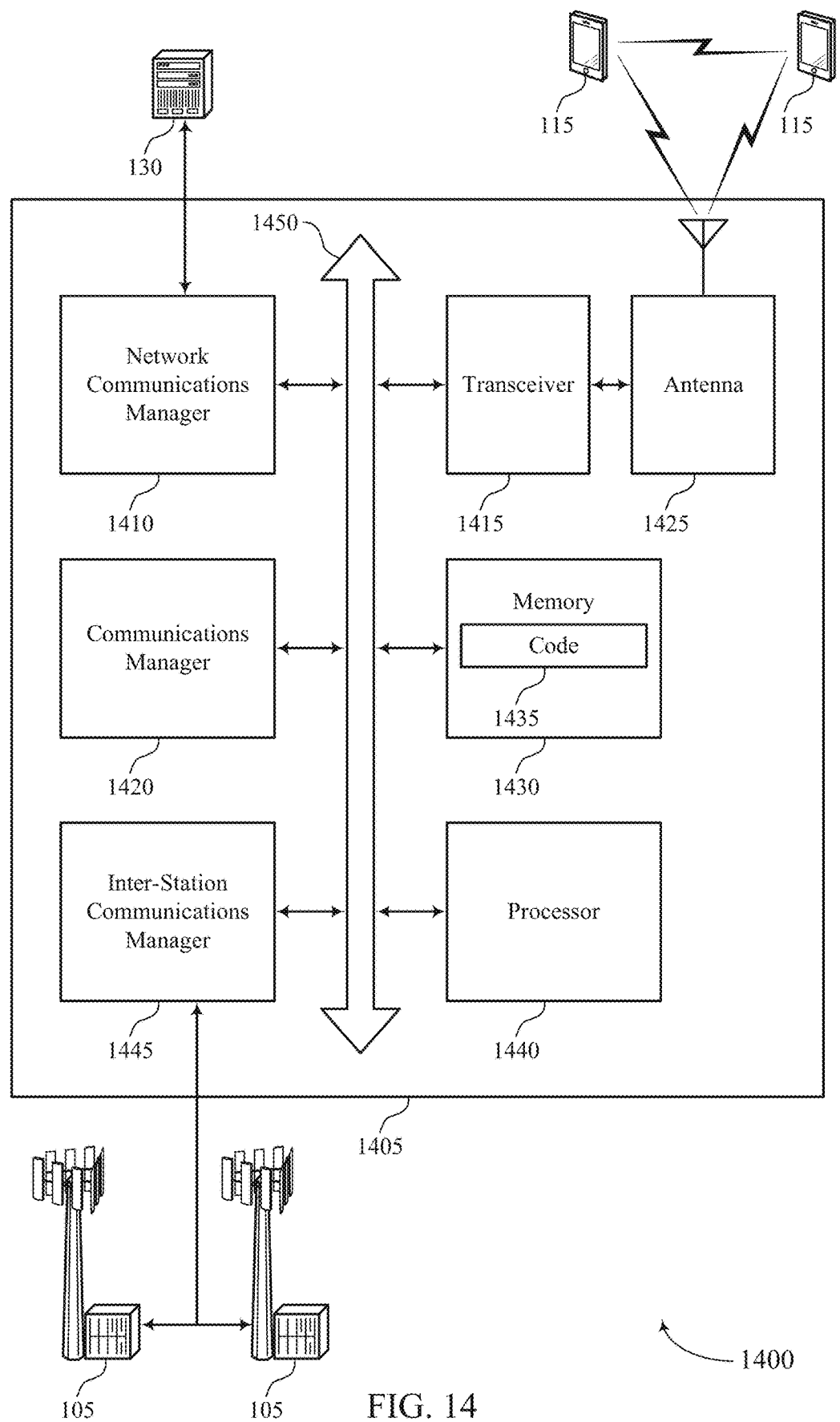
FIG. 14 shows a diagram of a system including a device that supports dynamic configuration signaling of DMRS and transmission mode in accordance with aspects of the present disclosure.

FIG. 14 shows a diagram of a system 1400 including a device 1405 that supports configuration signaling of DMRS and transmission mode in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting configuration signaling of DMRS and transmission mode). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The communications manager 1420 may be configured as or otherwise support a means for transmitting second control signaling indicating a transmission mode of the set of transmission modes or a combination of transmission mode indicators and a combination of one or more DMRS configuration parameters to signal one or more DMRS configurations corresponding to the transmission mode. The communications manager 1420 may be configured as or otherwise support a means for transmitting one or more DMRSs from the multiple TRPs according to at least one DMRS configuration of the set of DMRS configurations and the transmission mode of the set of transmission modes based on the transmission mode indicators and the one or more DMRS configuration parameters. The communications manager 1420 may be configured as or otherwise support a means for transmitting, via the multiple TRPs, the one or more data messages based on the transmission mode and the transmitted one or more DMRSs.

By including or configuring the communications manager 1420 in accordance with examples as described herein, the device 1405 may support techniques for a base station to transmit control signaling including a joint DMRS configuration and transmission mode configuration to a UE, which may improve communication reliability, reduce latency, improve user experience related to reduced processing, reduce power consumption, cause more efficient utilization of communication resources, improve coordination between devices, increase battery life, improve utilization of processing capability, and the like.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of configuration signaling of DMRS and transmission mode as described herein, or the processor 1440 and the memory 1430 may be otherwise configured to perform or support such operations.

Figure 15:
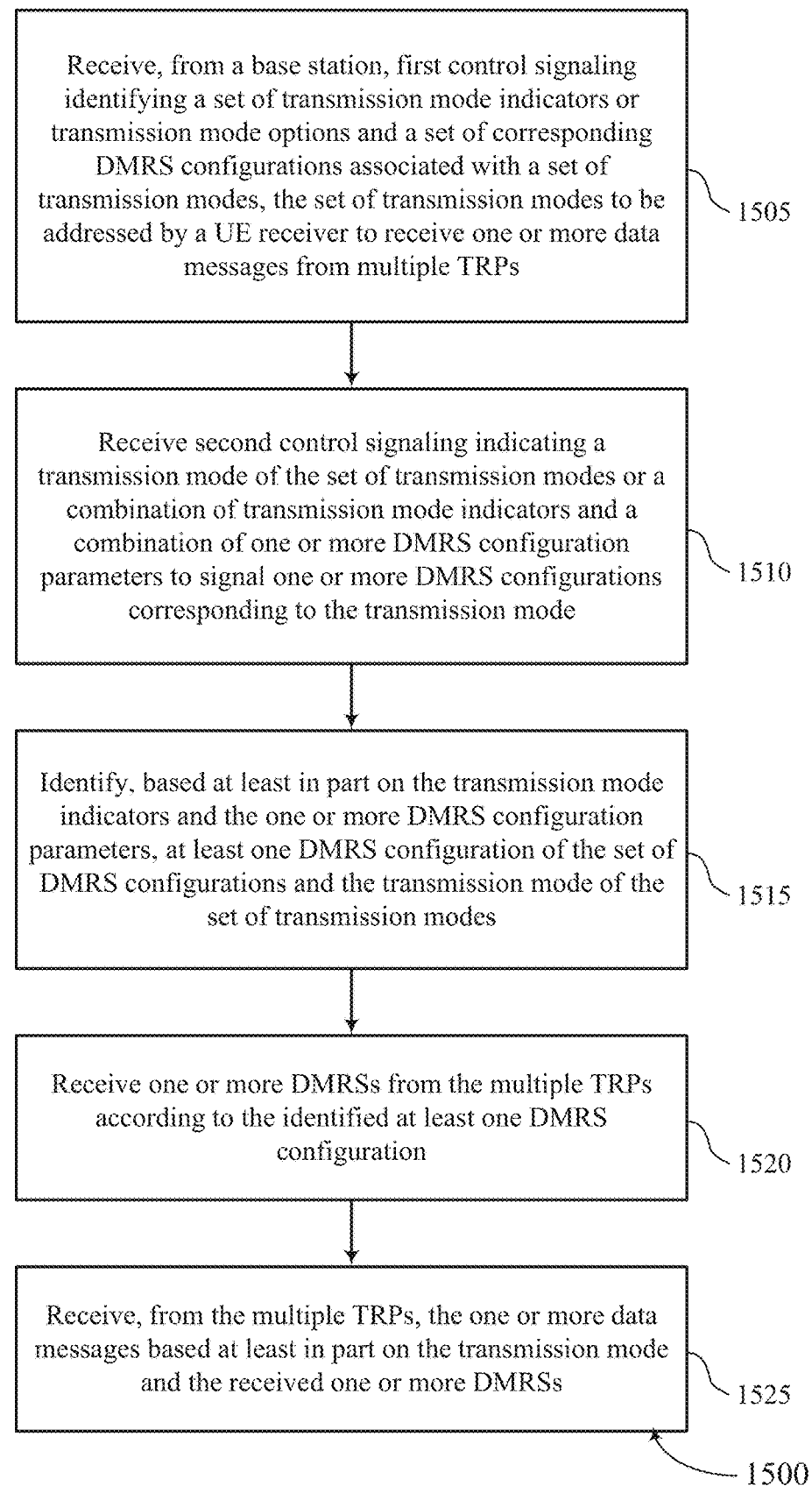
FIGS. 15 through 19 show flowcharts illustrating methods that support dynamic configuration signaling of DMRS and transmission mode in accordance with aspects of the present disclosure.

FIG. 15 shows a flowchart illustrating a method 1500 that supports configuration signaling of DMRS and transmission mode in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The operations of 1505 may be performed in accordance with examples as disclosed herein. In some examples, aspects of the operations of 1505 may be performed by a configuration component 925 as described with reference to FIG. 9.

At 1510, the method may include receiving second control signaling indicating a transmission mode of the set of transmission modes or a combination of transmission mode indicators and a combination of one or more DMRS configuration parameters to signal one or more DMRS configurations corresponding to the transmission mode. The operations of 1510 may be performed in accordance with examples as disclosed herein. In some examples, aspects of the operations of 1510 may be performed by a dynamic configuration component 930 as described with reference to FIG. 9.

At 1515, the method may include identifying, based on the transmission mode indicators and the one or more DMRS configuration parameters, at least one DMRS configuration of the set of DMRS configurations and the transmission mode of the set of transmission modes. The operations of 1515 may be performed in accordance with examples as disclosed herein. In some examples, aspects of the operations of 1515 may be performed by a joint DMRS configuration and transmission mode component 935 as described with reference to FIG. 9.

At 1520, the method may include receiving one or more DMRSs from the multiple TRPs according to the identified at least one DMRS configuration. The operations of 1520 may be performed in accordance with examples as disclosed herein. In some examples, aspects of the operations of 1520 may be performed by a DMRS component 940 as described with reference to FIG. 9.

At 1525, the method may include receiving, from the multiple TRPs, the one or more data messages based on the transmission mode and the received one or more DMRSs. The operations of 1525 may be performed in accordance with examples as disclosed herein. In some examples, aspects of the operations of 1525 may be performed by a data message component 945 as described with reference to FIG. 9.

Figure 16:
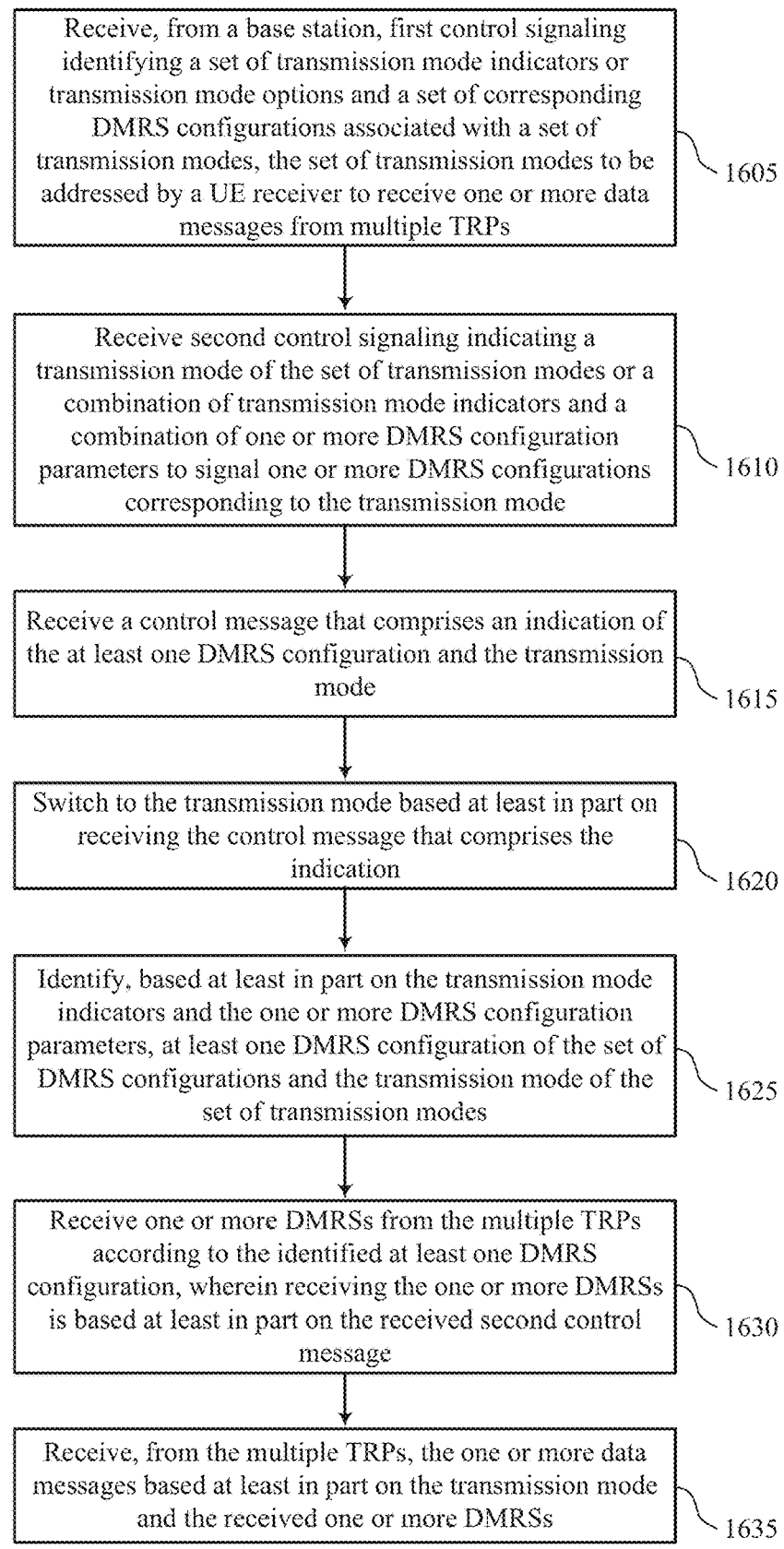

FIG. 16 shows a flowchart illustrating a method 1600 that supports configuration signaling of DMRS and transmission mode in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The operations of 1605 may be performed in accordance with examples as disclosed herein. In some examples, aspects of the operations of 1605 may be performed by a configuration component 925 as described with reference to FIG. 9.

At 1610, the method may include receiving second control signaling indicating a transmission mode of the set of transmission modes or a combination of transmission mode indicators and a combination of one or more DMRS configuration parameters to signal one or more DMRS configurations corresponding to the transmission mode. The operations of 1610 may be performed in accordance with examples as disclosed herein. In some examples, aspects of the operations of 1610 may be performed by a dynamic configuration component 930 as described with reference to FIG. 9.

At 1615, the method may include receiving a control message that includes an indication of the at least one DMRS configuration and the transmission mode. The operations of 1615 may be performed in accordance with examples as disclosed herein. In some examples, aspects of the operations of 1615 may be performed by a dynamic configuration component 930 as described with reference to FIG. 9.

At 1620, the method may include switching to the transmission mode based on receiving the control message that includes the indication. The operations of 1620 may be performed in accordance with examples as disclosed herein.

In some examples, aspects of the operations of 1620 may be performed by a transmission mode component 950 as described with reference to FIG. 9.

At 1625, the method may include identifying, based on the transmission mode indicators and the one or more DMRS configuration parameters, at least one DMRS configuration of the set of DMRS configurations and the transmission mode of the set of transmission modes. The operations of 1625 may be performed in accordance with examples as disclosed herein. In some examples, aspects of the operations of 1625 may be performed by a joint DMRS configuration and transmission mode component 935 as described with reference to FIG. 9.

At 1630, the method may include receiving one or more DMRSs from the multiple TRPs according to the identified at least one DMRS configuration, where receiving the one or more DMRSs is based on the received second control message. The operations of 1630 may be performed in accordance with examples as disclosed herein. In some examples, aspects of the operations of 1630 may be performed by a DMRS component 940 as described with reference to FIG. 9.

At 1635, the method may include receiving, from the multiple TRPs, the one or more data messages based on the transmission mode and the received one or more DMRSs. The operations of 1635 may be performed in accordance with examples as disclosed herein. In some examples, aspects of the operations of 1635 may be performed by a data message component 945 as described with reference to FIG. 9.

Figure 17:
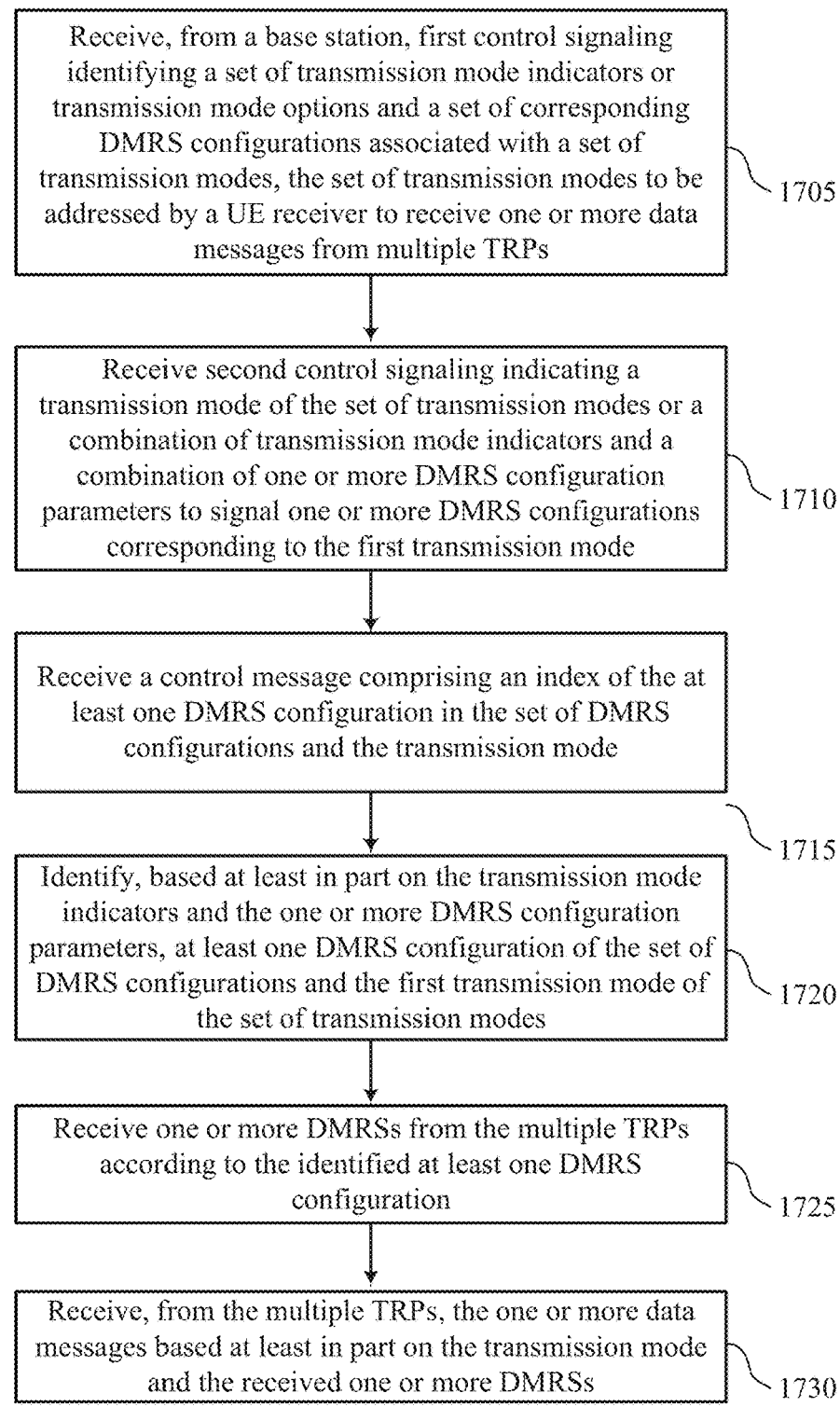

FIG. 17 shows a flowchart illustrating a method 1700 that supports configuration signaling of DMRS and transmission mode in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The operations of 1705 may be performed in accordance with examples as disclosed herein. In some examples, aspects of the operations of 1705 may be performed by a configuration component 925 as described with reference to FIG. 9.

At 1710, the method may include receiving second control signaling indicating a transmission mode of the set of transmission modes or a combination of transmission mode indicators and a combination of one or more DMRS configuration parameters to signal one or more DMRS configurations corresponding to the transmission mode. The operations of 1710 may be performed in accordance with examples as disclosed herein. In some examples, aspects of the operations of 1710 may be performed by a dynamic configuration component 930 as described with reference to FIG. 9.

At 1715, the method may include receiving a control message including an index of the at least one DMRS configuration in the set of DMRS configurations and the transmission mode. The operations of 1715 may be performed in accordance with examples as disclosed herein. In some examples, aspects of the operations of 1715 may be performed by a dynamic configuration component 930 as described with reference to FIG. 9.

At 1720, the method may include identifying, based on the transmission mode indicators and the one or more DMRS configuration parameters, at least one DMRS configuration of the set of DMRS configurations and the transmission mode of the set of transmission modes. The operations of 1720 may be performed in accordance with examples as disclosed herein. In some examples, aspects of the operations of 1720 may be performed by a joint DMRS configuration and transmission mode component 935 as described with reference to FIG. 9.

At 1725, the method may include receiving one or more DMRSs from the multiple TRPs according to the identified at least one DMRS configuration. The operations of 1725 may be performed in accordance with examples as disclosed herein. In some examples, aspects of the operations of 1725 may be performed by a DMRS component 940 as described with reference to FIG. 9.

At 1730, the method may include receiving, from the multiple TRPs, the one or more data messages based on the transmission mode and the received one or more DMRSs. The operations of 1730 may be performed in accordance with examples as disclosed herein. In some examples, aspects of the operations of 1730 may be performed by a data message component 945 as described with reference to FIG. 9.

Figure 18:
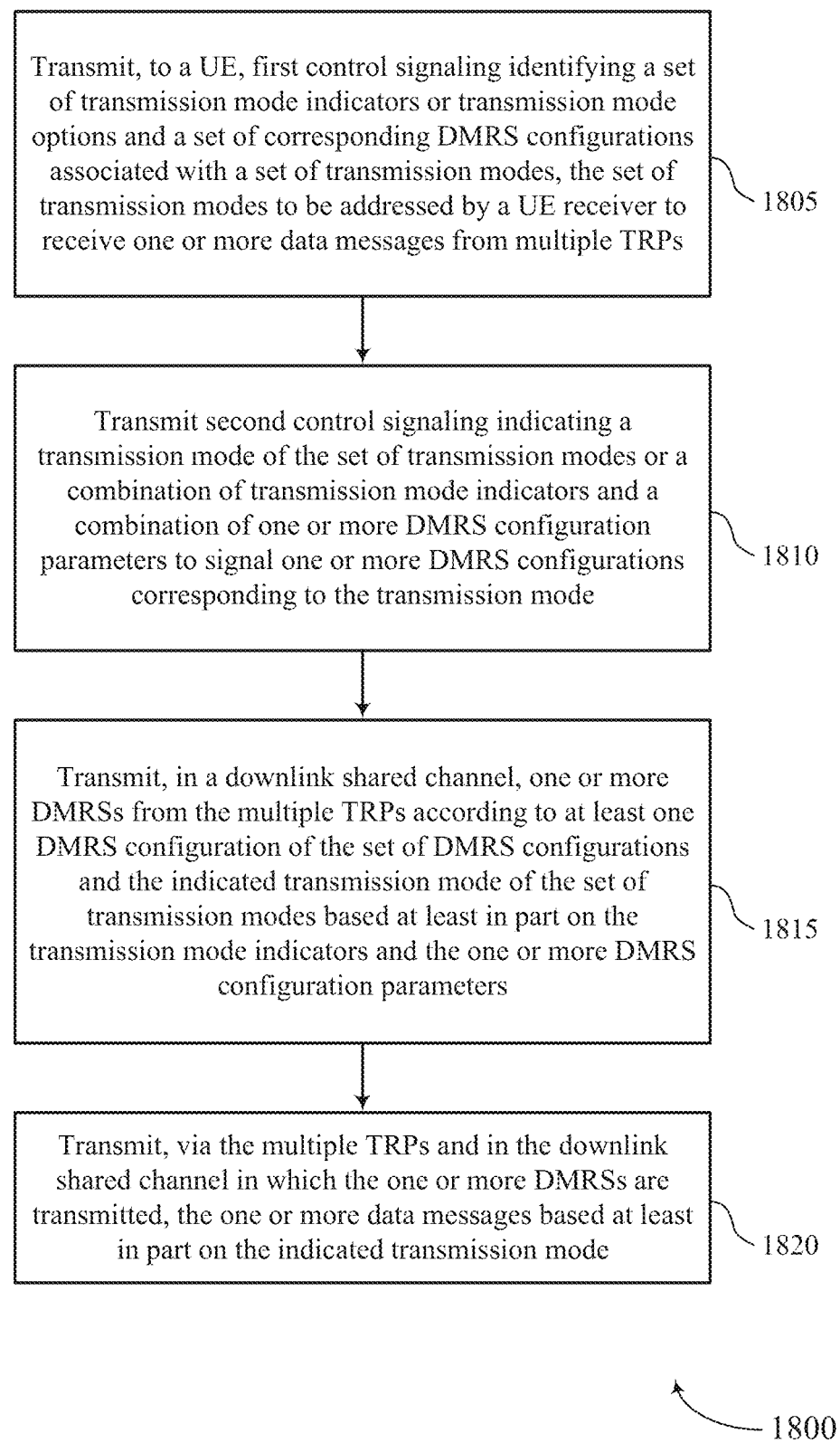

FIG. 18 shows a flowchart illustrating a method 1800 that supports configuration signaling of DMRS and transmission mode in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The operations of 1805 may be performed in accordance with examples as disclosed herein. In some examples, aspects of the operations of 1805 may be performed by a configuration manager 1325 as described with reference to FIG. 13.

At 1810, the method may include transmitting second control signaling indicating a transmission mode of the set of transmission modes or a combination of transmission mode indicators and a combination of one or more DMRS configuration parameters to signal one or more DMRS configurations corresponding to the transmission mode. The operations of 1810 may be performed in accordance with examples as disclosed herein. In some examples, aspects of the operations of 1810 may be performed by a dynamic configuration manager 1330 as described with reference to FIG. 13.

At 1815, the method may include transmitting, in a downlink shared channel, one or more DMRSs from the multiple TRPs according to at least one DMRS configuration of the set of DMRS configurations and the transmission mode of the set of transmission modes based on the transmission mode indicators and the one or more DMRS configuration parameters. The operations of 1815 may be performed in accordance with examples as disclosed herein. In some examples, aspects of the operations of 1815 may be performed by a joint DMRS configuration and transmission mode manager 1335 as described with reference to FIG. 13.

At 1820, the method may include transmitting, via the multiple TRPs and in the downlink shared channel in which the one or more DMRSs are transmitted, the one or more data messages based at least in part on the indicated transmission mode. The operations of 1820 may be performed in accordance with examples as disclosed herein. In some examples, aspects of the operations of 1820 may be performed by a data message manager 1340 as described with reference to FIG. 13.

Figure 19:
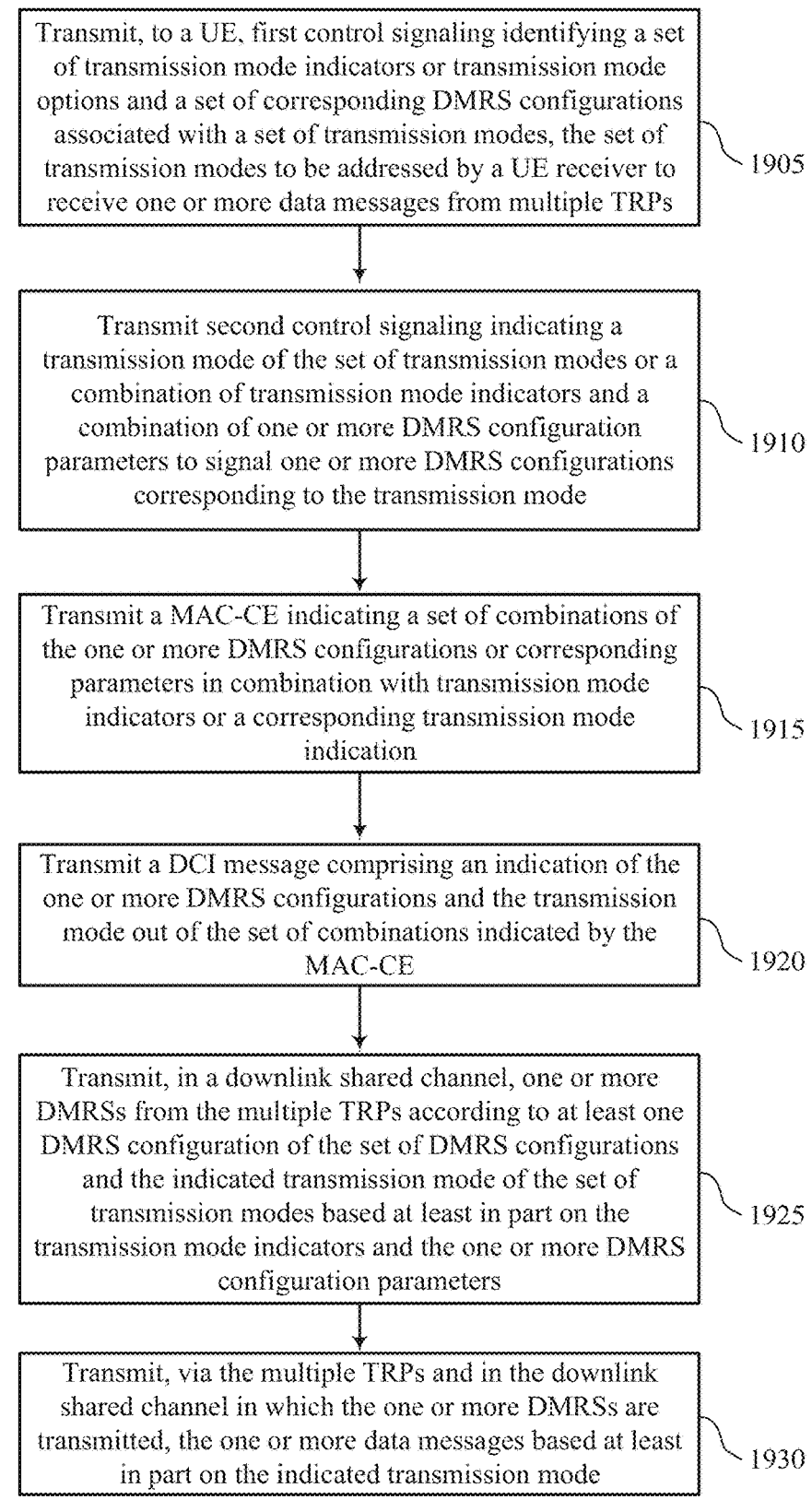

FIG. 19 shows a flowchart illustrating a method 1900 that supports configuration signaling of DMRS and transmission mode in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, first control signaling identifying a set of transmission mode indicators or transmission mode options and a set of corresponding DMRS configurations associated with a set of transmission modes, the set of transmission modes to be addressed by a UE receiver to receive one or more data messages from multiple TRPs. The operations of 1905 may be performed in accordance with examples as disclosed herein. In some examples, aspects of the operations of 1905 may be performed by a configuration manager 1325 as described with reference to FIG. 13.

At 1910, the method may include transmitting second control signaling indicating a transmission mode of the set of transmission modes or a combination of transmission mode indicators and a combination of one or more DMRS configuration parameters to signal one or more DMRS configurations corresponding to the transmission mode. The operations of 1910 may be performed in accordance with examples as disclosed herein. In some examples, aspects of the operations of 1910 may be performed by a dynamic configuration manager 1330 as described with reference to FIG. 13.

At 1915, the method may include transmitting a MAC-CE indicating a set of combinations of the one or more DMRS configurations or corresponding parameters in combination with transmission mode indicators or a corresponding transmission mode indication. The operations of 1915 may be performed in accordance with examples as disclosed herein. In some examples, aspects of the operations of 1915 may be performed by a dynamic configuration manager 1330 as described with reference to FIG. 13.

At 1920, the method may include transmitting a DCI message including an indication of the one or more DMRS configurations and the transmission mode out of the set of combinations indicated by the MAC-CE. The operations of 1920 may be performed in accordance with examples as disclosed herein. In some examples, aspects of the operations of 1920 may be performed by a dynamic configuration manager 1330 as described with reference to FIG. 13.

At 1925, the method may include transmitting, in a downlink shared channel, one or more DMRSs from the multiple TRPs according to at least one DMRS configuration of the set of DMRS configurations and the transmission mode of the set of transmission modes based on the transmission mode indicators and the one or more DMRS configuration parameters. The operations of 1925 may be performed in accordance with examples as disclosed herein. In some examples, aspects of the operations of 1925 may be performed by a joint DMRS configuration and transmission mode manager 1335 as described with reference to FIG. 13.

At 1930, the method may include transmitting, via the multiple TRPs and in the downlink shared channel in which the one or more DMRSs are transmitted, the one or more data messages based at least in part on the indicated transmission mode. The operations of 1930 may be performed in accordance with examples as disclosed herein. In some examples, aspects of the operations of 1930 may be performed by a data message manager 1340 as described with reference to FIG. 13.

The following provides an overview of aspects of the present disclosure:

Aspect 1: A method for wireless communication at a UE, comprising: receiving, from a base station, first control signaling identifying a set of transmission mode indicators or transmission mode options and a set of corresponding demodulation reference signal configurations associated with each transmission mode of a set of transmission modes, the set of transmission modes to be addressed by a UE receiver to receive one or more data messages from multiple transmission reception points; receiving second control signaling indicating a transmission mode of the set of transmission modes or a combination of transmission mode indicators and a combination of one or more demodulation reference signal configuration parameters to signal one or more demodulation reference signal configurations corresponding to the indicated transmission mode; identifying, based at least in part on the transmission mode indicators and the one or more demodulation reference signal configuration parameters, at least one demodulation reference signal configuration of the set of demodulation reference signal configurations and the transmission mode of the set of transmission modes; receiving one or more demodulation reference signals from the multiple transmission reception points according to the identified at least one demodulation reference signal configuration; and receiving, from the multiple transmission reception points, the one or more data messages based at least in part on the indicated transmission mode and the received one or more demodulation reference signals.

Aspect 2: The method of aspect 1, wherein receiving the second control signaling comprises: receiving a control message that comprises an indication of the at least one demodulation reference signal configuration and the transmission mode; and switching to the transmission mode based at least in part on receiving the control message that comprises the indication, wherein receiving the one or more demodulation reference signals is based at least in part on the received second control message.

Aspect 3: The method of any of aspects 1 through 2, wherein receiving the second control signaling comprises: receiving a control message comprising an index of the at least one demodulation reference signal configuration in the set of demodulation reference signal configurations and the transmission mode.

Aspect 4: The method of any of aspects 1 through 3, wherein identifying the at least one demodulation reference signal configuration of the set of demodulation reference signal configurations comprises: identifying, based at least in part on the combination of transmission mode indicators or the transmission mode and the one or more demodulation reference signal configuration parameters, a first demodulation reference signal configuration and a second demodulation reference signal configuration of the set of demodulation reference signal configurations, the first demodulation reference signal configuration associated with a first transmission reception point of the multiple transmission reception points, and the second demodulation reference signal configuration associated with a second transmission reception point of the multiple transmission reception points.

Aspect 5: The method of any of aspects 1 through 4, wherein receiving the second control signaling comprises: receiving a medium access control-control element indicating a set of combinations of the one or more demodulation reference signal configurations or corresponding parameters in combination with transmission mode indicators or a corresponding transmission mode indication; and receiving a downlink control information message comprising an indication of the at least one demodulation reference signal configuration and the transmission mode out of the set of combinations indicated by the medium access control-control element.

Aspect 6: The method of any of aspects 1 through 5, further comprising: transmitting, to the base station, a message comprising capability information corresponding to a maximum number of simultaneously addressed demodulation reference signal configurations per physical downlink shared channel allocation and a list of physical downlink shared channel transmission modes supported by the UE; and determining a length of one or more fields of a downlink control information message indicating the at least one demodulation reference signal configuration and the transmission mode based at least in part on transmitting the message, receiving the first control signaling, receiving the second control signaling, or any combination thereof.

Aspect 7: The method of any of aspects 1 through 4, wherein receiving the second control signaling comprises: receiving a downlink control information message comprising one or more fields indicating the at least one demodulation reference signal configuration and the transmission mode.

Aspect 8: The method of aspect 7, wherein the one or more fields comprise a first field for the at least one demodulation reference signal configuration and a second field for the transmission mode.

Aspect 9: The method of any of aspects 7 through 8, wherein the one or more fields comprise a first field for a first configuration of the at least one demodulation reference signal configuration that corresponds to a first transmission reception point of the multiple transmission reception points, a second field for a second configuration of the at least one demodulation reference signal configuration that corresponds to a second transmission reception point of the multiple transmission reception points, and a third field corresponding to the transmission mode.

Aspect 10: The method of any of aspects 7 through 9, wherein the one or more fields comprise a field for a joint signaling of the at least one demodulation reference signal configuration and the transmission mode.

Aspect 11: The method of any of aspects 1 through 10, wherein the first control signaling comprises radio resource control signaling indicating a downlink configuration candidate table, the method further comprising: receiving a medium access control-control element activating a plurality of downlink configurations from the downlink configuration candidate table; and receiving a downlink control information message indicating a downlink configuration from the plurality of downlink configurations activated by the medium access control-control element for an associated data message of the one or more data messages.

Aspect 12: The method of aspect 11, further comprising: receiving, before receiving the medium access control-control element activating the plurality of downlink configurations, the one or more data messages from the multiple transmission reception points according to a default or a pre-determined or configured by a regular radio resource control configuration transmission mode and demodulation reference signal configuration.

Aspect 13: The method of any of aspects 1 through 10, wherein receiving the first control signaling comprises: receiving radio resource control signaling configuring a list of one or more downlink configuration options based at least in part on a capability of the UE to support the list of the one or more downlink configuration options, wherein one or more downlink configuration options can be activated based at least in part on a medium access control-control element, wherein the second control signaling comprises the medium access control-control element and each downlink configuration option of the one or more downlink configuration options is a combination of a transmission mode or a set of transmission parameters identifying the transmission mode and a set of one or more demodulation reference signal configuration parameters associated with a corresponding transmission mode.

Aspect 14: The method of any of aspects 1 through 13, further comprising: receiving, based at least in part on the received one or more demodulation reference signals, the one or more data messages from a first transmission reception point and a second transmission reception point based at least in part on the transmission mode indicated by the received control signaling.

Aspect 15: The method of any of aspects 1 through 14, wherein the one or more demodulation reference signal configuration parameters comprise a number of additional demodulation reference signal symbol locations.

Aspect 16: A method for wireless communication at a base station, comprising: transmitting, to a UE, first control signaling identifying a set of transmission mode indicators or transmission mode options and a set of corresponding demodulation reference signal configurations associated with each transmission mode of a set of transmission modes, the set of transmission modes to be addressed by a UE receiver to receive one or more data messages from multiple transmission reception points; transmitting second control signaling indicating a transmission mode of the set of transmission modes or a combination of transmission mode indicators and a combination of one or more demodulation reference signal configuration parameters to signal one or more demodulation reference signal configurations corresponding to the transmission mode; transmitting, in a downlink shared channel, one or more demodulation reference signals from the multiple transmission reception points according to at least one demodulation reference signal configuration of the set of demodulation reference signal configurations and the indicated transmission mode of the set of transmission modes based at least in part on the transmission mode indicators and the one or more demodulation reference signal configuration parameters; and transmitting, via the multiple transmission reception points and in the downlink shared channel in which the one or more demodulation reference signals are transmitted, the one or more data messages based at least in part on the indicated transmission mode.

Aspect 17: The method of aspect 16, wherein transmitting the second control signaling comprises: transmitting a control message that comprises an indication of the at least one demodulation reference signal configuration and the transmission mode; and switching to the transmission mode based at least in part on transmitting the control message that comprises the indication, wherein transmitting the one or more demodulation reference signals is based at least in part on the transmitted second control message.

Aspect 18: The method of any of aspects 16 through 17, wherein transmitting the second control signaling comprises: transmitting a control message comprising an index of the at least one demodulation reference signal configuration in the set of demodulation reference signal configurations and the transmission mode.

Aspect 19: The method of any of aspects 16 through 18, wherein a first combination of transmission mode indicators or the transmission mode and the one or more demodulation reference signal configuration parameters indicate at least a first demodulation reference signal configuration and a second demodulation reference signal configuration of the set of demodulation reference signal configurations, the first demodulation reference signal configuration associated with a first transmission reception point of the multiple transmission reception points, and the second demodulation reference signal configuration associated with a second transmission reception point of the multiple transmission reception points.

Aspect 20: The method of any of aspects 16 through 19, wherein transmitting the second control signaling comprises: transmitting a medium access control-control element indicating a set of combinations of the one or more demodulation reference signal configurations or corresponding parameters in combination with transmission mode indicators or a corresponding transmission mode indication; and transmitting a downlink control information message comprising an indication of the one or more demodulation reference signal configurations and the transmission mode out of the set of combinations indicated by the medium access control-control element.

Aspect 21: The method of any of aspects 16 through 20, further comprising: receiving, from the UE, a message comprising capability information corresponding to a maximum number of simultaneously addressed demodulation reference signal configurations per physical downlink shared channel allocation and a list of physical downlink shared channel transmission modes supported by the UE; and determining a length of one or more fields of a downlink control information message indicating the at least one demodulation reference signal configuration and the transmission mode based at least in part on receiving the message, transmitting the first control signaling, transmitting the second control signaling, or any combination thereof.

Aspect 22: The method of any of aspects 16 through 19, wherein transmitting the second control signaling comprises: transmitting a downlink control information message comprising one or more fields indicating the at least one demodulation reference signal configuration and the transmission mode.

Aspect 23: The method of any of aspects 16 through 22, wherein the first control signaling comprises radio resource control signaling indicating a downlink configuration candidate table, the method further comprising: transmitting a medium access control-control element activating a plurality of downlink configurations from the downlink configuration candidate table; and transmitting a downlink control information message indicating a downlink configuration from the plurality of downlink configurations activated by the medium access control-control element for an associated data message of the one or more data messages.

Aspect 24: The method of any of aspects 16 through 23, wherein transmitting the first control signaling comprises: transmitting radio resource control signaling configuring a list of one or more downlink configuration options based at least in part on a capability of the UE to support the list of the one or more downlink configuration options, wherein one or more downlink configuration options can be activated based at least in part on a medium access control-control element, wherein the second control signaling comprises the medium access control-control element and each downlink configuration option of the one or more downlink configuration options is a combination of a transmission mode or a set of transmission parameters identifying the transmission mode and a set of one or more demodulation reference signal configuration parameters associated with a corresponding transmission mode.

Aspect 25: The method of any of aspects 16 through 24, wherein the one or more demodulation reference signal configuration parameters comprise a number of additional demodulation reference signal symbol locations.

Aspect 26: An apparatus for wireless communication at a UE, comprising a processor; memory coupled with the processor; and instructions stored in the memory and executable by the processor to cause the apparatus to perform a method of any of aspects 1 through 15.

Aspect 27: An apparatus for wireless communication at a UE, comprising at least one means for performing a method of any of aspects 1 through 15.

Aspect 28: A non-transitory computer-readable medium storing code for wireless communication at a UE, the code comprising instructions executable by a processor to perform a method of any of aspects 1 through 15.

Aspect 29: An apparatus for wireless communication at a base station, comprising a processor; memory coupled with the processor; and instructions stored in the memory and executable by the processor to cause the apparatus to perform a method of any of aspects 16 through 25.

Aspect 30: An apparatus for wireless communication at a base station, comprising at least one means for performing a method of any of aspects 16 through 25.

Aspect 31: A non-transitory computer-readable medium storing code for wireless communication at a base station, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, first control signaling identifying a set of transmission mode indicators or transmission mode options and a set of corresponding demodulation reference signal configurations associated with each transmission mode of a set of transmission modes, the set of transmission modes to be addressed by a UE receiver to receive one or more data messages from multiple transmission reception points;
   receiving, from the base station, second control signaling indicating a transmission mode of the set of transmission modes or a combination of transmission mode indicators and a combination of one or more demodulation reference signal configuration parameters to signal one or more demodulation reference signal configurations corresponding to the indicated transmission mode;
   identifying, based at least in part on the transmission mode indicators and the one or more demodulation reference signal configuration parameters, at least one demodulation reference signal configuration of the set of demodulation reference signal configurations and the transmission mode of the set of transmission modes;
   receiving one or more demodulation reference signals from the multiple transmission reception points according to the identified at least one demodulation reference signal configuration; and
   receiving, from the multiple transmission reception points, the one or more data messages based at least in part on the indicated transmission mode and the received one or more demodulation reference signals.

2. The method of claim 1, wherein receiving the second control signaling comprises:
   receiving a control message that comprises an indication of the at least one demodulation reference signal configuration and the transmission mode; and
   switching to the transmission mode based at least in part on receiving the control message that comprises the indication, wherein receiving the one or more demodulation reference signals is based at least in part on the received second control message.

3. The method of claim 1, wherein receiving the second control signaling comprises:
   receiving a control message comprising an index of the at least one demodulation reference signal configuration in the set of demodulation reference signal configurations and the transmission mode.

4. The method of claim 1, wherein identifying the at least one demodulation reference signal configuration of the set of demodulation reference signal configurations comprises:
   identifying, based at least in part on the combination of transmission mode indicators or the transmission mode and the one or more demodulation reference signal configuration parameters, a first demodulation reference signal configuration and a second demodulation reference signal configuration of the set of demodulation reference signal configurations, the first demodulation reference signal configuration associated with a first transmission reception point of the multiple transmission reception points, and the second demodulation reference signal configuration associated with a second transmission reception point of the multiple transmission reception points.

5. The method of claim 1, wherein receiving the second control signaling comprises:
   receiving a medium access control-control element indicating a set of combinations of the one or more demodulation reference signal configurations or corresponding parameters in combination with transmission mode indicators or a corresponding transmission mode indication; and receiving a downlink control information message comprising an indication of the at least one demodulation reference signal configuration and the transmission mode out of the set of combinations indicated by the medium access control-control element.

6. The method of claim 1, further comprising:
transmitting, to the base station, a message comprising capability information corresponding to a maximum number of simultaneously addressed demodulation reference signal configurations per physical downlink shared channel allocation and a list of physical downlink shared channel transmission modes supported by the UE; and
determining a length of one or more fields of a downlink control information message indicating the at least one demodulation reference signal configuration and the transmission mode based at least in part on transmitting the message, receiving the first control signaling, receiving the second control signaling, or any combination thereof.

7. The method of claim 1, wherein receiving the second control signaling comprises:
receiving a downlink control information message comprising one or more fields indicating the at least one demodulation reference signal configuration and the transmission mode.

8. The method of claim 7, wherein the one or more fields comprise a first field for the at least one demodulation reference signal configuration and a second field for the transmission mode.

9. The method of claim 7, wherein the one or more fields comprise a first field for a first configuration of the at least one demodulation reference signal configuration that corresponds to a first transmission reception point of the multiple transmission reception points, a second field for a second configuration of the at least one demodulation reference signal configuration that corresponds to a second transmission reception point of the multiple transmission reception points, and a third field corresponding to the transmission mode.

10. The method of claim 7, wherein the one or more fields comprise a field for a joint signaling of the at least one demodulation reference signal configuration and the transmission mode.

11. The method of claim 1, wherein the first control signaling comprises radio resource control signaling indicating a downlink configuration candidate table, the method further comprising:
receiving a medium access control-control element activating a plurality of downlink configurations from the downlink configuration candidate table; and
receiving a downlink control information message indicating a downlink configuration from the plurality of downlink configurations activated by the medium access control-control element for an associated data message of the one or more data messages.

12. The method of claim 11, further comprising:
receiving, before receiving the medium access control-control element activating the plurality of downlink configurations, the one or more data messages from the multiple transmission reception points according to a default or a pre-determined or configured by a regular radio resource control configuration transmission mode and demodulation reference signal configuration.

13. The method of claim 1, wherein receiving the first control signaling comprises:

receiving radio resource control signaling configuring a list of one or more downlink configuration options based at least in part on a capability of the UE to support the list of the one or more downlink configuration options, wherein one or more downlink configuration options can be activated based at least in part on a medium access control-control element, wherein the second control signaling comprises the medium access control-control element and each downlink configuration option of the one or more downlink configuration options is a combination of a transmission mode or a set of transmission parameters identifying the transmission mode and a set of one or more demodulation reference signal configuration parameters associated with a corresponding transmission mode.

14. The method of claim 1, further comprising:
receiving, based at least in part on the received one or more demodulation reference signals, the one or more data messages from a first transmission reception point and a second transmission reception point based at least in part on the transmission mode indicated by the received control signaling.

15. The method of claim 1, wherein the one or more demodulation reference signal configuration parameters comprise a number of additional demodulation reference signal symbol locations.

16. A method for wireless communication at a base station, comprising:
transmitting, to a user equipment (UE), first control signaling identifying a set of transmission mode indicators or transmission mode options and a set of corresponding demodulation reference signal configurations associated with each transmission mode of a set of transmission modes, the set of transmission modes to be addressed by a UE receiver to receive one or more data messages from multiple transmission reception points;
transmitting, to the UE, second control signaling indicating a transmission mode of the set of transmission modes or a combination of transmission mode indicators and a combination of one or more demodulation reference signal configuration parameters to signal one or more demodulation reference signal configurations corresponding to the transmission mode;
transmitting, to the UE in a downlink shared channel, one or more demodulation reference signals from the multiple transmission reception points according to at least one demodulation reference signal configuration of the set of demodulation reference signal configurations and the indicated transmission mode of the set of transmission modes based at least in part on the transmission mode indicators and the one or more demodulation reference signal configuration parameters; and
transmitting, to the UE via the multiple transmission reception points and in the downlink shared channel in which the one or more demodulation reference signals are transmitted, the one or more data messages based at least in part on the indicated transmission mode.

17. The method of claim 16, wherein transmitting the second control signaling comprises:
transmitting a control message that comprises an indication of the at least one demodulation reference signal configuration and the transmission mode; and
switching to the transmission mode based at least in part on transmitting the control message that comprises the indication, wherein transmitting the one or more demodulation reference signals is based at least in part on the transmitted second control message.

18. The method of claim 16, wherein transmitting the second control signaling comprises:
    transmitting a control message comprising an index of the at least one demodulation reference signal configuration in the set of demodulation reference signal configurations and the transmission mode.

19. The method of claim 16, wherein a first combination of transmission mode indicators or the transmission mode and the one or more demodulation reference signal configuration parameters indicate at least a first demodulation reference signal configuration and a second demodulation reference signal configuration of the set of demodulation reference signal configurations, the first demodulation reference signal configuration associated with a first transmission reception point of the multiple transmission reception points, and the second demodulation reference signal configuration associated with a second transmission reception point of the multiple transmission reception points.

20. The method of claim 16, wherein transmitting the second control signaling comprises:
    transmitting a medium access control-control element indicating a set of combinations of the one or more demodulation reference signal configurations or corresponding parameters in combination with transmission mode indicators or a corresponding transmission mode indication; and
    transmitting a downlink control information message comprising an indication of the one or more demodulation reference signal configurations and the transmission mode out of the set of combinations indicated by the medium access control-control element.

21. The method of claim 16, further comprising:
    receiving, from the UE, a message comprising capability information corresponding to a maximum number of simultaneously addressed demodulation reference signal configurations per physical downlink shared channel allocation and a list of physical downlink shared channel transmission modes supported by the UE; and
    determining a length of one or more fields of a downlink control information message indicating the at least one demodulation reference signal configuration and the transmission mode based at least in part on receiving the message, transmitting the first control signaling, transmitting the second control signaling, or any combination thereof.

22. The method of claim 16, wherein transmitting the second control signaling comprises:
    transmitting a downlink control information message comprising one or more fields indicating the at least one demodulation reference signal configuration and the transmission mode.

23. The method of claim 16, wherein the first control signaling comprises radio resource control signaling indicating a downlink configuration candidate table, the method further comprising:
    transmitting a medium access control-control element activating a plurality of downlink configurations from the downlink configuration candidate table; and
    transmitting a downlink control information message indicating a downlink configuration from the plurality of downlink configurations activated by the medium access control-control element for an associated data message of the one or more data messages.

24. The method of claim 16, wherein transmitting the first control signaling comprises:
    transmitting radio resource control signaling configuring a list of one or more downlink configuration options based at least in part on a capability of the UE to support the list of the one or more downlink configuration options, wherein one or more downlink configuration options can be activated based at least in part on a medium access control-control element, wherein the second control signaling comprises the medium access control-control element and each downlink configuration option of the one or more downlink configuration options is a combination of a transmission mode or a set of transmission parameters identifying the transmission mode and a set of one or more demodulation reference signal configuration parameters associated with a corresponding transmission mode.

25. The method of claim 16, wherein the one or more demodulation reference signal configuration parameters comprise a number of additional demodulation reference signal symbol locations.

26. An apparatus for wireless communication at a user equipment (UE), comprising:
    a processor;
    memory coupled with the processor; and
    instructions stored in the memory and executable by the processor to cause the apparatus to:
        receive, from a base station, first control signaling identifying a set of transmission mode indicators or transmission mode options and a set of corresponding demodulation reference signal configurations associated with each transmission mode of a set of transmission modes, the set of transmission modes to be addressed by a UE receiver to receive one or more data messages from multiple transmission reception points;
        receive, from the base station, second control signaling indicating a transmission mode of the set of transmission modes or a combination of transmission mode indicators and a combination of one or more demodulation reference signal configuration parameters to signal one or more demodulation reference signal configurations corresponding to the indicated transmission mode;
        identify, based at least in part on the transmission mode indicators and the one or more demodulation reference signal configuration parameters, at least one demodulation reference signal configuration of the set of demodulation reference signal configurations and the transmission mode of the set of transmission modes;
        receive one or more demodulation reference signals from the multiple transmission reception points according to the identified at least one demodulation reference signal configuration; and
        receive, from the multiple transmission reception points, the one or more data messages based at least in part on the indicated transmission mode and the received one or more demodulation reference signals.

27. The apparatus of claim 26, wherein the instructions to receive the second control signaling are executable by the processor to cause the apparatus to:
    receive a control message that comprises an indication of the at least one demodulation reference signal configuration and the transmission mode; and
    switch to the transmission mode based at least in part on receiving the control message that comprises the indication, wherein receiving the one or more demodulation reference signals is based at least in part on the received second control message.

28. The apparatus of claim 26, wherein the instructions to receive the second control signaling are executable by the processor to cause the apparatus to:
receive a control message comprising an index of the at least one demodulation reference signal configuration in the set of demodulation reference signal configurations and the transmission mode.

29. An apparatus for wireless communication at a base station, comprising:
a processor;
memory coupled with the processor; and
instructions stored in the memory and executable by the processor to cause the apparatus to:
transmit, to a user equipment (UE), first control signaling identifying a set of transmission mode indicators or transmission mode options and a set of corresponding demodulation reference signal configurations associated with each transmission mode of a set of transmission modes, the set of transmission modes to be addressed by a UE receiver to receive one or more data messages from multiple transmission reception points;
transmit, to the UE, second control signaling indicating a transmission mode of the set of transmission modes or a combination of transmission mode indicators and a combination of one or more demodulation reference signal configuration parameters to signal one or more demodulation reference signal configurations corresponding to the indicated transmission mode;
transmit, to the UE, one or more demodulation reference signals from the multiple transmission reception points according to at least one demodulation reference signal configuration of the set of demodulation reference signal configurations and the transmission mode of the set of transmission modes based at least in part on the transmission mode indicators and the one or more demodulation reference signal configuration parameters; and
transmit, to the UE via the multiple transmission reception points, the one or more data messages based at least in part on the indicated transmission mode and the transmitted one or more demodulation reference signals.

30. The apparatus of claim 29, wherein the instructions to transmit the second control signaling are executable by the processor to cause the apparatus to:
transmit a control message that comprises an indication of the at least one demodulation reference signal configuration and the transmission mode; and
switch to the transmission mode based at least in part on transmitting the control message that comprises the indication, wherein transmitting the one or more demodulation reference signals is based at least in part on the transmitted second control message.

* * * * *